(12) United States Patent
Dalcher et al.

(10) Patent No.: US 12,388,848 B2
(45) Date of Patent: Aug. 12, 2025

(54) CYBERSECURITY DETECTION

(71) Applicant: CrowdStrike, Inc., Sunnyvale, CA (US)

(72) Inventors: Gregory William Dalcher, Casper, WY (US); Vitaly Zaytsev, Beaverton, OR (US)

(73) Assignee: CrowdStrike, Inc., Sunnyvale, CA (US)

( * ) Notice: Subject to any disclaimer, the term of this patent is extended or adjusted under 35 U.S.C. 154(b) by 195 days.

(21) Appl. No.: 18/363,607

(22) Filed: Aug. 1, 2023

(65) Prior Publication Data
US 2025/0047689 A1 Feb. 6, 2025

(51) Int. Cl.
*H04L 9/00* (2022.01)
*G06F 21/57* (2013.01)
*H04L 9/40* (2022.01)

(52) U.S. Cl.
CPC ........ *H04L 63/1416* (2013.01); *G06F 21/577* (2013.01); *H04L 63/20* (2013.01); *G06F 2221/033* (2013.01)

(58) Field of Classification Search
CPC . H04L 63/1416; H04L 63/20; H04L 63/1425; G06F 21/577; G06F 2221/033
See application file for complete search history.

(56) References Cited

U.S. PATENT DOCUMENTS

| | | | |
|---|---|---|---|
| 8,438,644 B2 | 5/2013 | Watters et al. | |
| 8,819,828 B1 | 8/2014 | Umland et al. | |
| 9,088,601 B2 | 7/2015 | Friedrichs et al. | |
| 9,167,000 B2 | 10/2015 | Mackin | |
| 10,417,530 B2 | 9/2019 | Luan et al. | |
| 10,841,333 B2 | 11/2020 | Levy | |
| 11,374,944 B2 | 6/2022 | Komarek et al. | |
| 2017/0201530 A1* | 7/2017 | Mead | H04L 63/1416 |
| 2018/0096230 A1* | 4/2018 | Luan | G06F 18/24137 |
| 2021/0256401 A1 | 8/2021 | Elkind | |
| 2022/0207141 A1 | 6/2022 | Chung et al. | |

FOREIGN PATENT DOCUMENTS

| | | |
|---|---|---|
| CN | 112131259 | 12/2020 |
| CN | 110826062 | 2/2022 |
| CN | 112000952 | 5/2022 |
| CN | 115062301 | 9/2022 |

\* cited by examiner

*Primary Examiner* — Syed M Ahsan
(74) *Attorney, Agent, or Firm* — Law Office of Scott P. Zimmerman, PLLC

(57) ABSTRACT

A cybersecurity service protects endpoint devices from cybersecurity attacks. The cybersecurity service deploys cybersecurity attack feature vectors to agents in the field. The cybersecurity attack feature vectors are created in the cloud to efficiently describe observed groups of cybersecurity attacks. One method to assemble these is to generate clustering centroids for the observed groups. Each agent monitors its host according to the cybersecurity attack feature vectors. Each agent monitors its host's event behaviors and locally extracts an event behavior feature vector. The agent compares the cybersecurity attack feature vectors to the event behavior feature vector and, if similarity is determined, then the agent determines that the host's event behaviors are evidence of a cybersecurity attack. The agent may implement threat procedures, such as suspending/terminating the event behaviors and generating alerts. The agent remains a small, lightweight cybersecurity detector that does not need constant Internet access.

20 Claims, 67 Drawing Sheets

FIG. 19

```
0d89347f84b2f8c602940b74c8b4c673dc4782ab4826af4a721068e52f738831b,
281,312,327,328,5765,7015,7032,7037,7061,7073,7087,7088,7089,7090,7093,7139,7140,7148,7179,7200,7207,7249,7252,735
7,7410,7411,7412
5bdc1e42c904628dc1f19c51f3fd97be61c04bb0ab65940d2f5ab5cb32d21143,
327,328,360,370,371,471,5765,7024,7032,7061,7086,7088,7089,7090,7093,7106,7123,7139,7143,7207,7249,7252,7255,7282,
7343,7391,7401,7410,7411,7412
0712bc940b31011813bb10e92f5668806b928132d4e993abd9c456c8cc91444596,
327,328,5765,7015,7032,7051,7061,7081,7088,7089,7090,7093,7200,7205,7207,7224,7249,7252,7255,7393,7401,7410,7411,7
412
77a860ac0b7deb3c17acba8d513a5574069070153274925e6f579d22724544fc,
327,328,5765,7032,7088,7089,7091,7092,7093,7160,7170,7200,7207,7249,7252,7401,7410,7411,7412
567400a041425a3a667fdd7a2862c59829d551963be7871lac90ca1dd49c069d,
327,328,5765,7032,7061,7088,7089,7090,7102,7105,7200,7207,7249,7252,7401,7410,7411,7412
245371d4a23b3abdff8894aa755aaf957b1dfb50246a5e0212e7dfc5f0950cc4,
327,328,370,377,5765,7032,7061,7086,7088,7089,7091,7092,7093,7106,7123,7143,7160,7167,7170,7200,7205,7207,7249,725
2,7255,7391,7393,7410,7411
08d12841527cd1bb021d6a60f9898d6e0414d95e7dcde262ed276d5c8afa33cc,
327,328,5765,7032,7088,7089,7091,7092,7093,7155,7160,7170,7200,7205,7207,7249,7252,7354,7401,7410,7411,7412
1b708ba96bc904ff366131&f2e064c0dcef2ff6c5096f7a737373c61d26bca7,
327,328,5765,7032,7061,7088,7089,7093,7200,7205,7207,7224,7249,7252,7401,7410,7411,7412
6f6a238ald08b14b5d24a3b70d6836a8ac74b60046f1bec5a1d9972d13141fd72,
82,167,281,312,406,439,5765,7015,7061,7075,7085,7086,7088,7089,7090,7091,7092,7093,7119,7139,7140,7143,7155,7160,7
170,7179,7200,7201,7205,7207,7233,7249,7252,7347,7391,7401,7410,7411,7412
97cf346d1c236cd14c285f7be444962c24eaac747aa34a11fbe52a5376414597,
161,171,327,328,361,370,377,5765,7032,7061,7088,7089,7090,7093,7205,7207,7217,7224,7249,7252,7347,7410,7411
a7a89d30f307a428b8ec4e50972a34e98430143d940d2eb72ade6806cfa9fd23,
327,328,5765,7020,7032,7061,7087,7088,7089,7090,7093,7123,7139,7140,7143,7205,7207,7249,7252,7391,7410,7411,7412
8575a4b604b9984775a1557d0fa8257c63c524d31&ea041e2cf4f0fc829dce,
327,328,5765,7032,7088,7089,7091,7092,7093,7170,7176,7182,7200,7205,7207,7249,7252,7255,7391,7393,7401,7410,7411,7
412
20a9fb4a889296caf88e3f180c79bfe017eebf2a41475263f5e41de25ac9615f,
327,328,370,377,5765,7032,7061,7087,7088,7089,7090,7091,7092,7093,7155,7170,7200,7207,7249,7252,7255,7354,7401,741
0,7411,7412
0496dcba0f4bd772c47a92800a543ad8b6c5f6d76c0a1355653f40335a83ca0e,
161,171,327,328,5765,7015,7032,7081,7088,7089,7090,7091,7093,7200,7205,7207,7212,7217,7224,7249,7252,7255,7279,739
3,7401,7410,7411,7412
03cce562ef357e23658973817471f8892207d6e65df893280f47f1cfd87337e3,
5765,7032,7092,7155,7170,7200,7207,7249,7252,7255,7354,7393,7410,7411,7412
```

FIG. 20

| | threat_type | counts | percent |
|---|---|---|---|
| 16 | clean | 308275 | 32.208975 |
| 2 | Backdoor | 154508 | 16.143198 |
| 13 | Ransomware | 152718 | 15.958176 |
| 7 | Dropper | 102291 | 10.687497 |
| 15 | Trojan Spy | 69193 | 7.229375 |
| 12 | Password Stealer | 44507 | 4.650150 |
| 1 | Application | 34695 | 3.624979 |
| 6 | Downloader | 34539 | 3.608680 |
| 5 | CoinMiner | 19679 | 2.056088 |
| 0 | Adware | 10023 | 1.047216 |
| 10 | HackTool | 9870 | 1.031231 |
| 3 | Banker | 7977 | 0.833447 |
| 8 | Exploit | 3841 | 0.401313 |
| 9 | GameThief | 2417 | 0.252531 |
| 11 | Keylogger | 1820 | 0.190156 |

|  | precision | recall | f1-score | support |
|---|---|---|---|---|
| clean | 0.99 | 1.00 | 0.99 | 101652 |
| Password Stealer | 0.90 | 0.81 | 0.85 | 14671 |
| Backdoor | 0.90 | 0.94 | 0.92 | 50802 |
| Trojan Spy | 0.90 | 0.88 | 0.89 | 23071 |
| Downloader | 0.86 | 0.81 | 0.83 | 11460 |
| Exploit | 0.94 | 0.88 | 0.90 | 1281 |
| Ransomware | 0.98 | 0.98 | 0.98 | 50555 |
| HackTool | 0.99 | 0.93 | 0.96 | 3208 |
| Application | 0.99 | 0.98 | 0.98 | 11458 |
| Dropper | 0.93 | 0.94 | 0.94 | 33519 |
| CoinMiner | 0.96 | 0.94 | 0.95 | 6481 |
| Banker | 0.89 | 0.79 | 0.84 | 2642 |
| Adware | 0.89 | 0.89 | 0.89 | 3396 |
| GameThief | 0.95 | 0.96 | 0.96 | 803 |
| Keylogger | 0.97 | 0.84 | 0.90 | 598 |
| accuracy |  |  | 0.95 | 315597 |
| macro avg | 0.94 | 0.90 | 0.92 | 315597 |
| weighted avg | 0.95 | 0.95 | 0.95 | 315597 |

FIG. 28

| classification_report | precision | recall | f1-score | support |
|---|---|---|---|---|
| clean | 1.00 | 1.00 | 1.00 | 97862 |
| Password Stealer | 0.99 | 0.99 | 0.99 | 14437 |
| Backdoor | 0.99 | 1.00 | 1.00 | 50986 |
| Trojan Spy | 0.99 | 0.99 | 0.99 | 22837 |
| Downloader | 0.99 | 0.99 | 0.99 | 11408 |
| Exploit | 1.00 | 1.00 | 1.00 | 1289 |
| Ransomware | 1.00 | 1.00 | 1.00 | 50515 |
| HackTool | 1.00 | 1.00 | 1.00 | 3353 |
| Application | 1.00 | 1.00 | 1.00 | 11404 |
| Dropper | 1.00 | 1.00 | 1.00 | 33511 |
| Coinminer | 1.00 | 1.00 | 1.00 | 6437 |
| Banker | 0.99 | 0.99 | 0.99 | 2674 |
| Adware | 1.00 | 1.00 | 1.00 | 3386 |
| GameThief | 1.00 | 1.00 | 1.00 | 812 |
| Keylogger | 1.00 | 0.99 | 1.00 | 627 |
| accuracy | | | 1.00 | 311538 |
| macro avg | 1.00 | 1.00 | 1.00 | 311538 |
| weighted avg | 1.00 | 1.00 | 1.00 | 311538 |

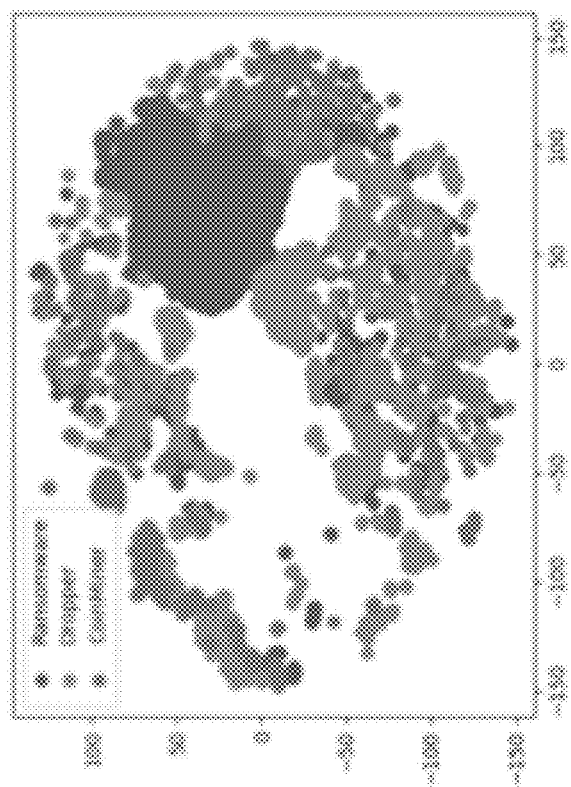
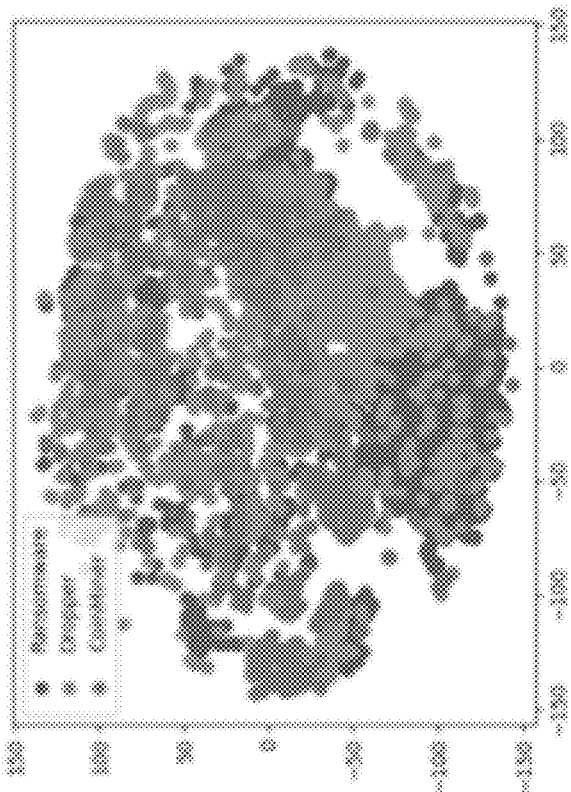
FIG. 34

FIG. 47

| Similarity threshold | FPR | TPR | Determination rate |
|---|---|---|---|
| 0.99 | 0.08% | 1.80% | 1.80% |
| 0.95 | 0.77% | 15.16% | 15.93% |
| 0.92 | 2.04% | 21.68% | 23.72% |
| 0.88 | 5.43% | 25.24% | 30.68% |

FIG. 52

Data highlights (no interpolation):      (Centroid only comparisons)

| Similarity threshold | FPR | TPR | FPR Determination rate | TPR Determination rate | Similarity |
|---|---|---|---|---|---|
| 0.99 | 1.80% | | 2.45% | | 0.99 |
| | 0.08% | 1.80% | | 15.92% 18.37% | |
| 0.95 | 15.16% | | 5.63% | | 0.95 |
| | 0.77% | 15.93% | | 31.26% 36.88% | |
| 0.93 | 20.80% | | 7.48% | | 0.93 |
| | 1.51% | 22.30% | | 34.79% 42.28% | |
| 0.92 | 21.68% | | 9.99% | | 0.92 |
| | 2.04% | 23.72% | | 36.65% 46.64% | |
| 0.88 | 25.24% | | 14.64% | | 0.88 |
| | 5.43% | 30.68% | | 39.85% 54.49% | |

Subsets from groups consist of samples with similarity from group's centroid of 0.80 and greater, selected randomly

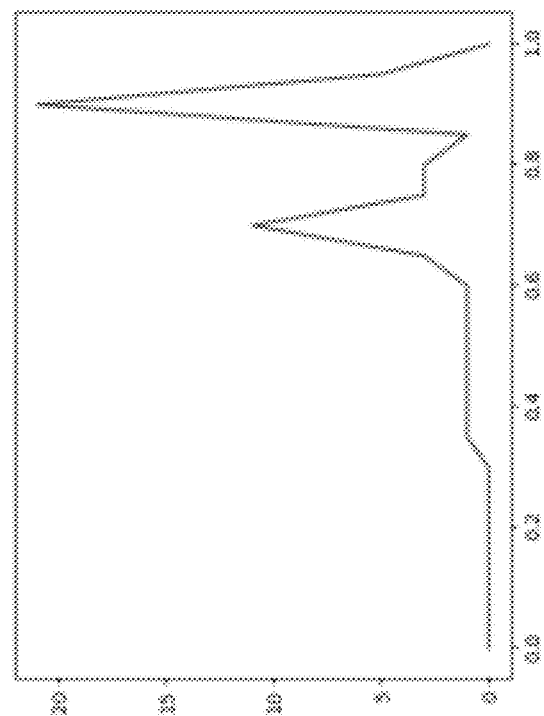
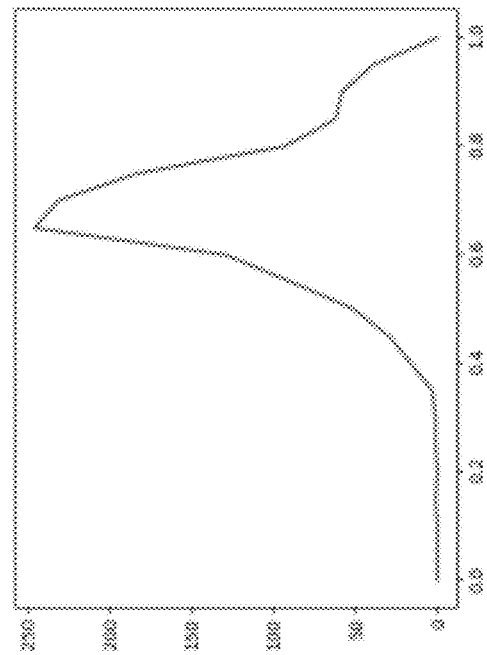
FIG. 54

FIG. 56

Centroid vs farthest group member:

- Backdoor:
- Banker:
- Dropper:
- Clicker:
- Adware:

FIG. 59

Centroid similarities:
- Backdoor vs Dropper:
- Banker vs Downloader:
- Banker vs Dropper:
- Clicker vs Dropper:

CYBERSECURITY DETECTION

BACKGROUND

The subject matter described herein generally relates to computers and to computer security and, more particularly, the subject matter relates to endpoint detection and response (EDR) and to extended detection and response (XDR) of cybersecurity attacks.

Cybersecurity attacks are increasing. Nearly every day we read of another virus, hack, or malware. These cybersecurity attacks must be detected to avoid stolen, destroyed, or exposed information.

SUMMARY

A cybersecurity service protects our smartphones, laptops, and other computer devices from cybersecurity attacks. The cybersecurity service deploys cybersecurity attack feature vectors to cybersecurity detection agents in the field. The deployed cybersecurity attack feature vectors are created in the cloud to efficiently describe observed groups of cybersecurity attacks. One method to assemble these is to generate clustering centroids for the observed groups. Each cybersecurity detection agent then monitors its host according to the cybersecurity attack feature vectors. Each cybersecurity detection agent monitors its host's event behaviors and locally extracts an event behavior feature vector. The cybersecurity detection agent may then compare the cybersecurity attack feature vectors to the event behavior feature vector. If the event behavior feature vector is similar to any of the cybersecurity attack feature vectors, then the cybersecurity detection agent determines that the host's event behaviors are evidence of a cybersecurity attack. The cybersecurity detection agent may implement threat procedures, such as suspending/terminating the event behaviors and generating alerts. Because the cybersecurity detection agent generates the event behavior feature vector and performs the vector comparison, the cybersecurity detection agent remains a small, lightweight cybersecurity solution that does not need constant Internet access.

BRIEF DESCRIPTION OF THE SEVERAL VIEWS OF THE DRAWINGS

The features, aspects, and advantages of the cybersecurity service are understood when the following Detailed Description is read with reference to the accompanying drawings, wherein:

FIG. 19 illustrates examples of ARES® data;

FIGS. 20-28 illustrate examples of the machine learning;

FIGS. 29-39 illustrate examples of results visualization;

FIGS. 40-52 illustrate efficacy assessments;

FIGS. 53-59 illustrate distance distributions;

DETAILED DESCRIPTION

Some examples relate to detection of cybersecurity attacks. As we all know, nearly every day there is another hack that steals account passwords and other personal information. Our inboxes often contain emails or texts that contain malicious links. Computer viruses can ruin our devices. A cybersecurity service, however, protects our smartphones, laptops, and other computer devices from cybersecurity attacks. The cybersecurity service downloads a cybersecurity detection agent to our devices. The cybersecurity detection agent may thus be an "app" that inspects each one of our devices for suspicious behaviors. The cybersecurity detection agent, in other words, monitors the software applications that run on any smartphone, laptop, or other computer host device. The cybersecurity detection agent monitors events, activities, messages, and other behaviors conducted by the host device. When the cybersecurity detection agent detects any suspicious behavior, the cybersecurity detection agent may implement procedures that protect the host device and that protect our personal information.

The cybersecurity detection agent, in particular, uses a cybersecurity attack feature vector. The cybersecurity attack feature vector is data (such as feature values) that represent a cybersecurity attack. As the cybersecurity detection agent monitors behaviors conducted by its host device, the cybersecurity detection agent may compare the behaviors to the cybersecurity attack feature vector. If the behaviors are similar to the cybersecurity attack feature vector, then the cybersecurity detection agent may determine that the host's behaviors are evidence of the cybersecurity attack. The cybersecurity detection agent may implement threat procedures, such as suspending/terminating the behaviors and generating alerts. Because the cybersecurity detection agent generates the event behavior feature vector and performs the vector comparison, the cybersecurity detection agent remains a small, lightweight cybersecurity protector that does not need constant Internet access.

Cybersecurity detection will now be described more fully hereinafter with reference to the accompanying drawings. Cybersecurity detection, however, may be embodied in many different forms and should not be construed as limited to the examples set forth herein. These examples are provided so that this disclosure will be thorough and complete and fully convey cybersecurity detection to those of ordinary skill in the art. Moreover, all the examples of cybersecurity detection are intended to encompass both structural and functional equivalents thereof. Additionally, it is intended that such equivalents include both currently known equivalents as well as equivalents developed in the future (i.e., any elements developed that perform the same function, regardless of structure).

Figure 1:
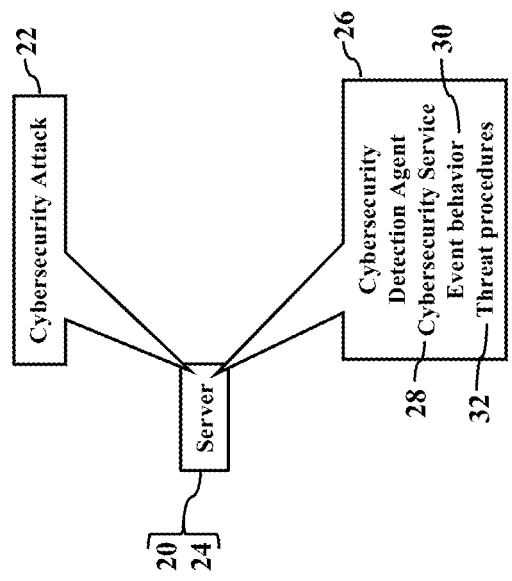
FIGS. 1-2 illustrate some examples of behavioral detection of cybersecurity attacks.
Figure 2:
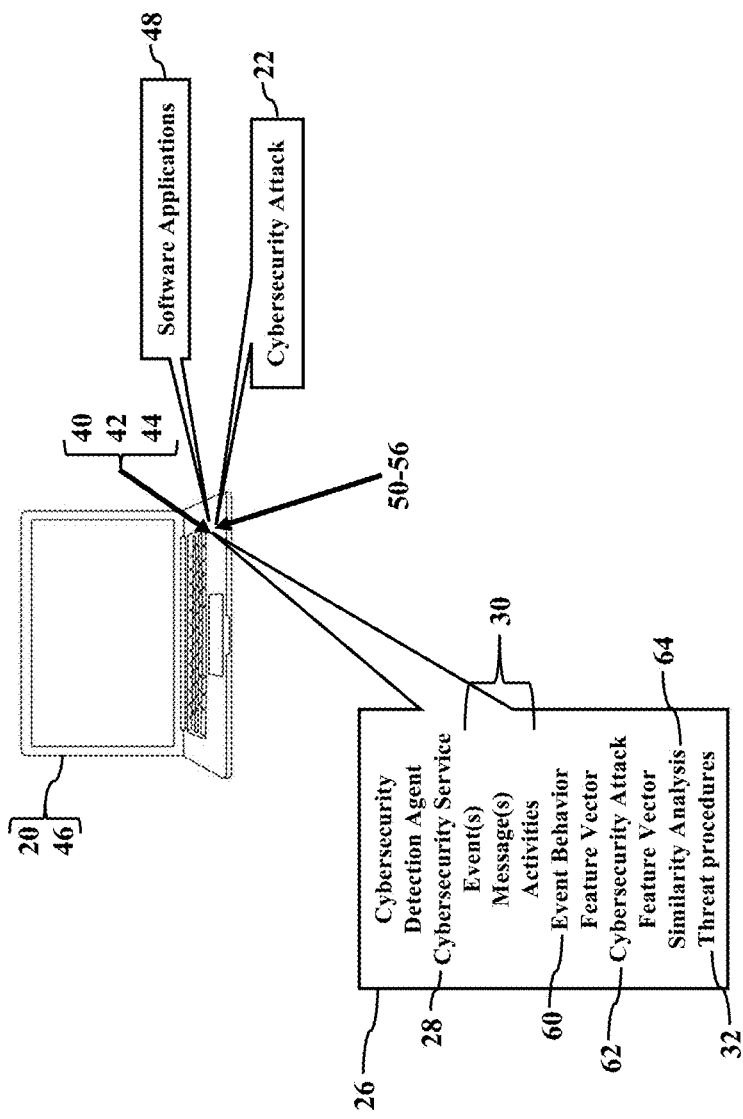

FIGS. 1-2 illustrate some examples of behavioral detection of cybersecurity attacks. As a computer 20 operates, the computer 20 may be subjected to a cybersecurity attack 22. The computer 20 is illustrated as a server 24, but the computer 20 may be any processor-controlled device (as later paragraphs will explain). The cybersecurity attack 22 is software, email, website link, ransomware, or other malicious mechanism that attempts to steal, destroy, or expose information. If the server 24 were to fall prey to the cybersecurity attack 22, then the server 24 may reveal personal information, usernames, passwords, and other sensitive information. This sensitive information may be used to access bank/crypto accounts, corporate networks, and social media accounts. However, to prevent the cybersecurity attack 22, the server 24 stores and executes a cybersecurity detection agent 26. The cybersecurity detection agent 26 is a computer program, application, instruction(s), or code that detects evidence of the cybersecurity attack 22. As the server 24 operates, the cybersecurity detection agent 26 provides a cybersecurity service 28 that monitors event behaviors 30 conducted by the server 24. The event behaviors 30 may include event stream processing, MICROSOFT WINDOWS® kernel events, APPLE MACOS® kernel events, process creation events, and other operating system events. The event behaviors 30 may describe any hardware and software events, messages, and/or activities. If any event behavior 30 indicates evidence of the cybersecurity attack 22, then the cybersecurity detection agent 26 may automatically implement notification, quarantine, isolation, halt, or other threat procedures 32. The threat procedures 32 further protect the computer 20 from the cybersecurity attack 22.

FIG. 2 illustrates more examples of behavioral detection of the cybersecurity attack 22. The computer 20 has a hardware processor 40 that executes an operating system 42 stored in a memory device 44. FIG. 2 illustrates the computer 20 as an endpoint laptop 46. The laptop 46 also stores many software applications 48 in the memory device 44. While the laptop 46 may store hundreds or even thousands of the software applications 48, some familiar packages of the software applications 48 may include a web browser application, an email application, a word processing application, a text messaging application, a social media application, and a cloud storage application. Because any of the software applications 48 may be a potential attack vehicle, the hardware processor 40 also executes the cybersecurity detection agent 26 stored in the memory device 44. The cybersecurity detection agent 26 interfaces with the operating system 42 and/or with the software applications 48 to detect the cybersecurity attack 22.

The cybersecurity detection agent 26 monitors the event behaviors 30. The event behaviors 30 are hardware and software events reported by the operating system 42 and/or by any of the software applications 48. The event behaviors 30 may also include messages or activities conducted by, or reported by, the operating system 42 and/or by any of the software applications 48. The cybersecurity detection agent 26 retrieves the event behaviors 30 from any source. For example, the cybersecurity detection agent 26 may read or consume the event behaviors 30 from an event channel 50, an event log file 52, a trace file 54, and/or a real-time event tracing session 56. The cybersecurity detection agent 26 may register for, or subscribe to, logged or real-time event behaviors 30. If some event behaviors 30 are not of interest, the cybersecurity detection agent 26 may specify only those event behaviors 30 of interest (e.g., provider/source, EventID, timestamp).

The cybersecurity detection agent 26 then generates an event behavior feature vector 60. Once the cybersecurity detection agent 26 collects the event behaviors 30, the cybersecurity detection agent 26 extracts the event behavior feature vector 60. The event behavior feature vector 60 has data or information (e.g., feature values) that are based on the event behaviors 30. The event behavior feature vector 60 may have any number of N-dimensional terms or features expressed as numerical values and/or categorical labels.

The cybersecurity detection agent 26 may then performs a reference comparison. After the cybersecurity detection agent 26 extracts the event behavior feature vector 60, the cybersecurity detection agent 26 compares the event behavior feature vector 60 to a cybersecurity attack feature vector 62. The cybersecurity attack feature vector 62 represents the characteristics of the event behaviors 30 that are known to be associated with the cybersecurity attack 22. The cybersecurity attack feature vector 62, in other words, may have been predetermined as evidence of the cybersecurity attack 22. The cybersecurity detection agent 26 may conduct any similarity analysis 64 to determine whether the event behavior feature vector 60 equals, matches, or is otherwise similar to the cybersecurity attack feature vector 62. The cybersecurity detection agent 26, for example, may determine a Euclidean distance similarity, a cosine similarity, and/or a dot product similarity. The cybersecurity detection agent 26 may additionally or alternatively determine a vector difference between the corresponding N terms of the event behavior feature vector 60 and the cybersecurity attack feature vector 62. Whatever similarity analysis 64 is used, if the event behavior feature vector 60 is similar to the cybersecurity attack feature vector 62 (perhaps within one or more threshold values or ranges), then the cybersecurity detection agent 26 may determine that the event behavior feature vector 60 exhibits evidence of the cybersecurity attack 22. The cybersecurity detection agent 26 may then initiate or implement the notification/quarantine/isolation/halt or other threat procedures 32.

The cybersecurity detection agent 26 improves computer functioning. The cybersecurity detection agent 26 detects evidence of the cybersecurity attack 22. Because the cybersecurity detection agent 26 detects the cybersecurity attack 22, the cybersecurity detection agent 26 may immediately initiate or implement the threat procedures 32. The cybersecurity detection agent 26, for example, may prevent the cybersecurity attack 22 from accessing the memory device 44 (e.g., RAM, ROM, disk). The cybersecurity detection agent 26 may also instruct the operating system 42 to halt or terminate any current event behavior 30 that is queued for execution by the operating system 42 and/or by any of the software applications 48. The cybersecurity detection agent 26 may thus reactively or proactively stop the cybersecurity attack 22.

The cybersecurity detection agent 26 further improves computer functioning. The cybersecurity detection agent 26 detects evidence of the cybersecurity attack 22 without a constant, active network connection. That is, once the cybersecurity detection agent 26 obtains the cybersecurity attack feature vector 62, the cybersecurity detection agent 26 may protect the laptop 46 without requiring further network communications. The cybersecurity detection agent 26, in other words, provides the cybersecurity service 28 independent of a constant, active network connection to the Internet or other network. The cybersecurity detection agent 26 only needs an intermittent or periodic (e.g., hourly, daily, or other timing) Internet connection to receive the cybersecurity attack feature vector 62. Once the cybersecurity attack feature vector 62 is obtained, the cybersecurity detection agent 26 may implement offline operation and locally monitor the event behaviors 30, locally generate the event behavior feature vector 60, and locally compare to the cybersecurity attack feature vector 62. Cloud-based services are greatly reduced, network bandwidth is greatly reduced, and network traffic is greatly reduced. The cybersecurity detection agent 26 may thus be a predominantly local cybersecurity service 28.

The cybersecurity detection agent 26 further improves computer functioning. Because the cybersecurity detection agent 26 need only perform operations for locally monitoring, generating, and comparing, these operations may thus be represented using simple logical statements or code modules that consume little space (e.g., bits/bytes) in the memory device 44. These operations further require fewer hardware processor cycles and fewer input/output/read/write operations. These operations also consume reduced electrical power. The cybersecurity detection agent 26 is thus a compact, lightweight solution that is easily deployed to clients/customers in the field (such as the server 24 and the laptop 46). Indeed, because the cybersecurity detection agent 26 requires much less hardware and software resources, the cybersecurity detection agent 26 is an ideal solution for so-called Internet of Things devices having limited processor, memory, networking, and other resources.

Figure 3:
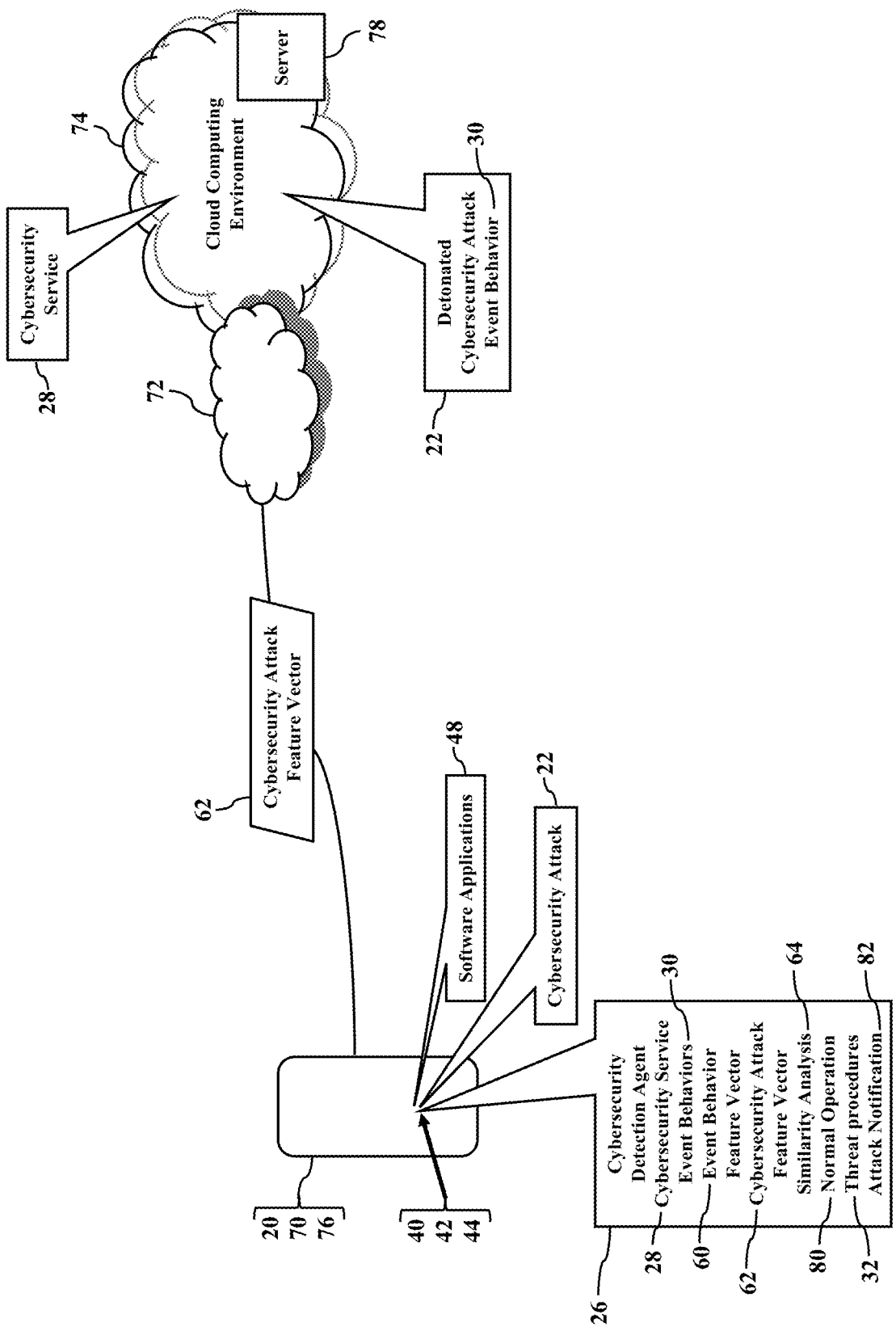
FIGS. 3-5 illustrate examples of cloud-based vector specification.
Figure 4:
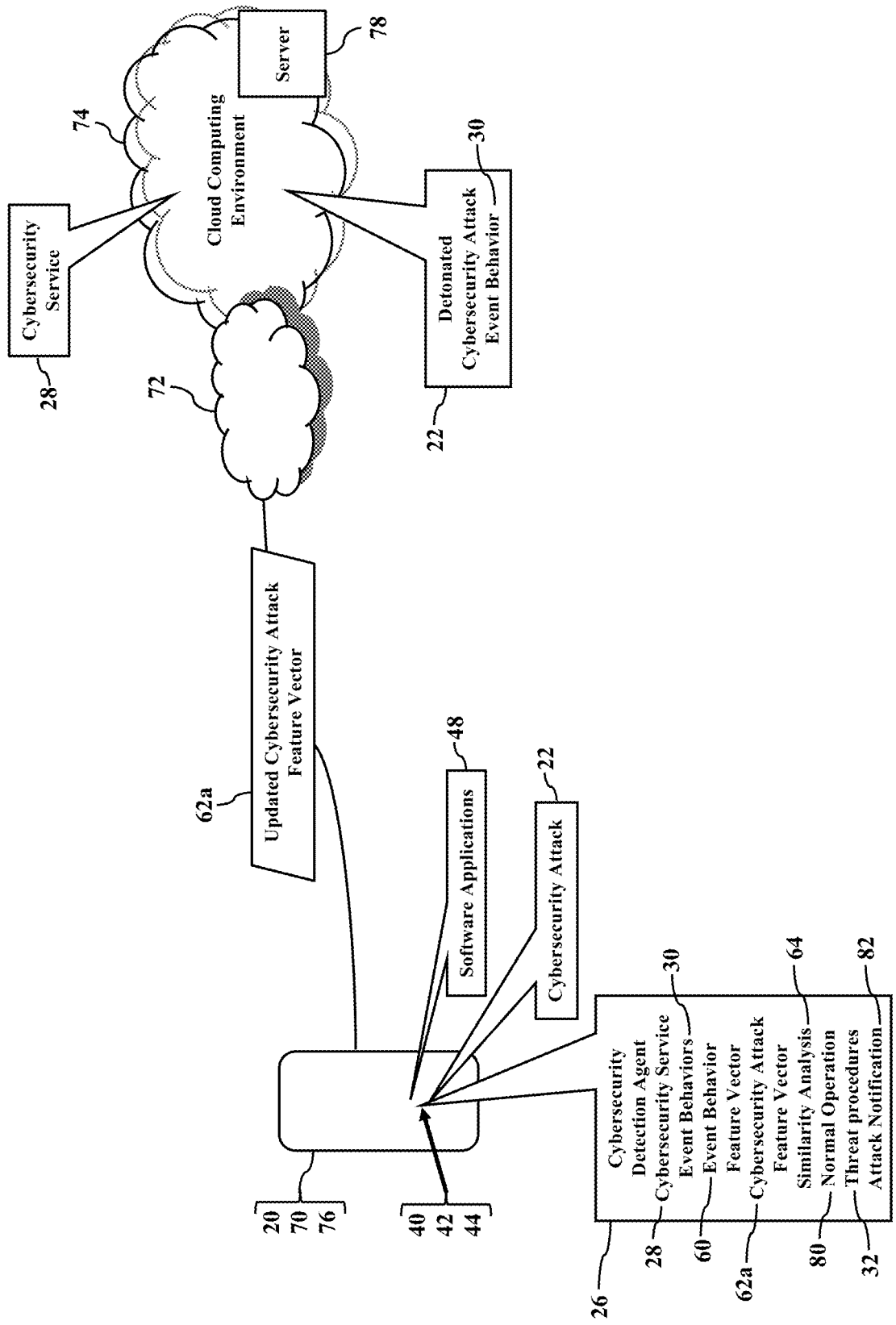
Figure 5:
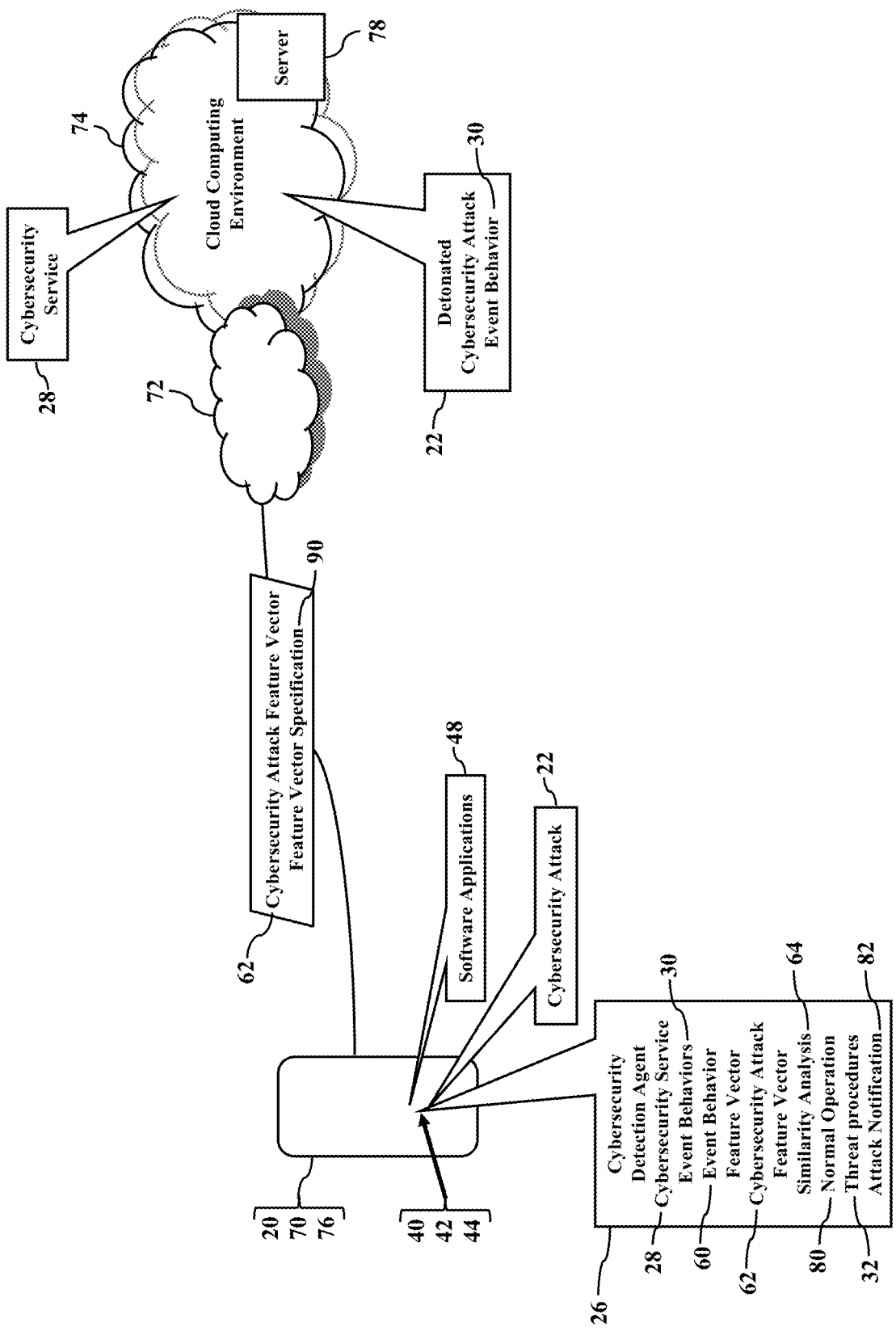
Figure 6:
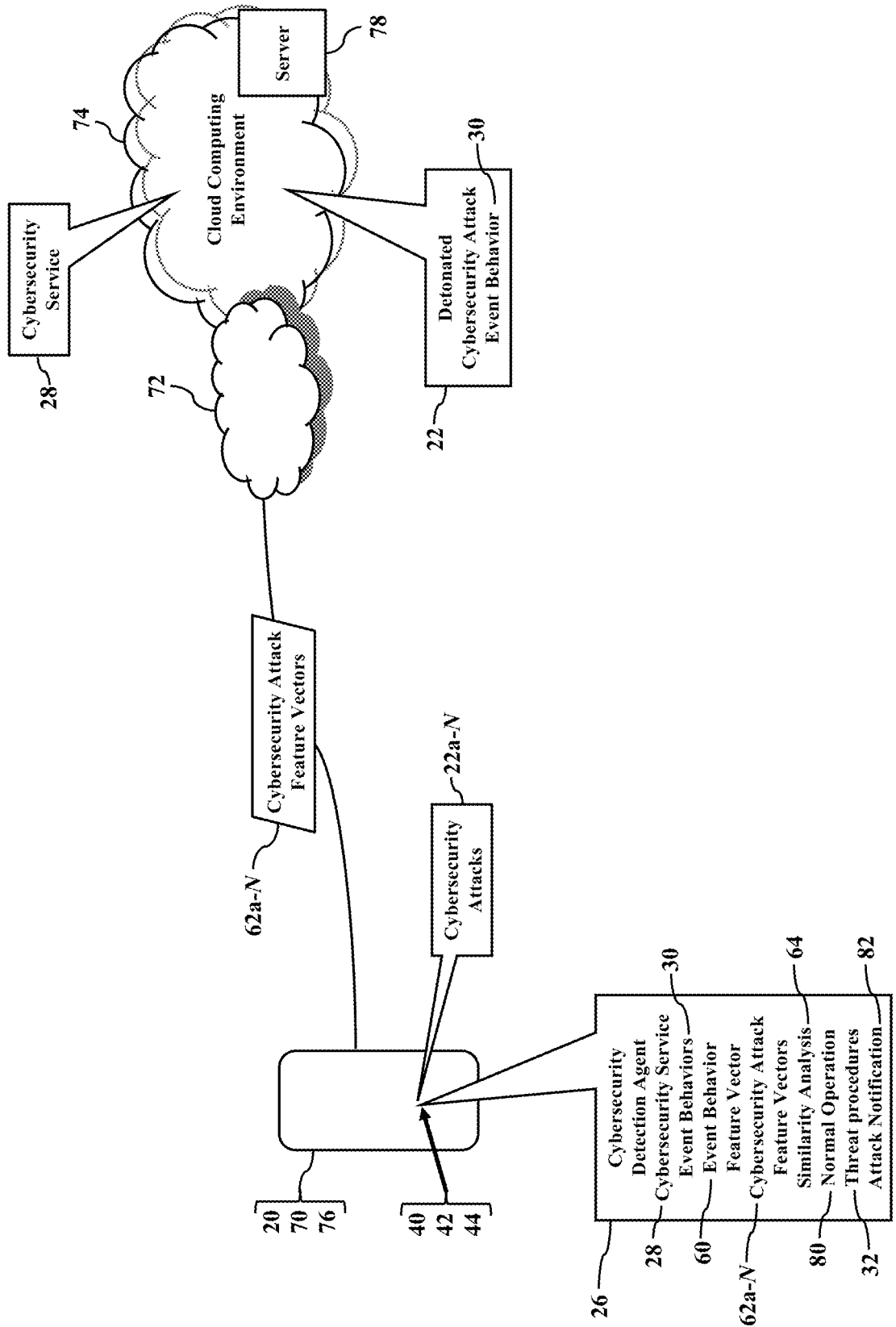
FIGS. 6-9 illustrate examples of targeted cybersecurity attack detections.

FIGS. 3-5 illustrate examples of cloud-based vector specification. The cybersecurity detection agent 26 only needs an intermittent or periodic (e.g., hourly, daily, or other timing) Internet connection. FIG. 3 thus illustrates the computer 20 communicating via a network interface 70 to an access communications network 72 and to a cloud computing environment 74. Here, though, the computer 20 is illustrated as a mobile smartphone 76. The mobile smartphone 76 has the hardware processor 40 that executes the operating system 42 stored in the memory device 44. The mobile smartphone 76 also stores and executes the software applications 48 (again such as the web browser application, the email application, the text messaging application, the social media application, and the cloud storage application). The mobile smartphone 76 also stores and executes the cybersecurity detection agent 26 as a defense mechanism against the cybersecurity attack 22.

The mobile smartphone 76 obtains the cybersecurity attack feature vector 62. The cybersecurity attack feature vector 62 represents characteristics of the event behaviors 30 that are known to be associated with, and/or exhibited by, the cybersecurity attack 22. The cybersecurity attack feature vector 62, in other words, has been predetermined as evidence of the cybersecurity attack 22. While the cybersecurity attack feature vector 62 may be obtained from any source, FIG. 3 illustrates cloud sourcing and delivery. That is, the cybersecurity attack feature vector 62 may be generated by one or more network members affiliated with the cloud computing environment 74. As a simple example, suppose a cloud server 78 generates the cybersecurity attack feature vector 62. The cloud computing environment 74, in other words, may safely detonate the cybersecurity attack 22 and observe its associated event behaviors 30 (as this disclosure will later explain). The cloud server 78 may then generate the cybersecurity attack feature vector 62 that represents the event behaviors 30 preceding, caused by, or subsequent to the cybersecurity attack 22 (again, as this disclosure will later explain). Once the cybersecurity attack feature vector 62 is defined, the cloud computing environment 74 may deploy the cybersecurity attack feature vector 62 to clients in the field. FIG. 3 thus illustrates the cybersecurity attack feature vector 62 routing via the cloud computing environment 74 and the access communications network 72 to a network address (e.g., IP address) associated with the smartphone 76. When the smartphone 76 receives the cybersecurity attack feature vector 62, the smartphone 76 stores the cybersecurity attack feature vector 62 to the memory device 44.

The cybersecurity detection agent 26 provides the cybersecurity service 28. The cybersecurity detection agent 26 interfaces with the operating system 42 and/or any of the software applications 48. The cybersecurity detection agent 26 monitors the event behaviors 30 (e.g., the hardware and software events, messages, and/or activities) locally reported by the operating system 42 and/or by any of the software applications 48. The cybersecurity detection agent 26 generates the event behavior feature vector 60 based on, or using, the locally-generated event behaviors 30. The cybersecurity detection agent 26 then compares the locally-extracted event behavior feature vector 60 to the cybersecurity attack feature vector 62 specified by the cloud computing environment 74. If the event behavior feature vector 60 is dissimilar to the cybersecurity attack feature vector 62 (e.g., the N terms or components of the event behavior feature vector 60 do not lie or occur within the specified threshold values or ranges), then the cybersecurity detection agent 26 may determine that the event behaviors 30 do not exhibit evidence of the cybersecurity attack 22. The cybersecurity detection agent 26 may classify the event behaviors 30 as safe or normal operation 80. If, however, the event behavior feature vector 60 is similar to the cybersecurity attack feature vector 62 (perhaps according to the similarity analysis 64), then the cybersecurity detection agent 26 may determine that the event behaviors 30 exhibit evidence of the cybersecurity attack 22. The cybersecurity detection agent 26 may then initiate or implement the notification/quarantine/isolation/halt or other threat procedures 32. The cybersecurity detection agent 26 may further generate and send an attack notification 82 to the cloud computing environment 74.

FIG. 4 illustrates examples of cloud-based updates. When the smartphone 76 has network access, the cybersecurity service 28 may push or pull updates to the cybersecurity attack feature vector 62. That is, whenever the cybersecurity detection agent 26 establishes network communication with the cloud computing environment 74, the cybersecurity detection agent 26 may request and receive (e.g., a pull mechanism) an updated cybersecurity attack feature vector 62a. When the smartphone 76 has network access, the cloud computing environment 74 may additionally or alternatively push the updated cybersecurity attack feature vector 62a to the cybersecurity detection agent 26. However the updated cybersecurity attack feature vector 62a is sent/received, the cybersecurity detection agent 26 may replace or modify the original cybersecurity attack feature vector 62 with the updated cybersecurity attack feature vector 62a. The cybersecurity detection agent 26 may then compare the locally-extracted event behavior feature vector 60 to the updated cybersecurity attack feature vector 62a specified by the cloud computing environment 74 (as this disclosure above explained). So, as the cybersecurity attack 22 evolves and changes, the cybersecurity service 28 may refine or modify the cybersecurity attack feature vector 62 to ensure the cybersecurity attack 22 remains detected.

FIG. 5 illustrates examples of local vector specification. When the computer 20 (again illustrated as the smartphone 76) has network access, the smartphone 76 may receive the cybersecurity attack feature vector 62. The cybersecurity detection agent 26 may then compare the event behavior feature vector 60 to the cybersecurity attack feature vector 62. As FIG. 5 illustrates, though, the cloud computing environment 74 may also send a feature vector specification 90. The cloud computing environment 74, in other words, may specify instructions or parameters indicating how the cybersecurity detection agent 26 generates the event behavior feature vector 60. The feature vector specification 90, for example, may specify which event behaviors 30 are extracted and how those extracted event behaviors 30 are arranged as the N terms or components of the event behavior feature vector 60. The feature vector specification 90 may further specify any parameters associated with the similarity analysis 64 (such as the threshold values or ranges). While the cloud computing environment 74 may utilize any push/pull mechanism to deploy the feature vector specification 90, FIG. 5 illustrates the feature vector specification 90 accompanying the cybersecurity attack feature vector 62. The cybersecurity attack feature vector 62, for example, may include the feature vector specification 90 as electronic data content (such as specified by a packet header portion or included within a packet payload portion). The cloud computing environment 74 may additionally or alternatively send the feature vector specification 90 as one or more separate packets or messages. However the feature vector specification 90 is specified, the feature vector specification 90 describes how/why/what event behaviors 30 are extracted to generate the event behavior feature vector 60. The cybersecurity detection agent 26 thus follows the feature vector specification 90 specified by the cloud computing environment 74.

The cybersecurity detection agent 26 may thus be a nimble and powerful endpoint detection mechanism. An endpoint device (such as the computer 20, the server 24, the laptop 46, and the smartphone 70) can be connected to the networks 72 and 74. The endpoint device, however, may also include network-enabled printers, cameras, appliances, smart watches, health trackers, navigation systems, and any other computer device that can be connected to the Internet. Whatever the endpoint device, the endpoint device stores and executes the cybersecurity detection agent 26 to detect the cybersecurity attack 22.

FIGS. 6-9 illustrate examples of targeted cybersecurity attack detections. There are many different cybersecurity attacks 22. Each cyberattack is an attempt by cybercriminals, hackers or other digital adversaries to access a computer network or system (such as the computer 20), usually for the purpose of altering, stealing, destroying or exposing information. Cyberattacks target a wide range of victims from individual users to enterprises or to even governments. The goal is usually to access sensitive or valuable data resources (such as passwords, accounts, payment details, intellectual property (IP), and secrets). The cybersecurity service 28, then, may be configured to detect multiple and different cybersecurity attacks 22. The cloud computing environment 74, in other words, may deploy many different cybersecurity attack feature vectors (illustrated as reference numerals 62a-N). Each cybersecurity attack feature vector 62 may be associated with a corresponding cybersecurity attack 22a-N. Each cybersecurity attack feature vector 62, in other words, represents the event behaviors 30 associated with the corresponding cybersecurity attack 22. Each cybersecurity attack feature vector 62 may further be associated with, or even accompany, its corresponding feature vector specification 90 (illustrated in FIG. 5). The cybersecurity service 28 may thus push/pull/send/deploy many different cybersecurity attack feature vectors 62a-N that target and detect many different cybersecurity attacks 22a-N.

Figure 7:
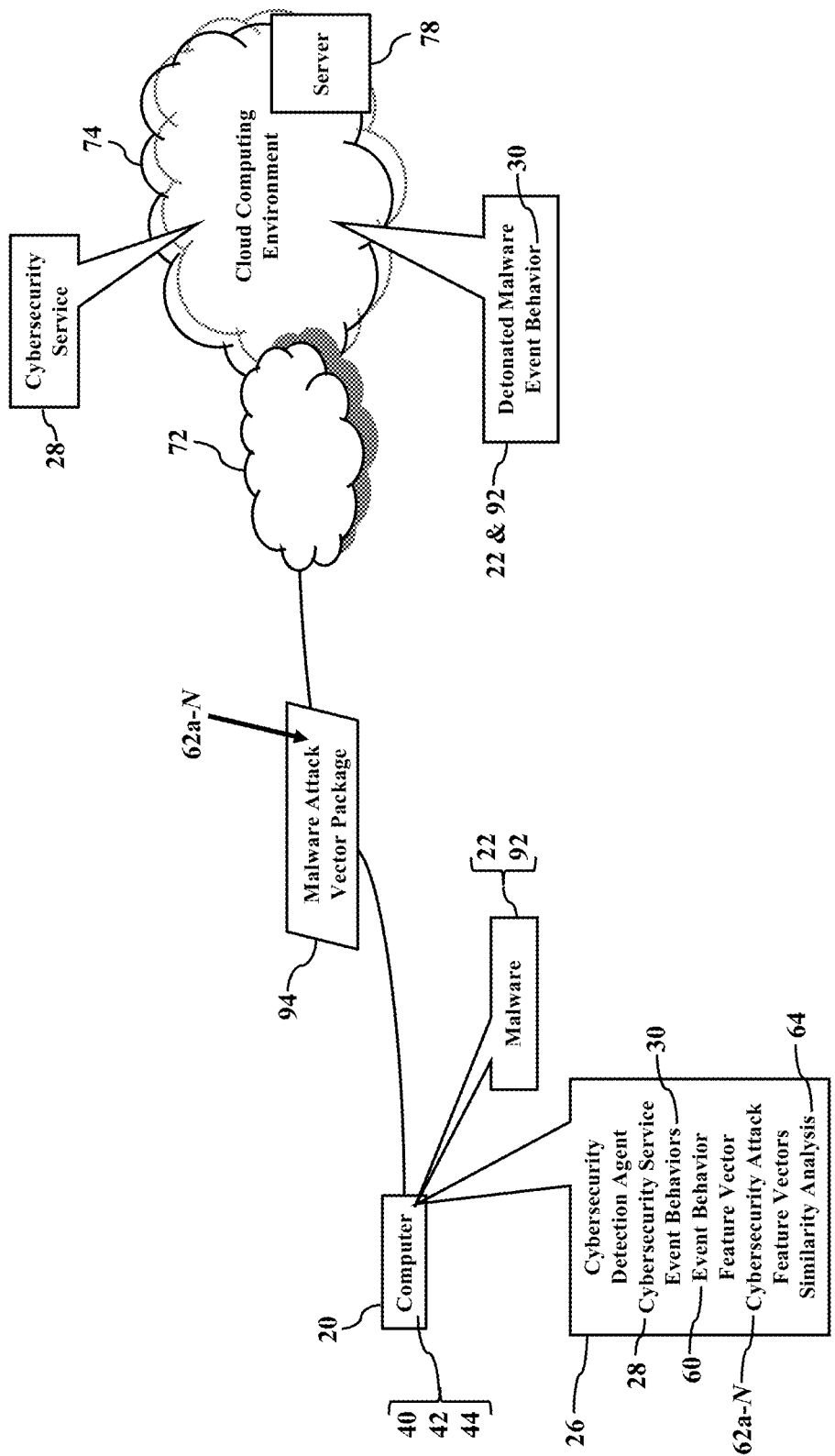

FIG. 7 illustrates malware examples. Malicious software (or malware) 92 is a very common form of the cybersecurity attack 22. The malware 92 is any program or code that is created with the intent to do harm to the computer 20. The malware 92 is the most common type of cybersecurity attack 22, mostly because this term encompasses many subsets such as ransomware, trojans, spyware, viruses, worms, keyloggers, bots, cryptojacking, and any other type of malware attack that leverages software in a malicious way. The cloud computing environment 74 safely detonates any of these different types of malware 92. The cloud computing environment 74 (such as the cloud server 78) may then generate different cybersecurity attack feature vectors 62a-N that target the different types of malware 92. The cloud computing environment 74 may then deploy a malware attack vector package 94 to clients in the field (such as the cybersecurity detection agent 26). The malware attack vector package 94 contains, references, or specifies the cybersecurity attack feature vectors 62a-N targeting the different types of malware 92. The cybersecurity detection agent 26 loads the malware attack vector package 94, generates the corresponding event behavior feature vector(s) 60, and conducts the similarity analysis 64. The cybersecurity detection agent 26 may thus detect different malware cybersecurity attacks 22.

Figure 8:
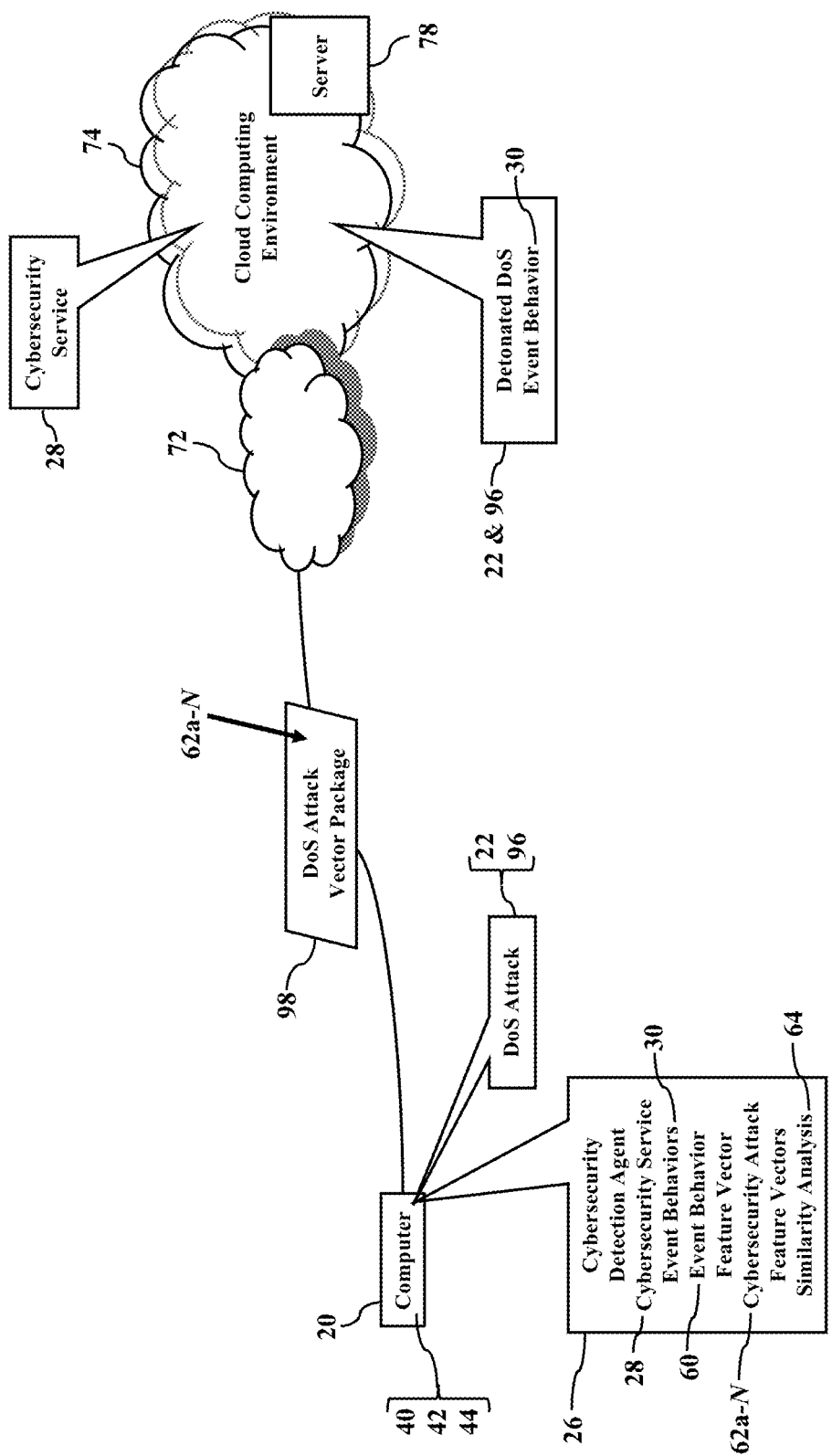

FIG. 8 illustrates more examples of targeted cybersecurity attack detections. Denial-of-Service (or DOS) attacks 96 are another common form of the cybersecurity attack 22. A Denial-of-Service attack 96 is a malicious, targeted attack that floods a network with false requests in order to disrupt computer operations. The cloud computing environment 74 safely detonates any of these DOS attacks 96 and generates different cybersecurity attack feature vectors 62 that target the different types of DOS attacks 96. The cloud computing environment 74 may then deploy a DOS attack vector package 98 to clients in the field (such as the cybersecurity detection agent 26). The DOS attack vector package 98 contains, references, or specifies the cybersecurity attack feature vectors 62 targeting the different types of the DOS attacks 96. The cybersecurity detection agent 26 loads the DOS attack vector package 98, generates the corresponding event behavior feature vector(s) 60, and conducts the similarity analysis 64. The cybersecurity detection agent 26 may thus detect different DOS attacks 96.

Figure 9:
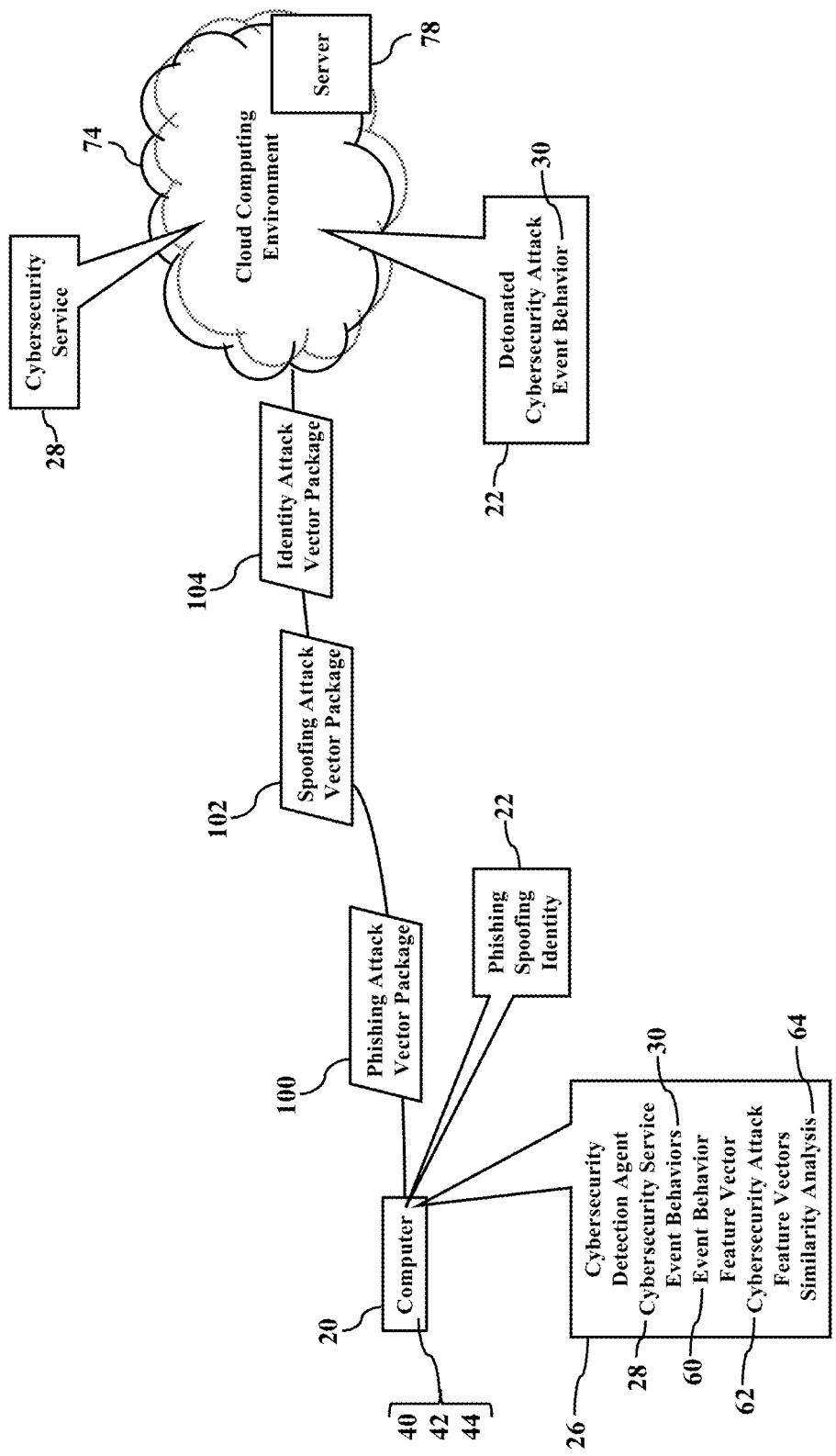

FIG. 9 illustrates examples of still more vector packages. Phishing attacks 22 use email, SMS, phone, social media, and social engineering techniques to entice a victim to share sensitive information—such as passwords or account numbers—or to download a malicious file that will install viruses on their computer or phone. The cloud computing environment 74 safely detonates many different phishing attacks 22 and may deploy a phishing attack vector package 100 to clients in the field (such as the cybersecurity detection agent 26). The phishing attack vector package 100 specifies the cybersecurity attack feature vectors 60 (illustrated in FIGS. 2-8) targeting the different types of the phishing attacks 22. The cloud computing environment 74 may also generate a spoofing attack vector package 102 that targets different spoofing attacks and an identity-based attack vector package 104 that targets different identity-driven attacks. The cloud computing environment 74 may deploy any of the vector packages 100-104 to clients in the field (such as the cybersecurity detection agent 26). Indeed, the cloud computing environment 74 may deploy any amount of cybersecurity attack feature vectors 60 that target any cybersecurity attack 22. The cybersecurity service 28 may thus provide a full spectrum of cybersecurity detection.

Figure 10:
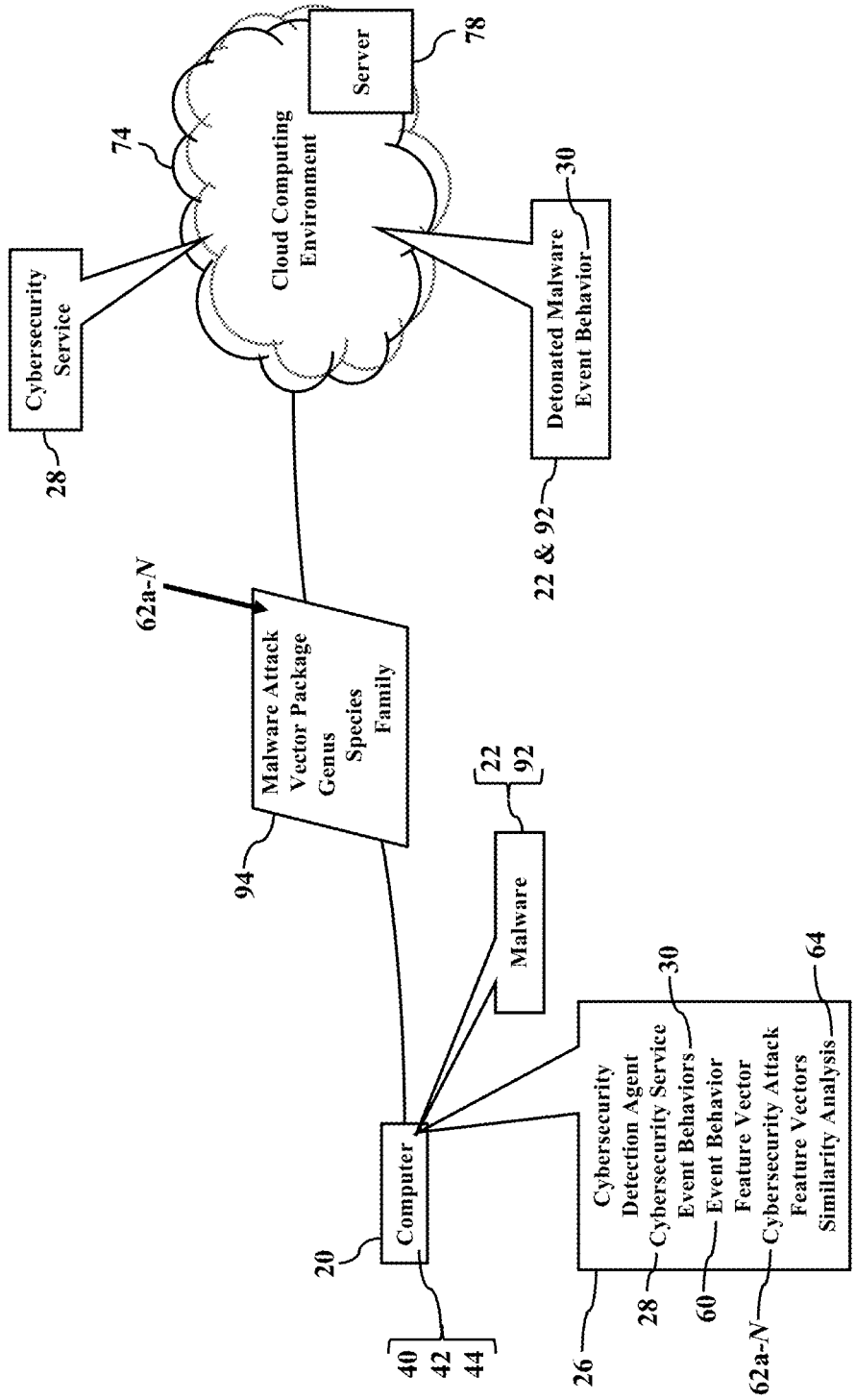
FIGS. 10-11 illustrate examples of nested vector packages.
Figure 11:
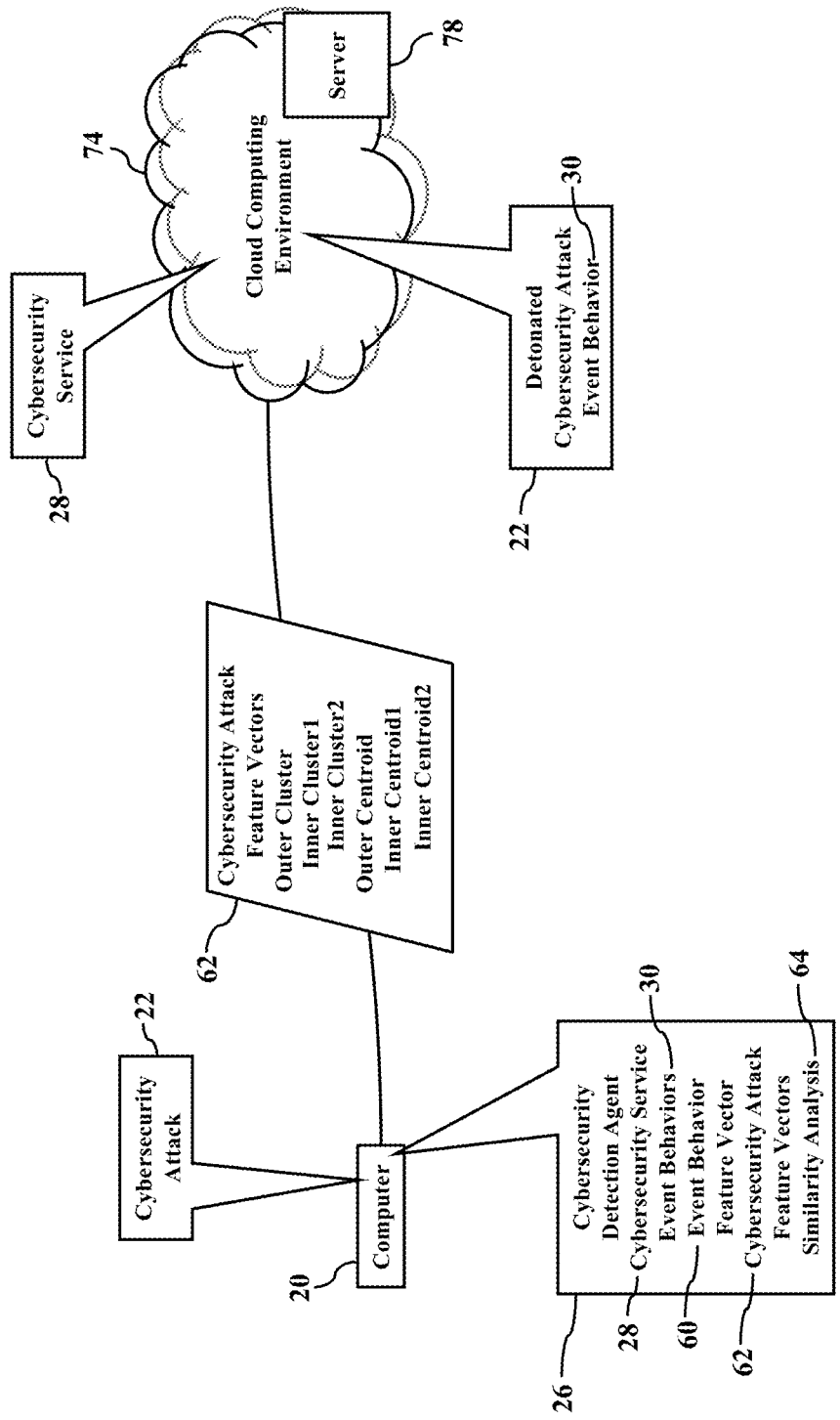

FIGS. 10-11 illustrate examples of nested vector packages. The cloud computing environment 74 (such as the cloud server 78) may generate nested cybersecurity attack feature vectors 62 that progressively target different types of cybersecurity attacks 22. Suppose, for example, that the malware attack vector package 94 specifies a genus of the cybersecurity attack feature vectors 62. The genus may represent event behaviors 30 that are common to, or associated with, some or all of the different malware 92 targeted by the malware attack vector package 94. The malware attack vector package 94 may then also specify different species and families of cybersecurity attack feature vectors 62. The malware attack vector package 94 may thus specify a rank or hierarchy of different malware classifications, thus allowing the cybersecurity detection agent 26 to target and to identify specific malware 92 exhibiting specific event behaviors 30. As the cybersecurity detection agent 26 monitors the local event behaviors 30 and extracts the event behavior feature vector 60, the cybersecurity detection agent 26 may progressively compare the locally-extracted event behavior feature vector 60 to the hierarchical cybersecurity attack feature vectors 62 specified by the malware attack vector package 94. That is, if the event behavior feature vector 60 satisfies the genus (perhaps according to the similarity analysis 64), then the cybersecurity detection agent 26 may next hierarchically compare the locally-extracted event behavior feature vector 60 to the species of the cybersecurity attack feature vector(s) 62. If the event behavior feature vector 60 satisfies any of the species, then the cybersecurity detection agent 26 may next hierarchically compare the locally-extracted event behavior feature vector 60 to the corresponding families of the cybersecurity attack feature vectors 62. The cybersecurity detection agent 26 may continue hierarchically comparing the locally-extracted event behavior feature vector 60 until a last cybersecurity attack feature vector 62 within the genus/species/family is satisfied, at which point the cybersecurity detection agent 26 has determined or identified the specific malware attack 22. The cybersecurity detection agent 26, in other words, has hierarchically zeroed in on the genus/species/family of malware attack 22 possibly infecting the computer 20. The cybersecurity detection agent 26 may initiate or implement the threat procedures 32 at any tier/level/point within this hierarchical decision-tree analysis. The cybersecurity detection agent 26 may also generate and send the attack notification 82 at any tier/level/point within this hierarchical decision-tree analysis.

The cybersecurity detection agent 26 may also report its hierarchical decision-tree analysis. When the computer 20 has network access, the cybersecurity detection agent 26 may instruct the computer 20 to notify the cloud computing environment 74 of the specific malware attack 22. The cybersecurity detection agent 26 may further notify the cloud computing environment 74 of the sequential series of the cybersecurity attack feature vectors 62 within the genus/species/family. The cybersecurity detection agent 26 and/or the cloud computing environment 74 may thus document its hierarchical decision-tree analysis.

FIG. 11 illustrates examples of clustered vectors. As the cloud computing environment 74 detonates many different cybersecurity attacks 22, the cloud computing environment 74 may comprehensively monitor their corresponding event behaviors 30. The cloud computing environment 74 may then use clustering and grouping techniques to categorize the event behaviors 30. The cloud computing environment 74 may then generate the cybersecurity attack feature vectors 62 that represent the different clusters and groups. The cloud server 78, for example, may generate the cybersecurity attack feature vectors 62 that represent outer clusters/groups and that also represent inner clusters/groups. When the cybersecurity detection agent 26 receives the cybersecurity attack feature vectors 62, the cybersecurity detection agent 26 may apply the similarity analysis 64 between the locally-extracted event behavior feature vector 60 and the cybersecurity attack feature vectors 62 that represent the different clusters and groups. The similarity analysis 64 may further determine distances or vector differences from the locally-extracted event behavior feature vector 60 and the cybersecurity attack feature vectors 62 that represent the different clusters and groups. The cybersecurity detection agent 26 may then compare the distances or vector differences to threshold radius, radii, or other threshold values to identify the cybersecurity attack 22.

FIG. 11 also illustrates examples of centroidal vectors. The cloud computing environment 74 may then use clustering and grouping techniques to categorize the event behaviors 30. The cloud computing environment 74 may determine centroids that correspond the different clusters and groups. The cloud computing environment 74 may then generate the cybersecurity attack feature vectors 62 that represent the centroids. The cloud server 78, for example, may generate the cybersecurity attack feature vectors 62 that represent outer centroids and that also represent inner centroids. When the cybersecurity detection agent 26 receives the cybersecurity attack feature vectors 62, the cybersecurity detection agent 26 may apply the similarity analysis 64 between the locally-extracted event behavior feature vector 60 and the cybersecurity attack feature vectors 62 that represent the different centroids. The similarity analysis 64 may further determine distances or vector differences from the locally-extracted event behavior feature vector 60 and the cybersecurity attack feature vectors 62 that represent the different centroids. The cybersecurity detection agent 26 may then compare the distances or vector differences to threshold radius, radii, or other threshold values to identify the cybersecurity attack 22. By analyzing the clusters and/or the centroids, the cybersecurity detection agent 26 determines/identifies the specific cybersecurity attack 22 infecting the computer 20.

FIGS. 12-15 illustrate examples of inline detection. Here the cybersecurity detection agent 26 may hold or lock any event behavior 30 for pre-execution approval. That is, the cybersecurity detection agent 26 may cooperate with the operating system 42 to implement one or more event holds 110. Each event hold 110 specifies one or more event behaviors 30 (such as hardware and software events, messages, or activities) that neither the operating system 42 nor the software application 48 (such as the cybersecurity attack 22) may execute or otherwise process absent an event approval 112 from the cybersecurity service 28. Each event hold 110 may be a logical statement or rule that specifies a source, an event behavior 30, and/or a condition (such as if an executable .exe file not whitelisted, then suspend for the event approval 112). So, as the operating system 42 loads or processes any event behavior 30, the operating system 42 may compare the event behavior 30 to the one or more event holds 110. If the operating system 42 determines that the event behavior 30 matches, satisfies, or corresponds to any event hold 110, the operating system 42 may implement and execute an operational suspend 114 that suspends processing of the event behavior 30 according to the event hold 110. The operating system 42 may notify the local cybersecurity detection agent 26 of the event hold 110 and await the event approval 112.

Figure 13:
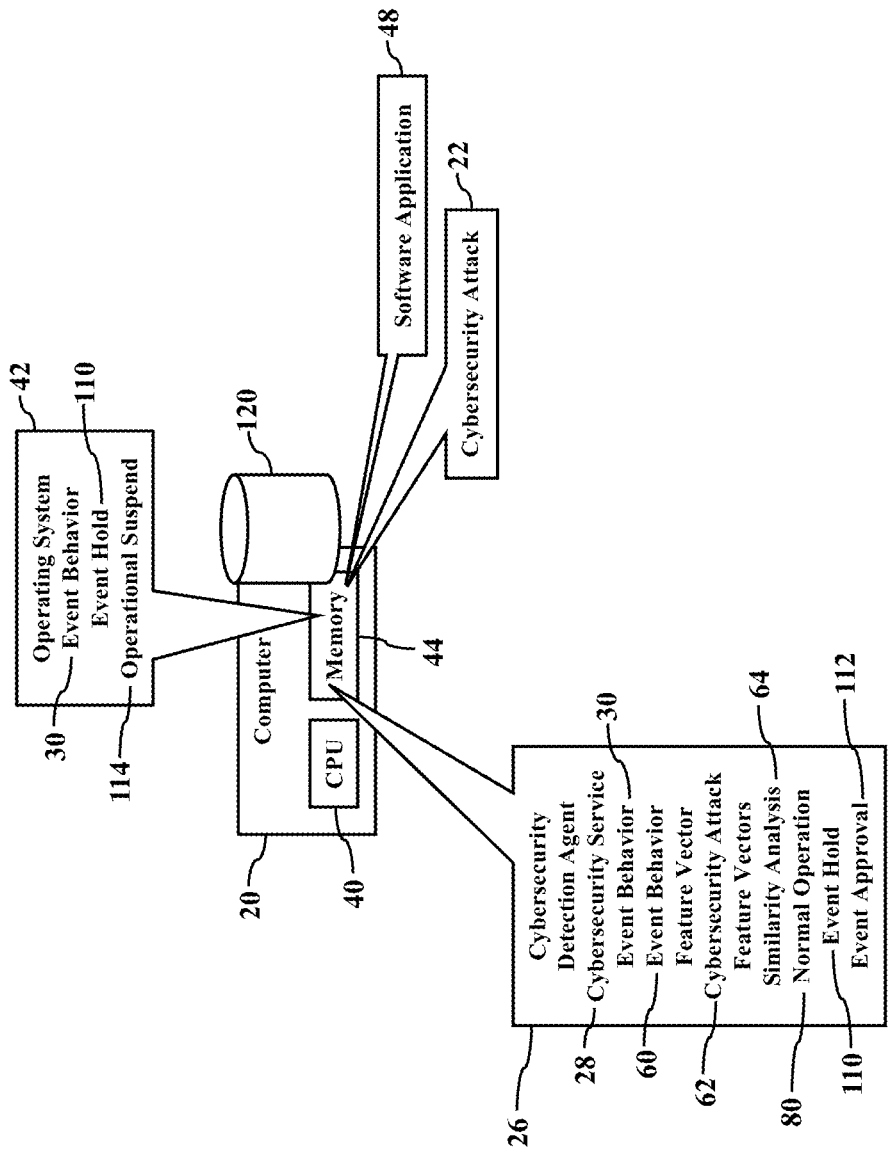

As FIG. 13 illustrates, in this example, the cybersecurity detection agent 26 may autonomously grant the event approval 112. When the operating system 42 implements the operational suspend 114, the operating system 42 may notify the cybersecurity detection agent 26. The operating system 42 alerts the cybersecurity detection agent 26 that some event behavior 30 equals, matches, or otherwise satisfies the event hold 110. The operating system 42 enters the operational suspend 114 and may query for the event approval 112. The operating system 42, in other words, may alert the cybersecurity detection agent 26 of suspicious or targeted event behaviors 30, as defined or specified by the event hold 110. The operating system 42, for example, may send suspicious/current event behaviors 30 to the cybersecurity detection agent 26. The cybersecurity detection agent 26 may additionally or alternatively retrieve historical event behavior 30 from a log (such as the event channel 50, the event log file 52, the trace file 54, and/or the real-time event tracing session 56 as illustrated in FIG. 2). The cybersecurity detection agent 26 may then be configured or permitted to autonomously grant, or deny, the event approval 112. The cybersecurity detection agent 26, for example, may generate the event behavior feature vector 60 based on, or using, the current and/or historical event behaviors 30. The cybersecurity detection agent 26 may then compare the locally-extracted event behavior feature vector 60 to a library or database 120 of the cybersecurity attack feature vectors 62. The cybersecurity detection agent 26 may thus locally store a collection of the different cybersecurity attack feature vectors 62 to the local memory device 44. If the event behavior feature vector 60 is dissimilar to the database entries referenced by the library or database 120 (e.g., perhaps according to the similarity analysis 64), then the cybersecurity detection agent 26 may determine that the event behaviors 30 do not exhibit evidence of any locally-defined cybersecurity attack 22. The cybersecurity detection agent 26 may thus classify the event behaviors 30 as the safe or normal operation 80 and autonomously grant the event approval 112. The cybersecurity detection agent 26 may thus generate and send a message or other notification to the operating system 42 that authorizes a release of the operational suspend 114, thus allowing the operating system 42 to resume processing of the event behaviors 30.

Figure 14:
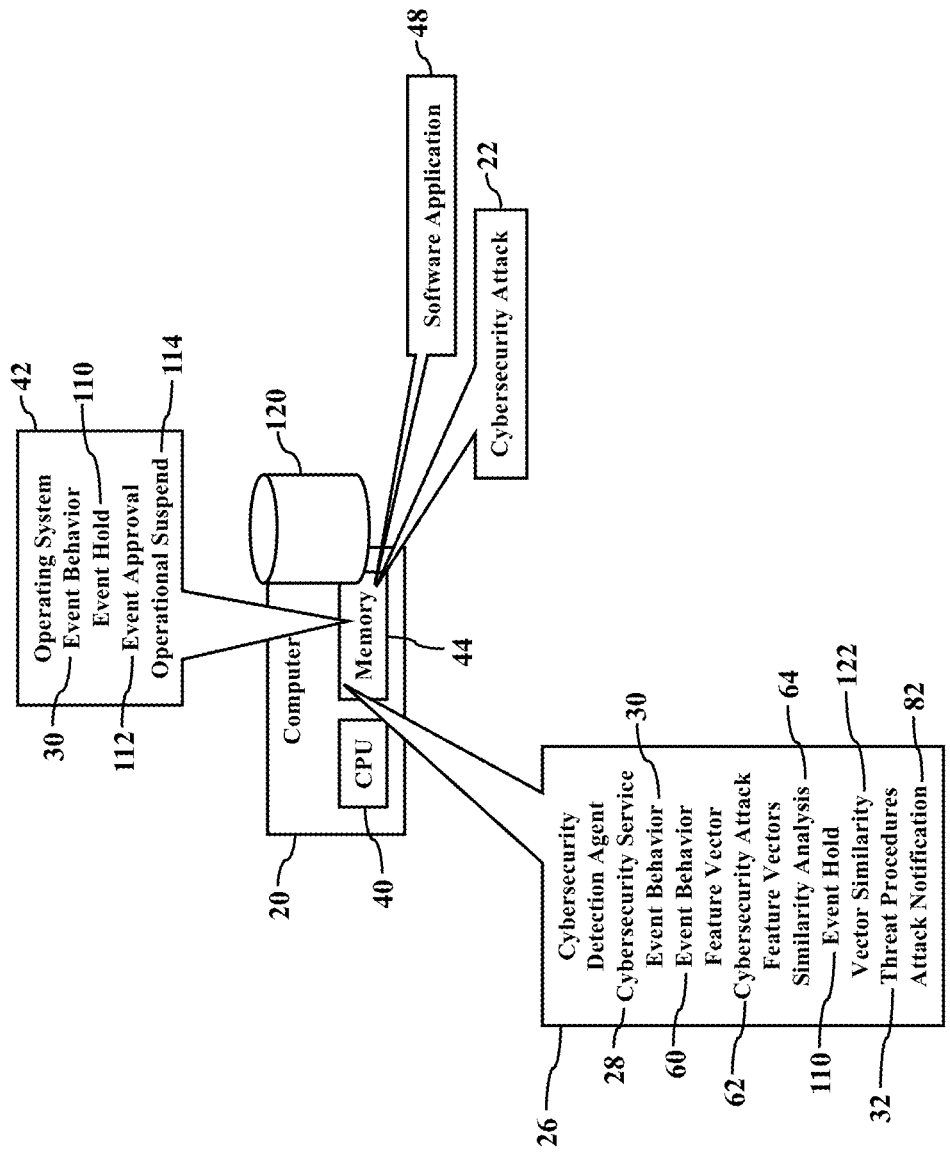

As FIG. 14 illustrates, though, the cybersecurity detection agent 26 may determine vector similarity 122. When the cybersecurity detection agent 26 compares the locally-extracted event behavior feature vector 60 to the library or database 120 of the cybersecurity attack feature vectors 62, the cybersecurity detection agent 26 may determine the vector similarity 122. That is, the event behavior feature vector 60 is similar to the cybersecurity attack feature vector 62 (e.g., perhaps according to the similarity analysis 64). When the cybersecurity detection agent 26 determines the vector similarity 122, the cybersecurity detection agent 26 may deny the event approval 112 (illustrated in FIG. 13). The cybersecurity detection agent 26, instead, may generate and send a message or other notification to the operating system 42 that denies the event approval 112. The cybersecurity detection agent 26 may initiate or implement the notification/quarantine/isolation/halt or other threat procedures 32. The cybersecurity detection agent 26 may further instruct or cause the operating system 42 to halt, terminate, segregate, isolate, or discard the current event behavior(s) 30 that triggered the event hold 110. The cybersecurity detection agent 26 may further generate and send the attack notification 82.

Figure 12:
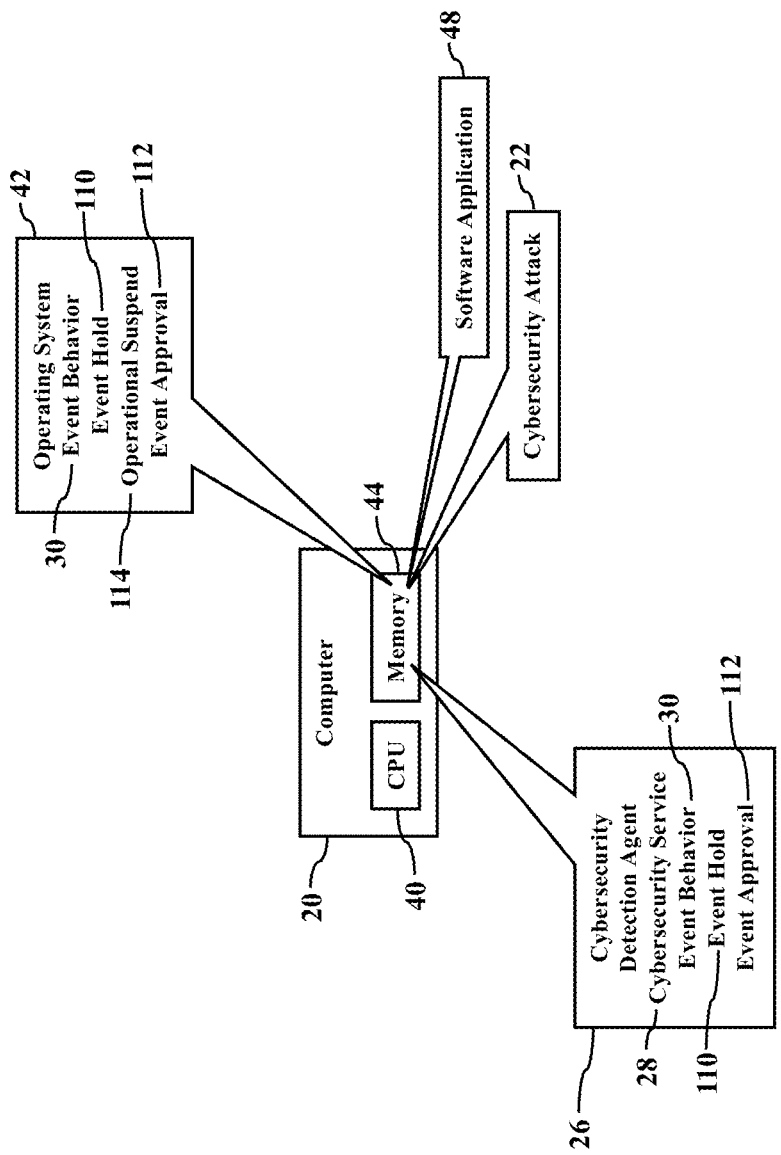
FIGS. 12-15 illustrate examples of inline detection.

Endpoint inline detection is thus efficient and network independent. As FIGS. 12-14 illustrate, the computer 20 (and thus the cybersecurity detection agent 26) need not have constant Internet access. The cybersecurity detection agent 26 provides fast, simple, and accurate offline protection against the cybersecurity attacks 22. The cybersecurity detection agent 26 merely needs local access to the cybersecurity attack feature vectors 62. The cybersecurity detection agent 26 only needs an occasional, intermittent, or periodic (e.g., hourly, daily, or other timing) Internet connection to receive the cybersecurity attack feature vectors 62. The cybersecurity service 28 may thus quickly evaluate any suspicious event behavior 30 within perhaps a few seconds. The cybersecurity service 28, in other words, is fast enough to hold any hardware/software operation without objectionable time/performance hang-ups or user notice. The cybersecurity service 28 also need not query the cloud computing environment 74 nor send suspicious data to the cloud computing environment 74. The cybersecurity detection agent 26 need merely be locally armed with the cybersecurity attack feature vectors 62. The operating system 42 and the cybersecurity detection agent 26 interface to provide an offline, inline cybersecurity service 28 that holds and analyzes suspicious hardware and software operations. Remote, slow, deadlocked network communications may be avoided without sacrificing the comprehensive cybersecurity service 28. The cybersecurity detection agent 26 thus empowers the computer 20 to operate independently of cloud or other sources and to make informed decisions. The cybersecurity detection agent 26 may autonomously block any operation. The cybersecurity detection agent 26, however, may also autonomously query the cloud computing environment 74 for assistance (such as, for example, when the cybersecurity attack feature vectors 62 have a stale date or when the library or database 120 lacks a timely update).

Again, then, the cybersecurity detection agent 26 improves computer functioning. The cybersecurity detection agent 26 may autonomously approve, or deny, the event behaviors 30 without a constant, active network connection. The cybersecurity detection agent 26 merely performed a database lookup and comparison (e.g., perhaps according to the similarity analysis 64). The cybersecurity detection agent 26 protected the computer 20 without requiring an active/available/online Internet connection. The cybersecurity detection agent 26, in other words, provides the cybersecurity service 28 while offline. The cybersecurity detection agent 26 only needs an intermittent or periodic (e.g., hourly, daily, or other timing) Internet connection to receive vector updates to the library or database 120 of the cybersecurity attack feature vectors 62. The local database lookup and comparison solution thus provides a much faster response time, as no remote network communication is required. Cloud-based services are greatly reduced, network bandwidth is greatly reduced, and network traffic is greatly reduced. The cybersecurity detection agent 26 may thus be a predominantly local cybersecurity service 28.

Figure 15:
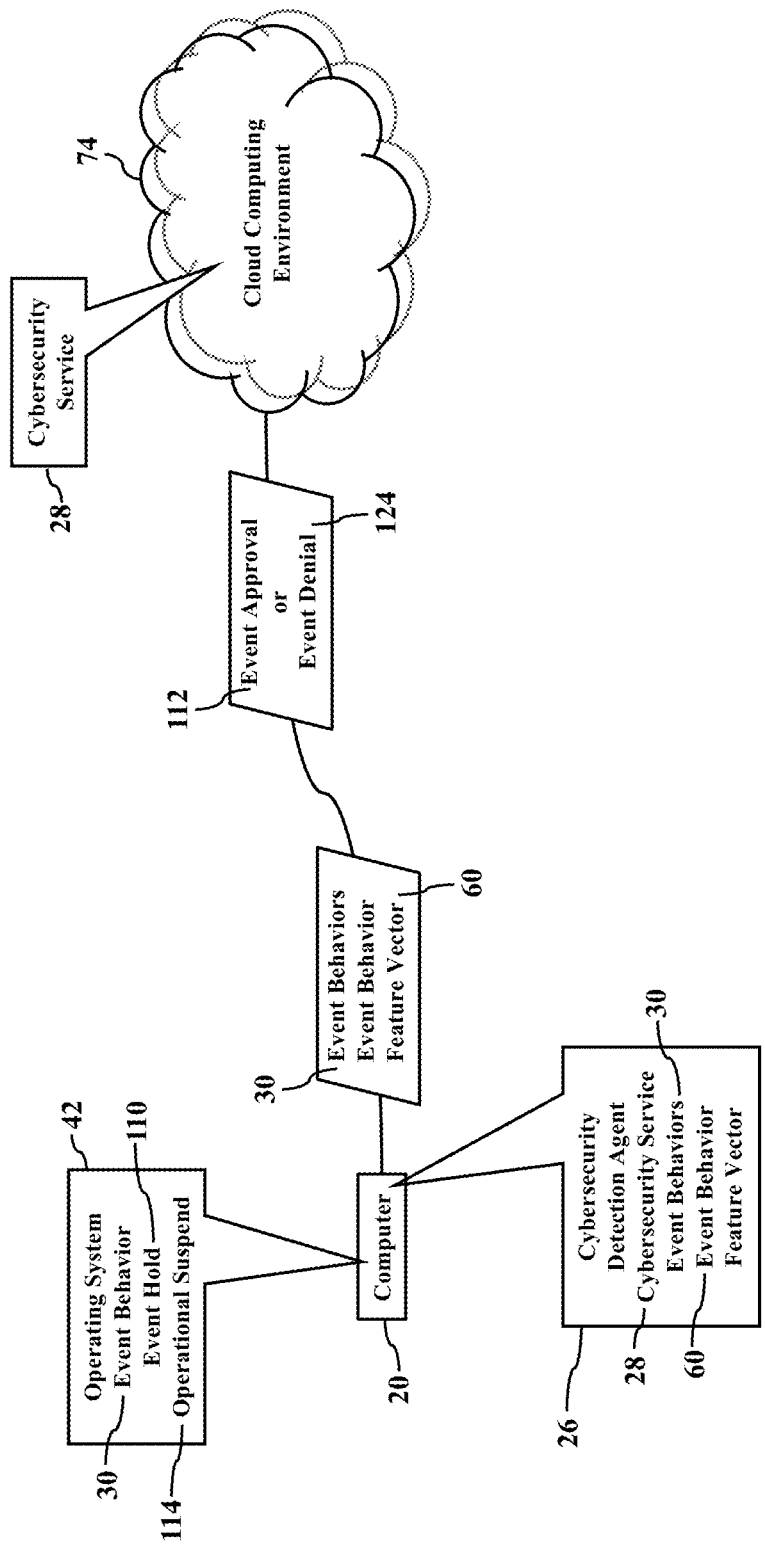

As FIG. 15 illustrates, though, in this example the cybersecurity detection agent 26 may seek cloud assistance. When the operating system 42 implements the operational suspend 114, the operating system 42 may notify the cybersecurity detection agent 26. In this example, the cybersecurity detection agent 26 may be configured to await approval or denial from the cloud computing environment 74. When the operating system 42 alerts the cybersecurity detection agent 26 that some event behavior 30 satisfies the event hold 110, the operating system 42 may implement the operational suspend 114. The operating system 42 may also send suspicious/current event behaviors 30 to the cybersecurity detection agent 26. The cybersecurity detection agent 26 may additionally or alternatively retrieve historical event behavior 30 from a log (such as the event channel 50, the event log file 52, the trace file 54, and/or the real-time event tracing session 56 as illustrated in FIG. 2). The cybersecurity detection agent 26 may then upload the suspicious/current and historical event behavior 30 to the cloud computing environment 74 for analysis. The cybersecurity detection agent 26 may additionally or alternatively locally generate the event behavior feature vector 60 (based on, or using, the current and/or historical event behaviors 30) and upload the event behavior feature vector 60 to the cloud computing environment 74 for analysis. The cybersecurity detection agent 26 may then await a result or response of the cloud analysis. If the cybersecurity detection agent 26 receives a message indicating the event approval 112, then the cloud computing environment 74 determined that the event behaviors 30 and/or the event behavior feature vector 60 exhibited no evidence of the cybersecurity attack 22. The cybersecurity detection agent 26 generate and send a message or other notification to the operating system 42 that grants or specifies the event approval 112. When, however, the cloud computing environment 74 determines evidence of the cybersecurity attack 22, the cybersecurity detection agent 26 receives a message indicating an event denial 124. The cybersecurity detection agent 26 may thus generate and send a message or other notification to the operating system 42 that specifies the event denial 124. The cybersecurity detection agent 26 may initiate or implement the notification/quarantine/isolation/halt or other threat procedures 32. The cybersecurity detection agent 26 may further instruct or cause the operating system 42 to halt, terminate, segregate, or discard the current event behavior(s) 30 that triggered the event hold 110.

Figure 16:
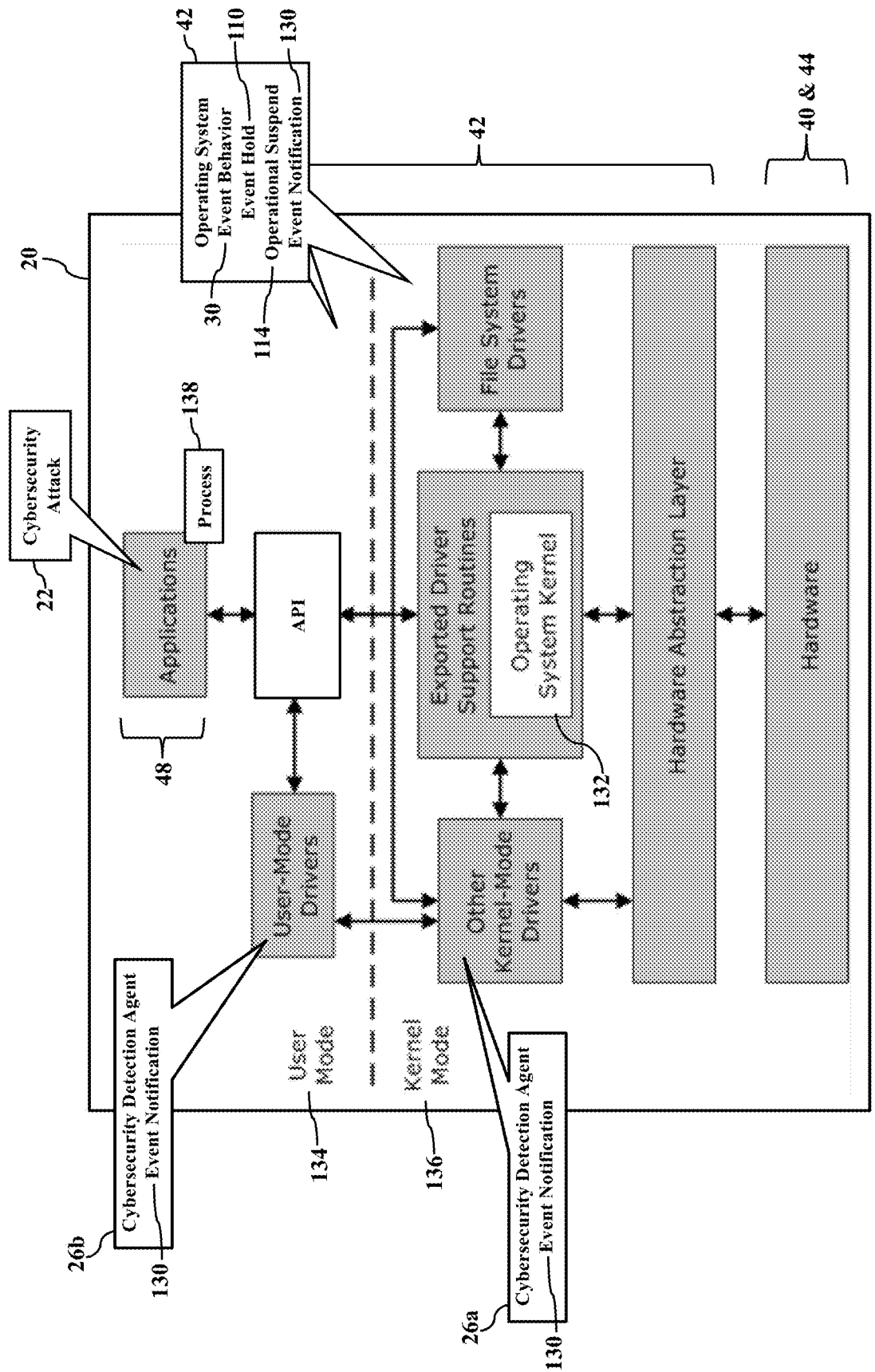
FIGS. 16-17 illustrate examples of event notifications.
Figure 17:
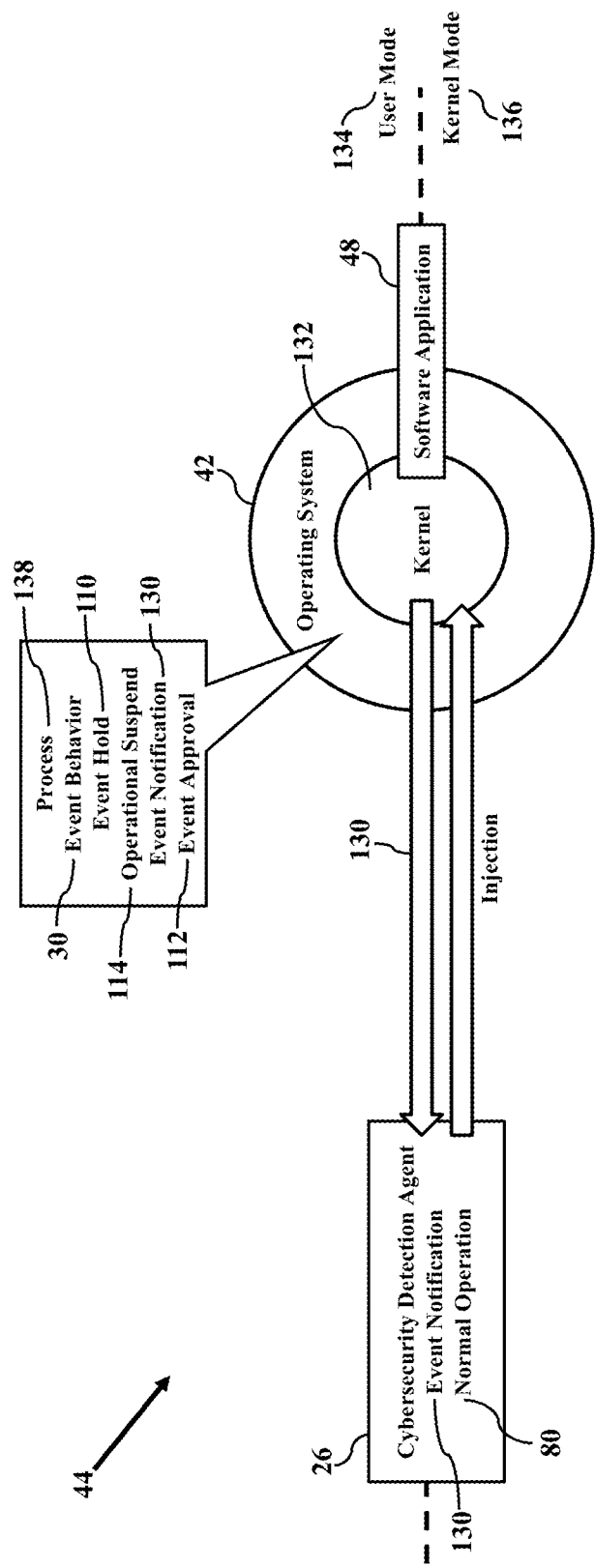

FIGS. 16-17 illustrate examples of event notifications 130. When the operating system 42 implements the operational suspend 114, the operating system 42 may notify the cybersecurity detection agent 26. The operating system 42 alerts the cybersecurity detection agent 26 that some event behavior 30 satisfies the event hold 110. As FIG. 16 illustrates, the operating system 42 and the cybersecurity detection agent 26 may cooperate to establish event notifications 130 of the event hold 110 and/or the operational suspend 114. The event notifications 130 may be generated by and sent from the operating system 42 to the cybersecurity detection agent 26. The event notifications 130 may be implemented regardless of processor mode of operation. A kernel 132 of the operating system 42 controls utilization and access to the hardware resources 40 and 44. The hardware processor 40 thus has a kernel mode 134 and a user mode 136, and the hardware processor 40 switches between these two modes 134 and 136 depending on what type of code is running on the hardware processor 40. The kernel 132 of the operating system 42, for example, loads and runs in the kernel mode 134 that provides a protected kernel space or portion of the memory device 44. The software applications 48 store and execute from a user space of the memory device 44 associated with the user mode 136. When any user-mode software application 48 starts, launches, or initiates (such as the potential cybersecurity attack 22), the operating system 42 creates a process 138 that corresponds to opening/initiating/selecting/invocating/running the potential cybersecurity attack 22. While FIG. 16 illustrates the process 138 associated with the user mode 136, the process 138 may additionally or alternatively be associated with the kernel mode 134. The kernel 132 allocates a private space in the memory device 44 that is dedicated to the process 138.

The cybersecurity detection agent 26 interfaces with the operating system 42. The cybersecurity detection agent 26 may have kernel-mode components 26a having kernel-level permissions to the kernel mode 134. The cybersecurity detection agent 26 may also have user-mode components 26b in the user mode 136. The cybersecurity detection agent 26 may load before the operating system 42, perhaps very early in the boot-time of the client/endpoint computer 20. The cybersecurity detection agent 26 may thus be installed as a kernel-level driver and may be received from the cloud computing environment 74 (illustrated in FIGS. 1-3). Because the cybersecurity detection agent 26 may have the kernel-mode components 26a having kernel-level permissions to the kernel mode 134, the cybersecurity detection agent 26 has kernel-level permissions to establish the event notifications 130 from the operating system 42 and/or from any software application 48. The cybersecurity detection agent 26 may thus instrument, monitor, and/or intercept any event behaviors 30 (such as events, messages, function calls, system calls, or any other activities) in the kernel mode 134. Moreover, because the cybersecurity detection agent 26 may also have the user-mode components 26b, the cybersecurity detection agent 26 may also instrument, monitor, and/or intercept any event behaviors 30 (such as events, messages, function calls, system calls, APIs, or any other activities) in the user mode 136.

The cybersecurity detection agent 26 may receive the event notifications 130. The event notifications 130 may be associated with drivers, event monitors, and/or threads monitoring log files or memory locations. The event notifications 130 may also be associated with software functional hooks that instrument, monitor, and/or intercept event behaviors 30. The event notifications 130 document and/or alert of suspicious/targeted event behaviors 30 (such as messages, input/output requests, system calls, reads/writes, opens, launches). When any suspicious/targeted event behaviors 30 occurs, the operating system 42 may generate and send the event notification 130 to the cybersecurity detection agent 26. The event notification 130 thus alerts the cybersecurity detection agent 26 of the event behaviors 30 triggering the event hold 110 occurring at the host client/endpoint computer 20.

FIG. 17 further illustrates examples of the event notifications 130. The memory device 44 stores the operating system 42, the software application(s) 48, and the cybersecurity detection agent 26. The cybersecurity detection agent 26 interfaces or registers with the operating system 42 and/or the software application(s) 48 for kernel-level event notification(s) 130 from the kernel 132. For example, the kernel-level event notification 132 alerts the cybersecurity detection agent 26 to the event behavior 30 created or processed by the kernel 132 and/or by the software application 38 (e.g., creation, thread creation, handle requests, image loading, and other defined conditions). So, when the operating system 42 creates, starts, or processes any event behavior 30, the kernel 132 may send or issue the kernel-level event notification 130 to the cybersecurity detection agent 26. As a simple example, when the operating system 42 creates/starts/loads any process 138, the kernel 132 may notify the cybersecurity detection agent 26 of any filename (or other unique identifier) associated with the process 138 and/or with the corresponding software application 48. The cybersecurity detection agent 26 may compare the filename to a whitelist of known, safe files. If the filename matches an entry in the whitelist, then the cybersecurity detection agent 26 may determine that the process 138 is the safe or normal operation 80 and grant the event approval 112. However, if the filename fails to match any entry in the whitelist, then the cybersecurity detection agent 26 may instruct or cause the operating system 42 to implement the operational suspend 114. Because the cybersecurity detection agent 26 may be implemented as a driver having kernel-level permissions, the cybersecurity detection agent 26 may have kernel-level permissions to suspend operations of any hardware/software resource. The cybersecurity detection agent 26 may further have kernel-level permissions to inject program code into the process 138 (such as program code representing the event hold 110). The cybersecurity detection agent 26 may also commence local detection or remote analysis (as explained with reference to FIGS. 12-15).

The cybersecurity service 28 thus provides a nimble and effective EDR solution. The cybersecurity detection agent 26 may be downloaded and installed to any server, switch, router, endpoint device, or any other computer 20. The cybersecurity detection agent 26 continuously monitors any computer 20 to detect and to respond to the cybersecurity attacks 22. The cybersecurity detection agent 26 monitors for, detects, and blocks suspicious real time event behaviors 30, based on the cybersecurity attack feature vectors 62. The cybersecurity detection agent 26 monitors individual event behaviors 30, and sequences of the event behaviors 30, without the need for continuous Internet access and repeated cloud queries. The cybersecurity detection agent 26 detects evidence of the cybersecurity attack 22 while offline. The cybersecurity detection agent 26 may even be configured with an update timing parameter to periodically (e.g., hourly or daily) revive/establish an Internet connection for updates to the cybersecurity attack feature vector(s) 62. The cybersecurity detection agent 26 is thus a predominantly offline and local endpoint detection and response (EDR) solution that need only intermittently, randomly, or periodically report to the cloud computing environment 74.

The cybersecurity detection agent 26 may also integrate with an XDR solution. Extended detection and response (XDR) collects threat data from siloed security tools across an organization's technology stack. The cybersecurity detection agent 26, when online, may upload security telemetry data from any host computer 20 (e.g., servers, cloud workloads, and endpoint devices). Any data uploaded from the cybersecurity detection agent 26 may then be unified/merged with other data collected from other platforms, perhaps filtered and condensed into a single console.

Figure 18A:
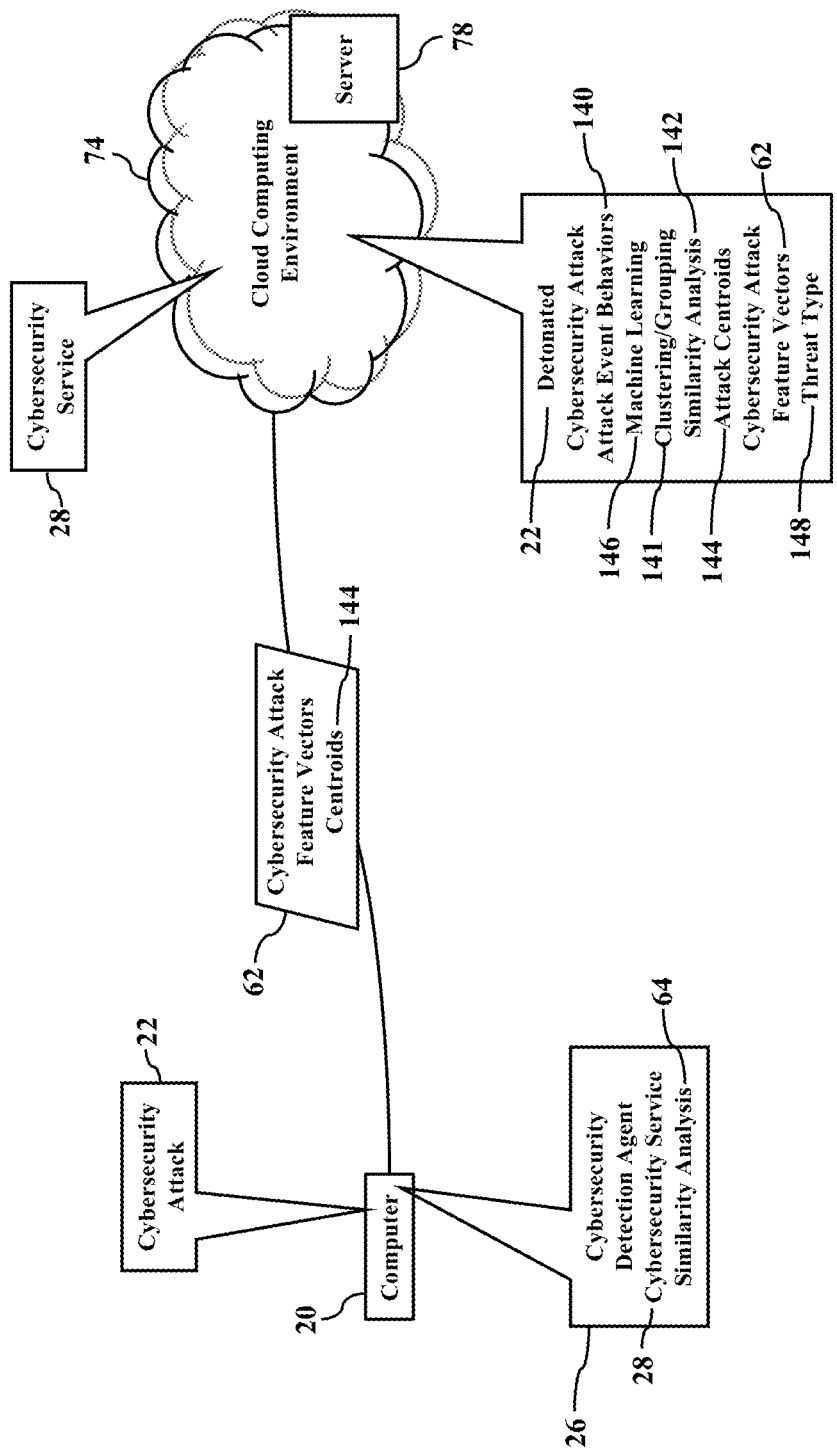
FIGS. 18A-18C illustrate examples of cloud sourcing.
Figure 18B:
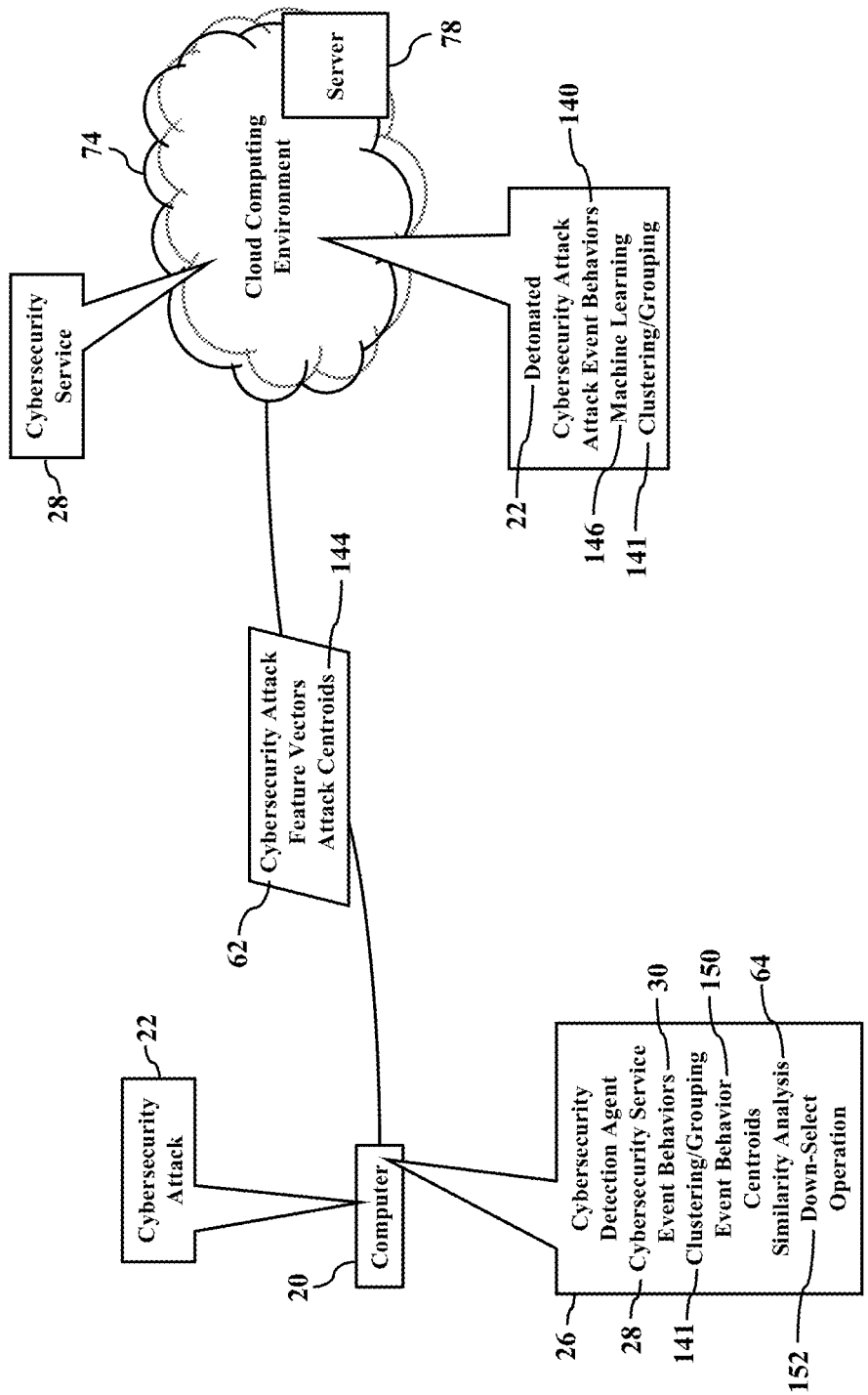
Figure 18C:
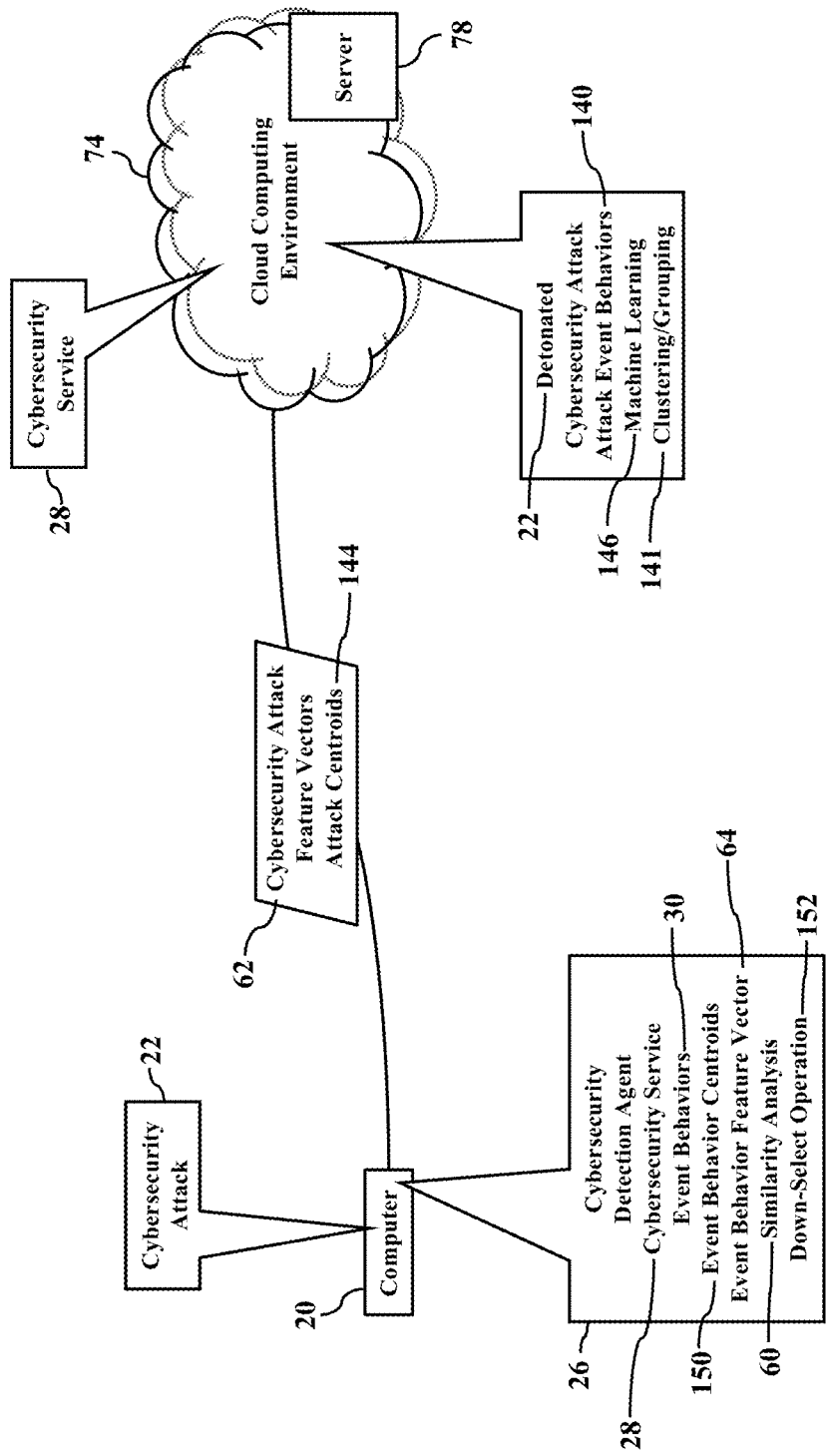

FIGS. 18A-18C illustrate examples of cloud sourcing. Because the cloud computing environment 74 detonates many different cybersecurity attacks 22, the cloud computing environment 74 may comprehensively monitor their corresponding attack event behaviors 140. The cloud computing environment 74 may then use any clustering and grouping techniques 141 to categorize the attack event behaviors 140 and to generate the cybersecurity attack feature vectors 62 that represent different clusters/groups. Indeed, the cloud computing environment 74 may use a cloud-based version of the similarity analysis (illustrated as reference numeral 142) for understanding when the attack event behaviors 140 are indicating a certain attack groupings 141 of malware and other cybersecurity attacks 22. But, in general, similarity assessments normally require comparison against large sets of feature values/vectors. Here, though, the cloud computing environment 74 (such as the cloud server 78) produces very small comparison sets using selective grouping and generation of attack centroids 144 from within any group. The cloud computing environment 74 may thus select groups to balance coverage and differentiation while maintaining a small comparison set. The attack groups 141 may be selected in two ways:
- using human knowledge to specify the groups and a representative set of members. An example of this is Threat Types grouping (which this disclosure will later discuss); and
- via unsupervised clustering, such as using k-means clustering and the so-called "elbow method."

The number of clusters 141 may be chosen to provide a balance of differentiation capabilities verses performance. A small number of clusters, such as with the Threat Types group (15 groups) will produce very fast similarity assessments when centroids from these groups are used as the comparison set. But, at this granularity, the attack groups 141 have issues with adjacency and overlap especially at lower similarity thresholds. Using unsupervised clustering, the number of resulting clusters may also be chosen. A higher count will produce clusters with less adjacency and overlap, though at a higher similarity assessment cost. Experimental testing has shown 400 clusters as providing optimal coverage. This number would yield a comparison set of 400 members, which may be small enough for a fast similarity analysis 64, depending on the application in the field. The number of members, however, may be configured and adjusted to improve similarity fidelity while governing performance impact.

As FIG. 18A illustrates, the cybersecurity service 28 may thus implement a small similarity analysis 64 and/or 142 using select the attack centroids 144 for fieldability. Using grouping, and from that centroid generation, a very small comparison can be produced, allowing for a field-deployable system (e.g., the cybersecurity detection agent 26) for the similarity analysis 64. Normally such systems are far too bulky and CPU-intensive to deploy in the field. The field sensor (e.g., the cybersecurity detection agent 26) may thus dramatically limit (or "down-select") what information is sent to the cloud computing environment 74, as the volume of information it collects on each endpoint may be far beyond what the cloud and cloud communications could accept from each endpoint. In normal course, this down-select would be done using rules (or "heuristics"). A very simple example would be: "only send to the cloud events from this list: process start and stop, file creation and deletion". In deployment the set of rules used by the Sensor encompasses more than this of course. But what if there are events and data with value that simple rules like above can't handle? That is, applying such a rule would result in too much data sent to the cloud. A rule that specifies that all file 'opened' events be clouded would be too voluminous. But knowing when a sample opens a file is useful. The cybersecurity service 28 may thus instruct the cybersecurity detection agent 26 to determine when clouded file open events would be sufficiently useful to warrant the added data volume. The cybersecurity service 28 may also instruct the cybersecurity detection agent 26 to successfully trim what file open events are clouded so that the majority of data sent is useful in detection of malicious activity at the cloud level. A more sophisticated set of rules is still too bulky. For the file open example, a rule could be added that only clouds file open events (after the fact) if the process writes to that open instance. That would trim the data vs clouding all file open events. But it would still be too much volume.

The cybersecurity service 28 thus implements a far more elegant and nimble solution. The cloud computing environment 74 (such as the cloud server 78) may associate the attack event behaviors 140 with a pattern of activity that could be determined at the endpoint (such as the computer 20). The cybersecurity detection agent 26 may thus make decisions to cloud more data that successfully only cloud data that will enable enhanced detections without unduly expanding the volume of data sent to the cloud. The cybersecurity service 28 may further determine that additional event clouding would enhance cross-system detections for XDR. By using clustering and similarity, the downloadable cybersecurity detection agent 26, the attack event behaviors 140, and/or the cybersecurity attack feature vectors 62 allow gauging on the endpoint when events and data the Sensor has observed (but not sent to the cloud) match against a corpus of events and data that indicate clouding a select set of additional data would be valuable. The cybersecurity service 28 further eliminates full machine learning 146 (model analysis) against the data in the endpoint, as this ML approach would be too heavy and burdensome. The cybersecurity service 28, instead, maintains machine learning 146 in the cloud. Even further, the cybersecurity service 28 targets cases where the analysis is bringing data from multiple systems together, to perform cross-system detections impossible on the endpoint. Doing the similarity check 64 on the endpoint would normally be prohibitively expensive compute-wise, impacting the customer systems noticeably. The core issue with such a check is the similarity comparison against a large set of comparison data, which takes too much compute capacity and needs too much memory on the endpoint to be sufficiently lightweight for normal field deployment. However, by using properly selected attack centroids 144, the comparison set may be radically reduced, allowing for field similarity analysis 64 without impacting the customer to an observable degree. The cloud computing environment 74 (such as the cloud server 78), instead, performs the cloud/backend analysis produces the set of centroids 144 for field use in similarity analysis 64 & 142. The list needs to be small and well-positioned to optimize additional event clouding to mitigate impact (not increase volume of clouded data unduly) while maximizing the effect of enhancing cloud-based detections of endpoint and XDR cross-system malicious activity.

The cybersecurity service 28 may thus generate the attack centroids 144. The cybersecurity service 28 examines representative current and historical collections of the entirety of Sensor data collected from the cybersecurity detection agent 26 operating in the field (not just what is clouded), such as through the cloud-detonated cybersecurity attacks 22. With this detonation examination, the cloud computing environment 74 may overlay results of applying machine learning models 146 to the subset of Sensor data that would be clouded from the same detonation and compare to machine learning 146 detection against the entirety of the Sensor data from that detonation. Cases may be noted when the detection against the entirety of Sensor data surpasses that using only the clouded data. The noted cases (where detection against the entirety of Sensor data surpassed detection against the clouded data) may then be used to generate the cluster/groups 140 and the centroids 144. The number of centroids 144 may be limited to stay within an established limit (such as 100) while maximizing centroid representation of the clusters. As a further step, feature ranking may be performed from within the set of the entirety of Sensor data from the detonations from the set where the ML using this data surpassed the clouded data ML. Feature ranking may be repeated to select the most optimal set of features to include in the expanded set of data to send to the cloud. The list of attack centroids 144 resulting from the prior step may be deployed to the field endpoints to use in down-selecting what additional Sensor data (such as the event behaviors 30) to send to the cloud. The output from the feature ranking and selection step is the set of additional event behaviors 30 and related data to cloud. This analysis may be repeated for endpoint-centered detections as well as cross-system detections for XDR application. Moreover, the analysis may be applied dynamically where a first pass determines there likely is additional Sensor event data worth clouding, at which point a secondary similarity comparison (against an expanded centroid set) would fine tune the determination to apply further down-select reduction of what will be clouded, further optimizing results while avoiding unneeded clouding of data.

As FIG. 18A also illustrates, the cybersecurity service 28 may collect and analyze threat type data 148. As the cybersecurity service 28 collects and analyzes the attack event behaviors 140, the cybersecurity service 28 may generate the cluster/groups 141 and the attack centroids 144 according to the threat type data 148. The cybersecurity service 28, in other words, may classify the attack event behaviors 140, the attack cluster/groups 140, and/or the attack centroids 144 according to the threat type data 148. Proactive malware detection (based on the event behavioral data) takes time and resources to manually locate the exact type of the threat and/or assign it to the adversary group. Threat type 148 refers to the classification or category of the threat, based on its characteristics and the type of harm it can cause. Threat type 148 basically describes what the malware does on the computer 20. For example, a virus is a threat type 148 that can replicate itself and spread to other computers, while a Trojan horse is a threat type 148 that appears legitimate but is actually malicious. There may be many (perhaps nearly 30) different types of malware and potentially unwanted applications. Understanding the correct threat type 148 is an important aspect of cybersecurity, as it allows the cybersecurity service 28 to take appropriate steps to protect customers from harm. Different threat types 148 require different approaches to protection and defense. By knowing the threat type 148, the cybersecurity service 28 can take appropriate measures to prevent or mitigate the threat, as well as understand the potential impact of the threat and the risks it poses to the computer 20. The threat type 148 also allows the cybersecurity service 28 to determine about how to respond to the threat and to prioritize security efforts accordingly.

The cybersecurity service 28 may thus automatically classifies a malicious sample to its threat type 148, based on the threat behavior (i.e. actions performed by the threat). Knowing the threat type 148 may also rank/score/prioritize the cybersecurity attack 22 depending on the potential impact and consequences of the threat (e.g. "Ransomware" threat type found on a machine has a different risk level than "Game Thief" or "Browser Modifier"). By knowing the threat type 148, the cybersecurity service 28 may also understand and assess the similarity between Threat Type groups, emergence of new groups, and a lack of information on disparity amongst members of these groups. The cybersecurity service 28 may also compare samples' behavior to these groups or other samples. These groups/clusters 141, of course, are applicable to traditional family name groups as well. Because new adversaries arise each year, the cybersecurity service 28 solves the problem of attribution of new threats to known adversaries (such as Fancy Bear, Wizard Spider, Deadeye Jackal, etc.). The cybersecurity service 28 provides excellent (golden) labeled data for known adversaries-which makes it simple to automate attribution of specific event behavior 30 to a specific threat actor or group.

The cybersecurity service 28 offers many usages. The cybersecurity service 28 provides the clustering/grouping 141 and the similarity analysis 64 & 142 support identification and retrieval of similar samples. Similar samples may have additional data already available (such as earlier historical analysis). The cybersecurity service 28 allows for group categorization from data (versus simply looking at malware names). Outputs may include set of groups and samples, with similarities for both. The cybersecurity service 28, in particular, may identify unknown samples (such as a new/ungrouped threat type 148 or attack event behaviors 140). The cybersecurity service 28 supports gauging how close samples are to each other (samples within a group may still vary quite a lot), The cybersecurity service 28 allows for more accurate determination a sample is a polymorphic variation, allowing for more accurate assessment of prevalence. The cybersecurity service 28 spots when new malware groups emerge and allows for analyzing trends. The cybersecurity service 28 supports attribution to actor and common components (kits) usage. The cybersecurity service 28 recognizes when a sample has replicated in sandbox detonation. The cybersecurity service 28 uses the behaviorally generated the attack centroids 144 in hybrid model deployed with the Sensor (e.g., the cybersecurity detection agent 26).

The cloud computing environment 74 may thus perform the machine learning 146, the clustering/grouping 141, and the similarity analysis 142. The cloud computing environment 74 assesses the detonated cybersecurity attacks 22 and provides pre-grouping 141 using the Threat Types 148 group data. The cloud computing environment 74 may implement attack family name groups (more reliable grouping—was observed that different family name groups often have samples with completely identical behavior). The cloud computing environment 74 may thus use VIRUSTOTAL® data. Pre-grouping provides more granular labelling for assessing efficacy and supports centroid generation. The cybersecurity attack feature vectors 62 may be built using Sensor pattern IDs collected via sandboxed cloud detonation.

Sensory down-selecting greatly improves computer functioning. Sensory down-selecting reduces the set of data to operate on. Sensory down-selecting winnows down the data to be sent from the cybersecurity detection agent 26 to the cloud-based cybersecurity service 28, to improve efficiency and scalability. The cybersecurity detection agent 26 sends to the cloud computing environment 74 (such as the cloud server 78) only a very small subset of the data available at the endpoint (such as the computer system 20). The data can be from event monitoring, static file scanning, or other sources. Using the centroid-driven approach to the similarity analysis 64 allows recognizing when the data representing the event behavior 30 received at the endpoint (e.g., the cybersecurity detection agent 26) indicates similarity within a larger set in the cloud. Doing so allows the cybersecurity detection agent 26 to take action, including determining whether additional data should be sent to the cloud or discarded, that is it supports down-selecting/limiting/capping what should be sent to the cloud. Sufficient similarity with the attack centroids 144 and thus the cloud set (such as the cybersecurity attack event behaviors 140 and/or the cybersecurity attack feature vectors 62) can indicate value in sending additional data to the cloud. This offers advantages over using a rules-based approach to determining what should be sent to the cloud. The centroid based similarity approach is more flexible, dynamic and readily trained, and does not require direct human involvement (as generation of rules normally does).

FIG. 18B illustrates examples of sensory down-selecting. The cloud computing environment 74 (such as the cloud server 78) generates the attack centroids 144 that represent the groupings 141 of the attack behavioral events 140 caused by different detonated cybersecurity attacks 22. The cloud computing environment 74 distributes/downloads/sends the attack centroids 144 to the cybersecurity detection agent 26 installed at/on the endpoint computer system 20. When the cybersecurity detection agent 26 receives the attack centroids 144, the cybersecurity detection agent 26 may compare the locally-generated event behaviors 30 to the cloud-generated attack centroids 144. The cybersecurity detection agent 26, for example, may apply the clustering/grouping techniques 141 to the event behaviors 30 and calculate or determine event behavior centroids 150. Each event behavior centroid 150 may represent a corresponding cluster/group 141 associated with the event behaviors 30. The cybersecurity detection agent 26 may apply the endpoint similarity analysis 64 to the attack centroids 144 and to the event behavior centroid 150. If any event behavior centroid 150 satisfies, or lies within a threshold radius of any attack centroid 144 according to the endpoint similarity analysis 64, then the cybersecurity detection agent 26 may execute a down-select operation 152 that limits which of the locally-generated event behaviors 30 are reported to the cloud computing environment 74. The down-select operation 152 thus includes programming or code that instructs the cybersecurity detection agent 26 to only select, collect, and/or upload/transfer only information associated with the event behaviors 30 to the cloud computing environment 74 (such as the cloud server 78) that are associated with the event behavior centroid 150 that is similar to a corresponding one of the attack centroids 144. The cybersecurity detection agent 26, in other words, confines cloud-reporting to only information/data related to the locally-generated event behaviors 30 associated with the event behavior centroid 150 (that is similar to a corresponding one of the attack centroids 144). The down-select operation 152 instructs the cybersecurity detection agent 26 to filter out, decline, or refrain from reporting any locally-generated event behaviors 30 whose event behavior centroid 150 is dissimilar to any of the attack centroids 144. That is, if any event behavior centroid 150 fails to satisfy, or lies outside the threshold radius of, any attack centroid 144 according to the endpoint similarity analysis 64, then the cybersecurity detection agent 26 may decline to upload/transfer those corresponding locally-generated event behaviors 30 to the cloud computing environment 74. Because the cybersecurity detection agent 26 may only send those relevant event behaviors 30 that satisfy the endpoint similarity analysis 64, the volume of clouded data (e.g., bits/bytes) is substantially reduced. Hardware processor and memory resources are greatly reduced, less electrical power is consumed, and less waste heat is generated. Moreover, network bandwidth and packet traffic are also greatly reduced.

FIG. 18C illustrates more examples of sensory down-selecting. The cloud computing environment 74 (such as the cloud server 78) uses the clustering and grouping techniques 141 to categorize the event behaviors 30 and to determine the attack centroids 144 that correspond the different clusters and groups 141. The cloud computing environment 74 may then generate the centroidal cybersecurity attack feature vectors 62 that represent the centroids 144. The cloud computing environment 74 may then distribute/download/send the centroidal cybersecurity attack feature vectors 62 to the cybersecurity detection agent 26 installed at/on the endpoint computer system 20. When the cybersecurity detection agent 26 receives the centroidal cybersecurity attack feature vectors 62, the cybersecurity detection agent 26 may compare the locally-generated centroidal event behavior feature vector 60 to the cloud-generated centroidal cybersecurity attack feature vectors 62. The cybersecurity detection agent 26, for example, may apply the clustering/grouping techniques 141 to the event behaviors 30 and calculate or determine the event behavior centroids 150. The cybersecurity detection agent 26 may then generate the centroidal event behavior feature vector 60 that represent the event behavior centroids 150. The cybersecurity detection agent 26 may apply the endpoint similarity analysis 64 to the centroidal cybersecurity attack feature vectors 62 and to the centroidal event behavior feature vector 60. If any centroidal event behavior feature vector 60 satisfies, or lies within a threshold value of, any centroidal cybersecurity attack feature vector 62 according to the endpoint similarity analysis 64, then the cybersecurity detection agent 26 may execute the down-select operation 152 that collects and uploads/transfers only those corresponding locally-generated event behaviors 30 to the cloud computing environment 74 (such as the cloud server 78). The cybersecurity detection agent 26, in other words, may filter out and only report the locally-generated event behaviors 30 whose event behavior feature vector 60 is similar to a corresponding one of the cybersecurity attack feature vector 62. The down-select operation 152 thus includes programming or code that instructs the cybersecurity detection agent 26 to decline to report any locally-generated event behaviors 30 whose corresponding event behavior feature vector 60 is dissimilar to any of the cybersecurity attack feature vector 62. That is, if any event behavior feature vector 60 fails to satisfy, or lies outside the threshold value of any cybersecurity attack feature vector 62 according to the endpoint similarity analysis 64, then the cybersecurity detection agent 26 may decline to upload/transfer those corresponding locally-generated event behaviors 30 to the cloud computing environment 74. Because the cybersecurity detection agent 26 may only send those event behaviors 30 that satisfy the endpoint similarity analysis 64, the volume of clouded data (e.g., bits/bytes) is substantially reduced. Hardware processor and memory resources are greatly reduced, less electrical power is consumed, and less waste heat is generated. Moreover, network bandwidth and packet traffic are also greatly reduced.

FIG. 19 illustrates examples of ARES® data. The ARES® data is behavioral data (microbehaviors and instance ids) from Sensors stored in the cloud from two sources: backend data (such as Intelligence X® Sandbox daily detonations) and field data (Detection Explainability event and EndOf-Process event). The cybersecurity attack feature vector 62 (illustrated in FIGS. 2-18) contains all patterns triggered for a given process, parent process and grandparent process combined (and their hits counts). The ARES® data provides high quality labeled data suitable for behavioral clustering, predictions, attribution and rules generation.

Figure 21:
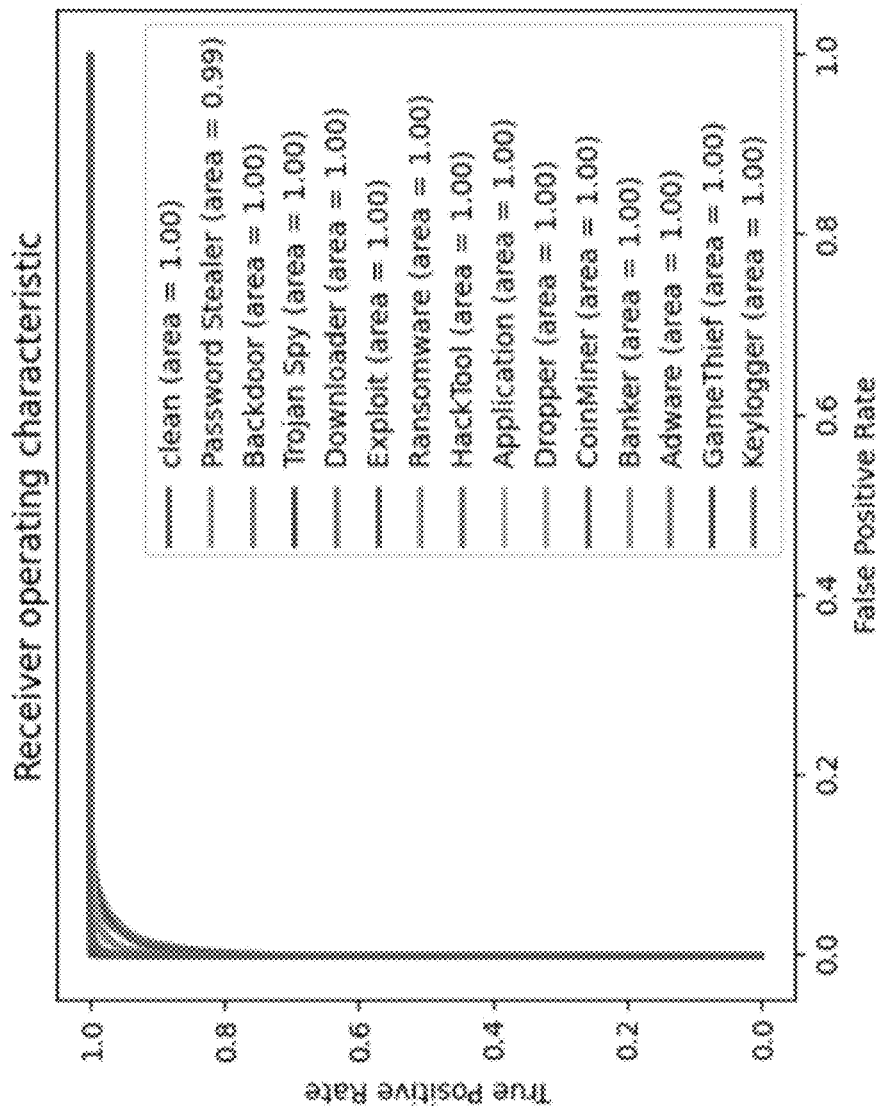
Figure 22:
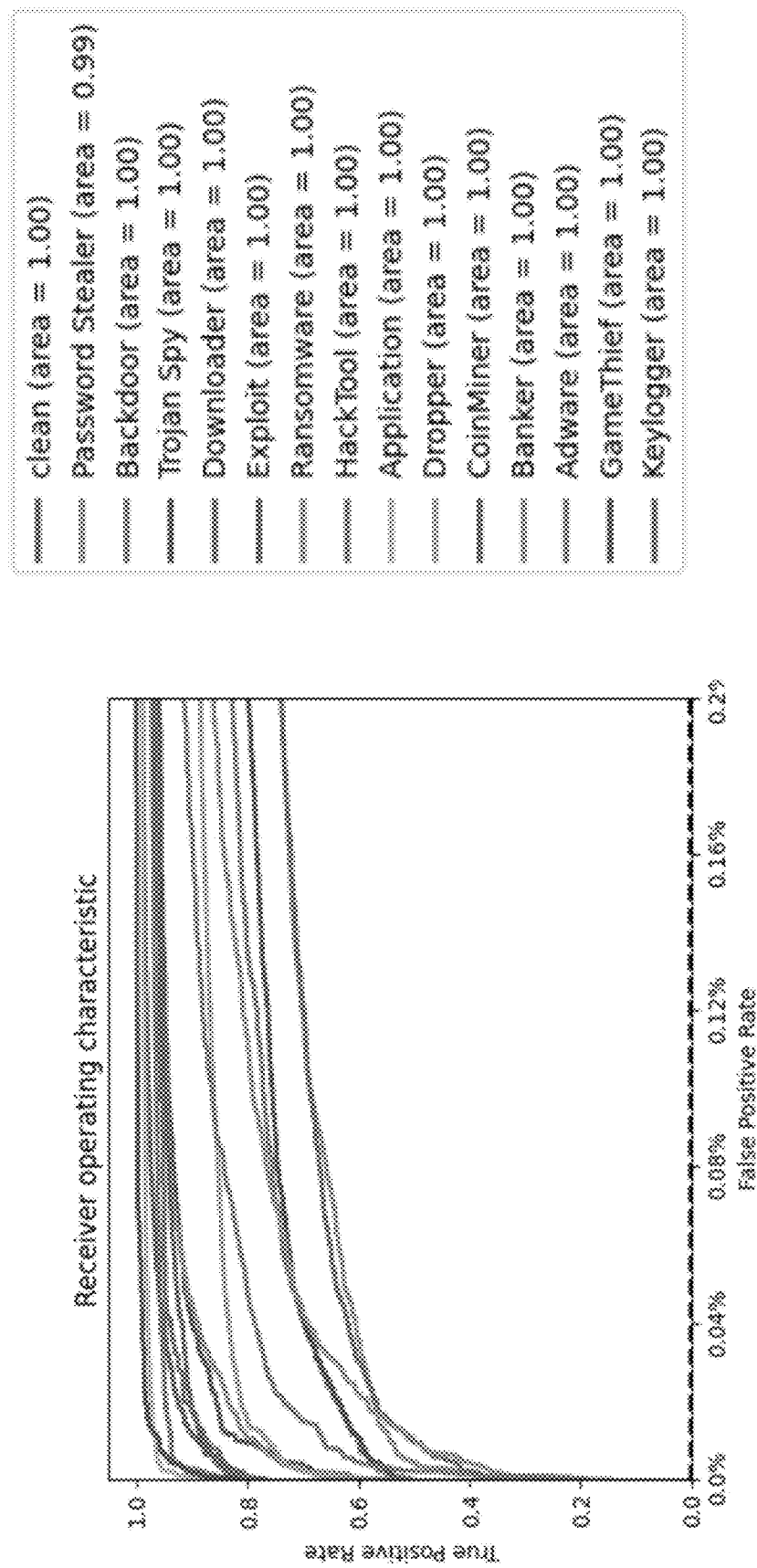
Figure 23:
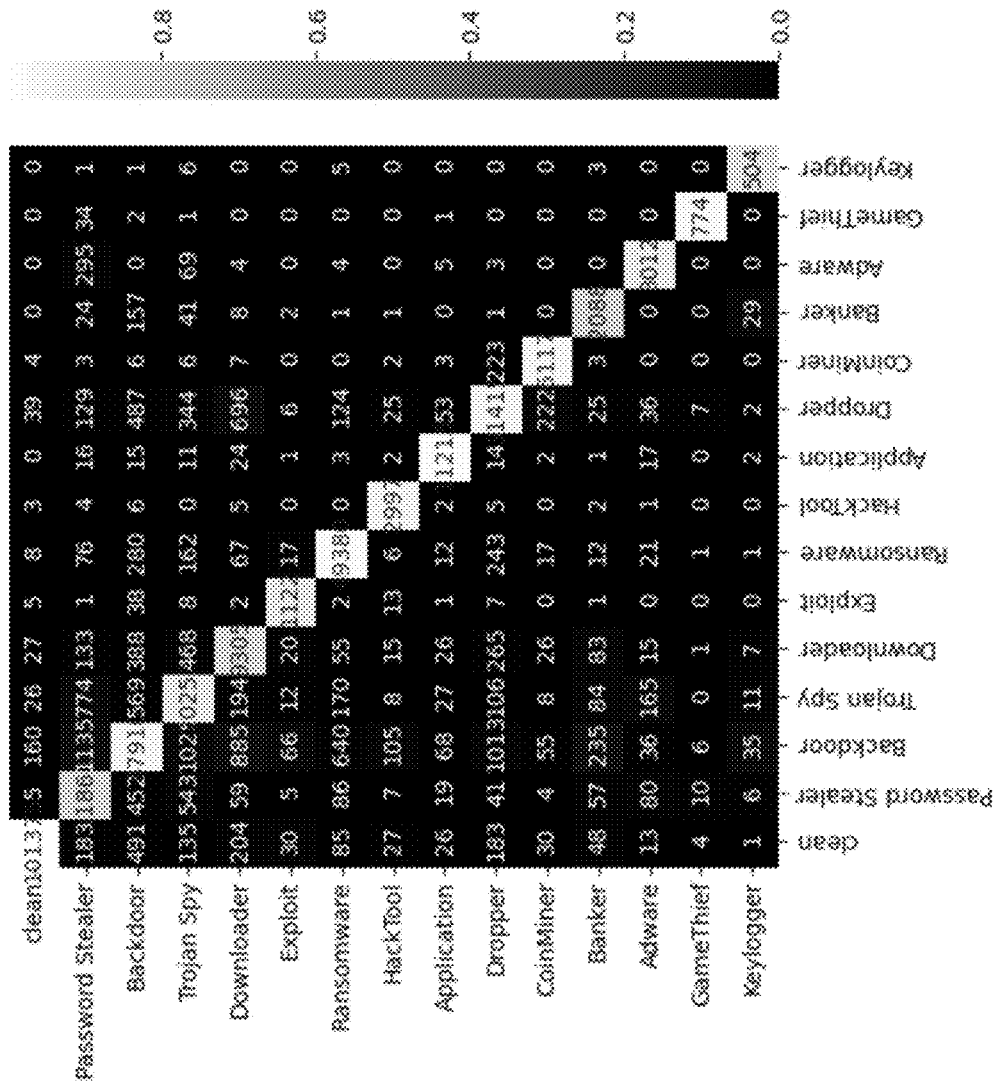
Figure 25:
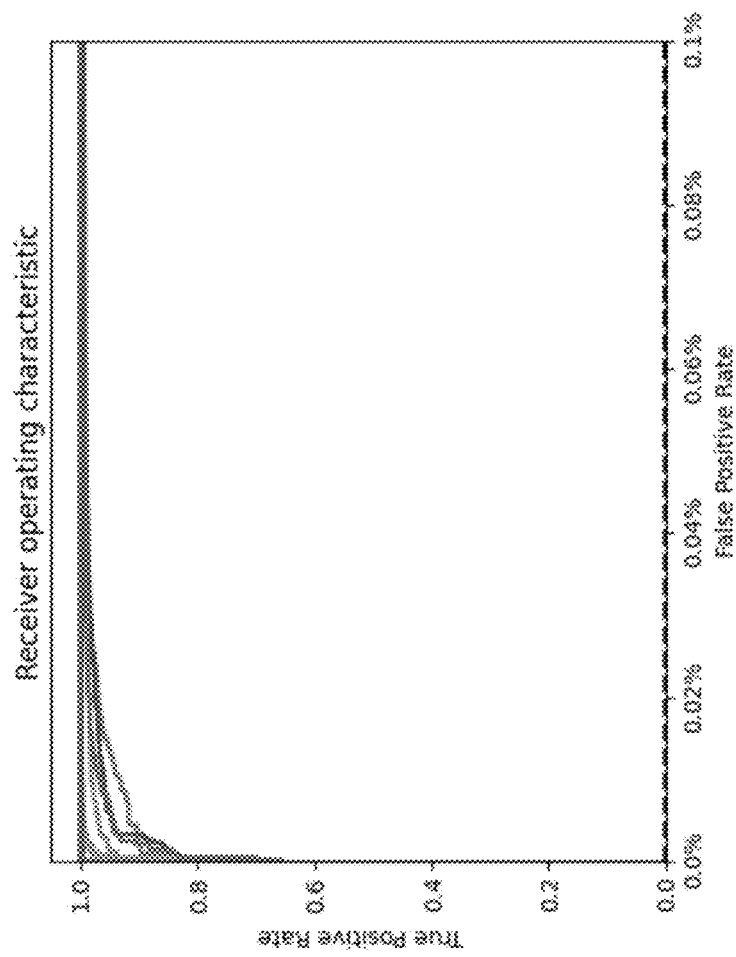
Figure 26:
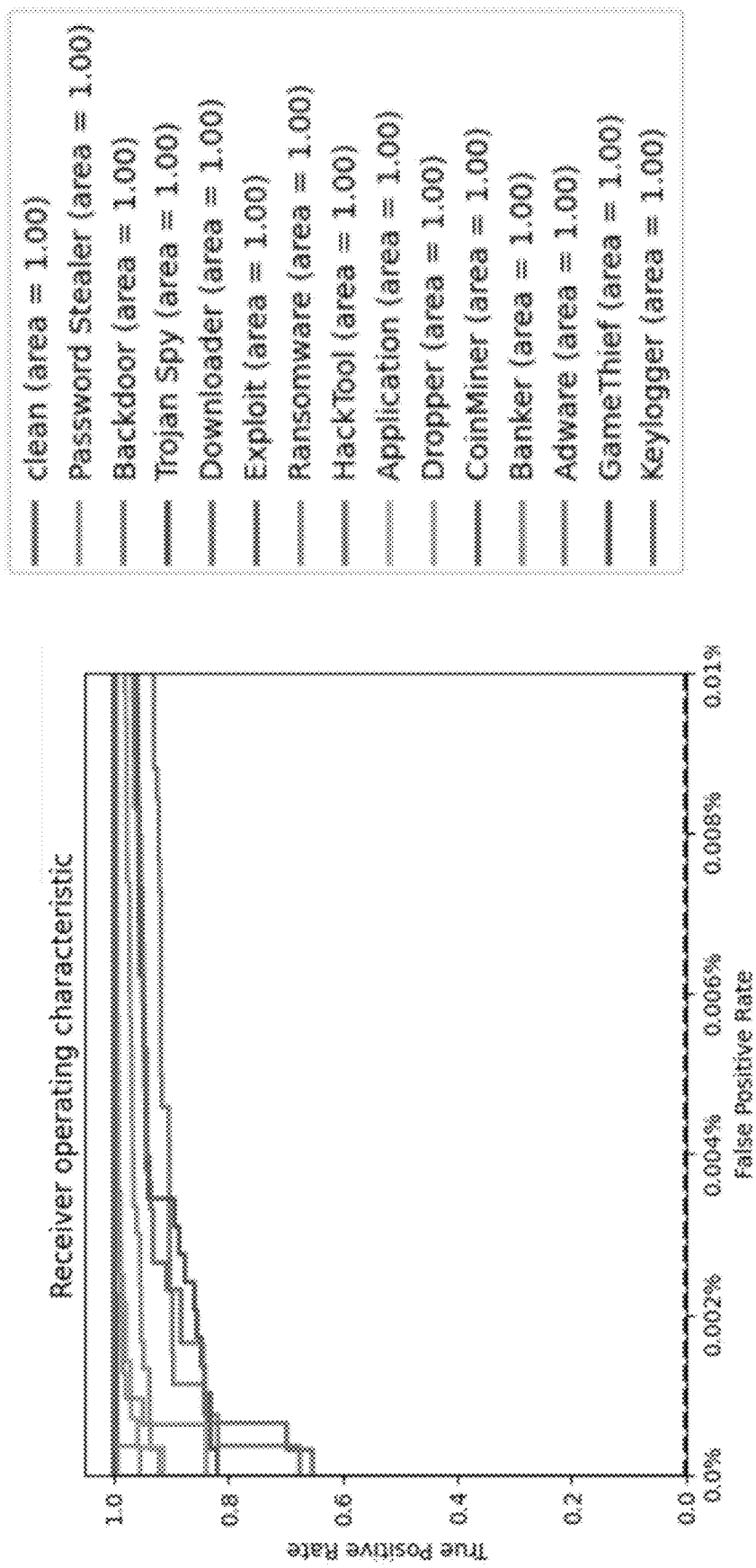
Figure 27:
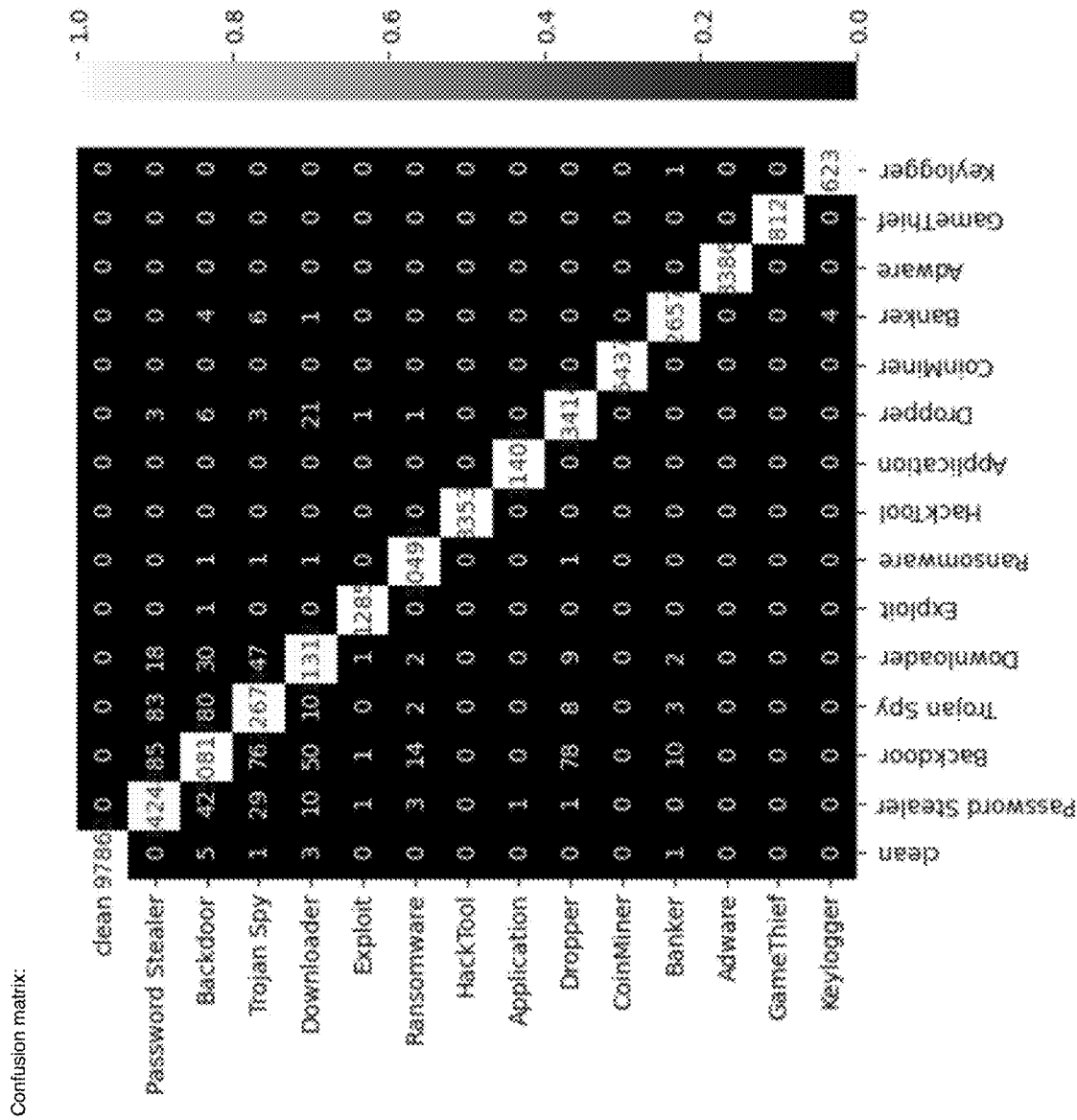
Figure 29:
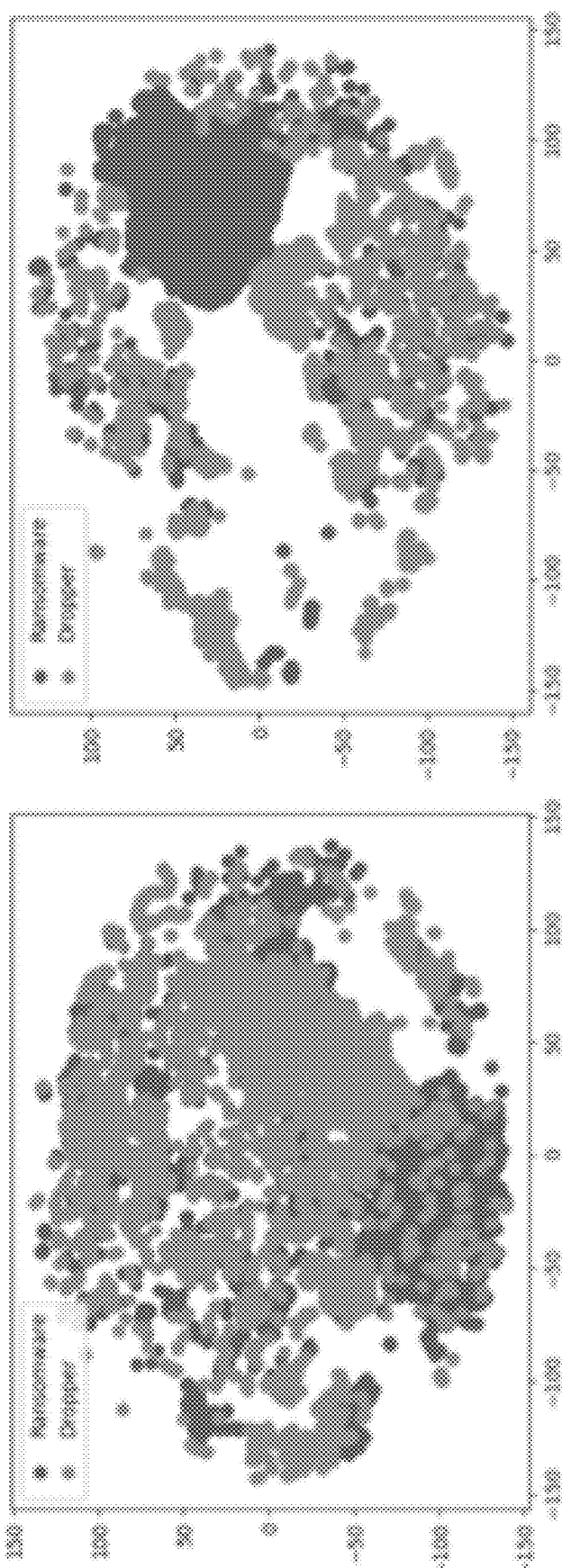
Figure 30:
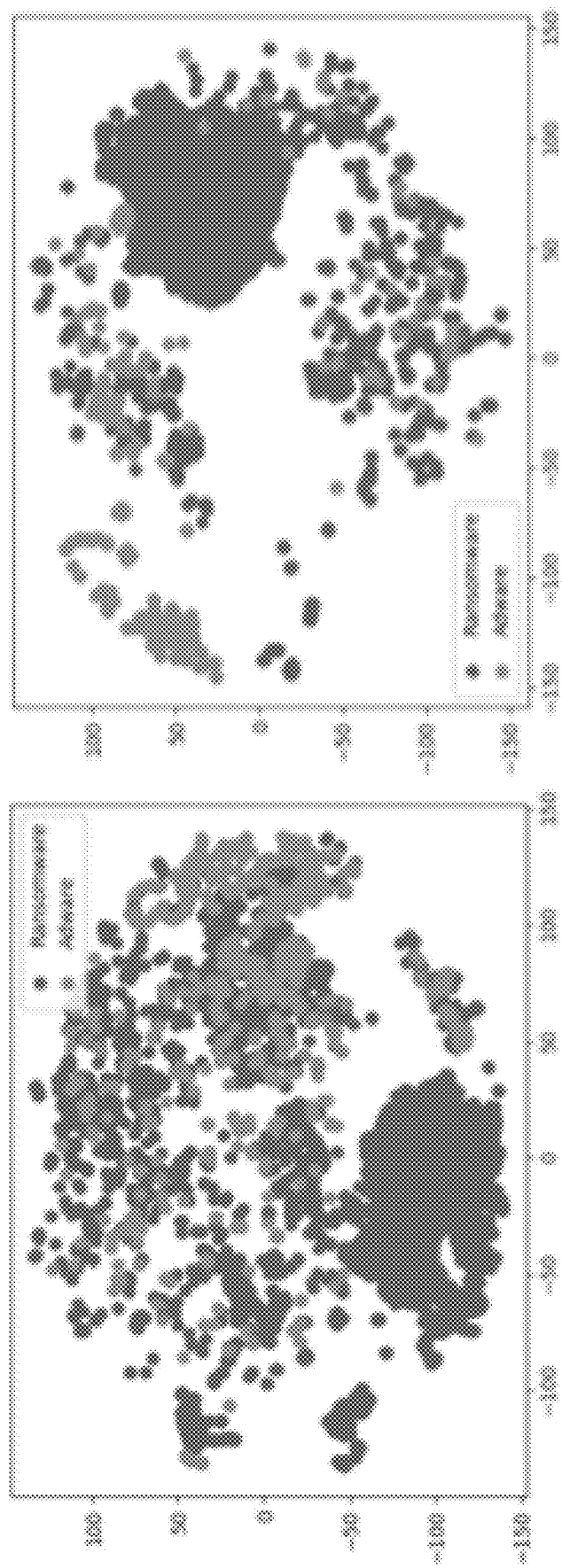
Figure 31:
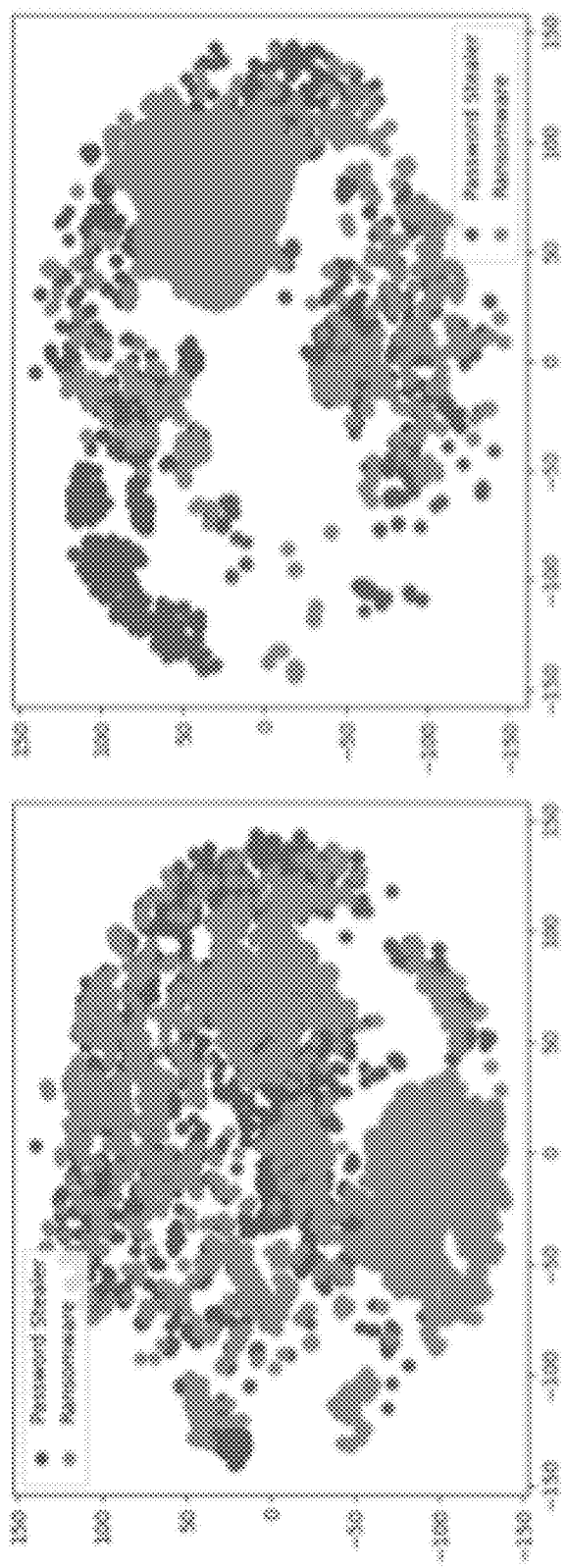
Figure 32:
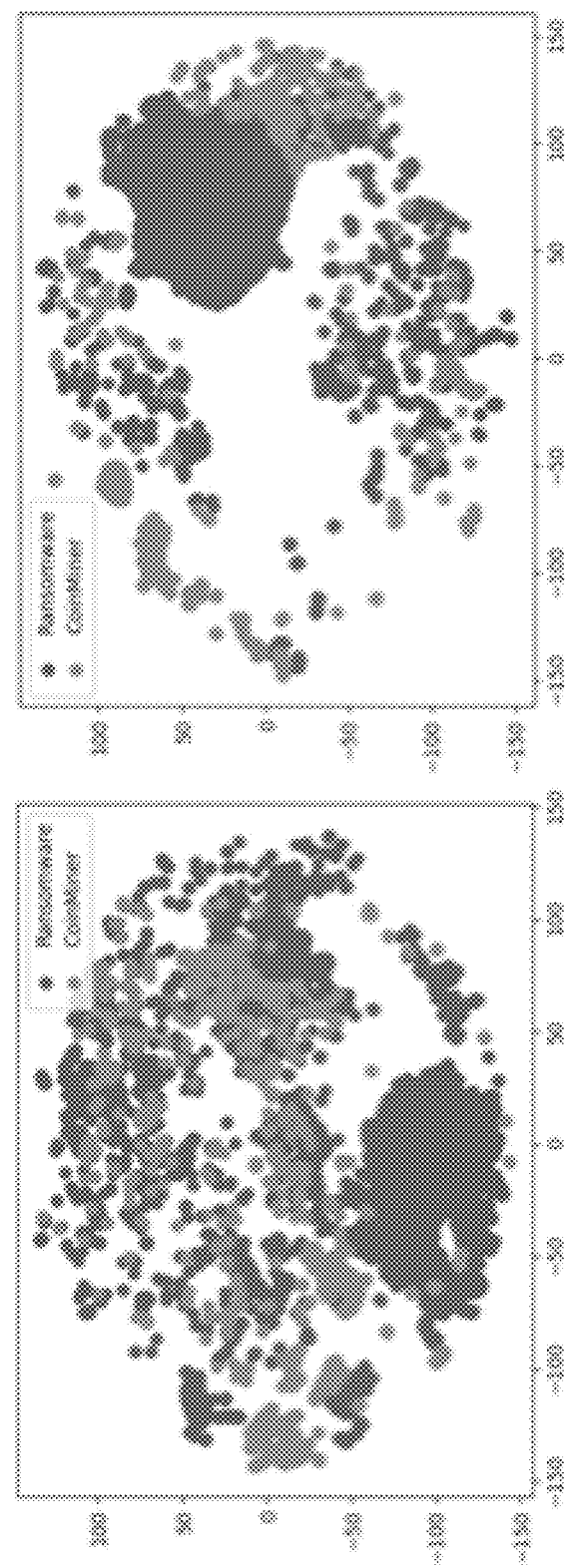
Figure 33:
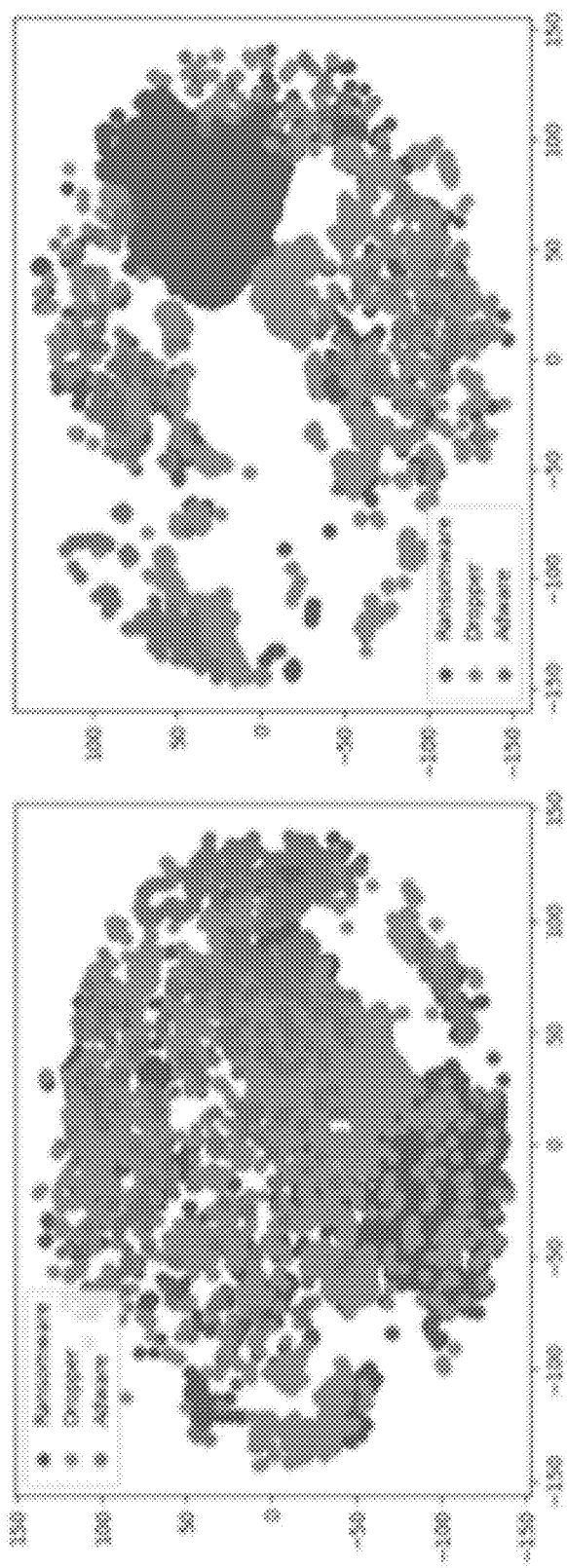
Figure 35:
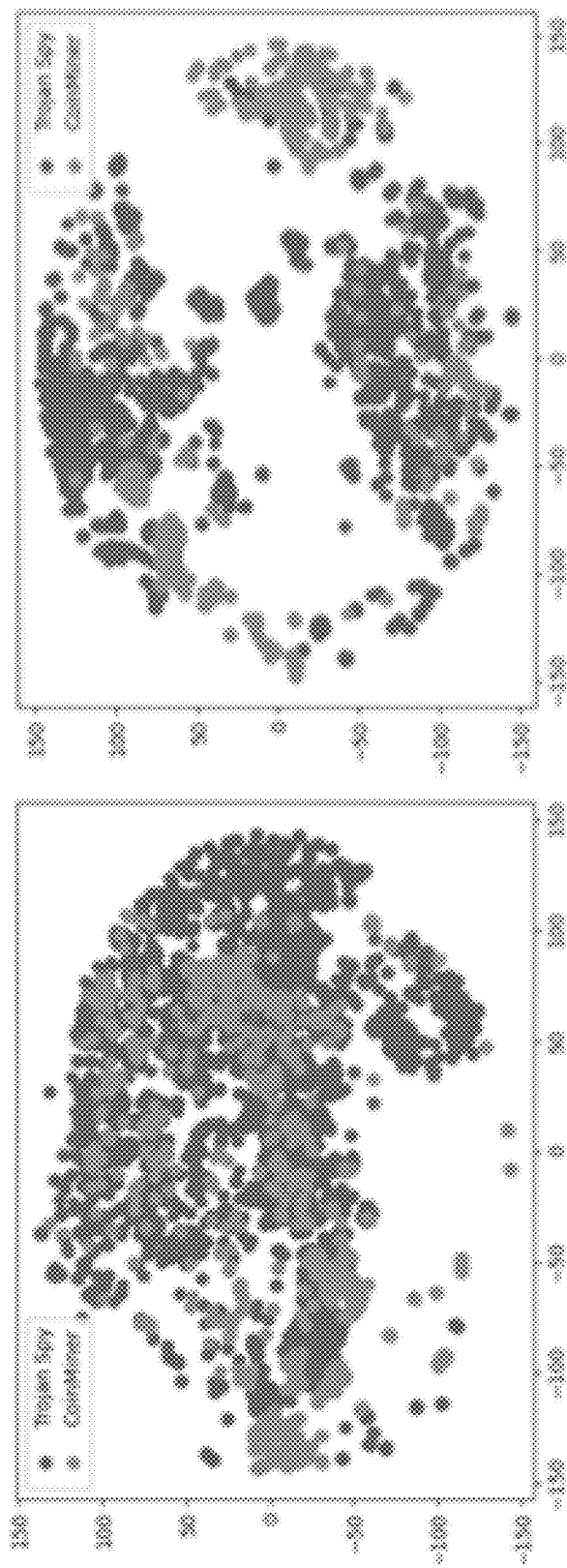
Figure 36:
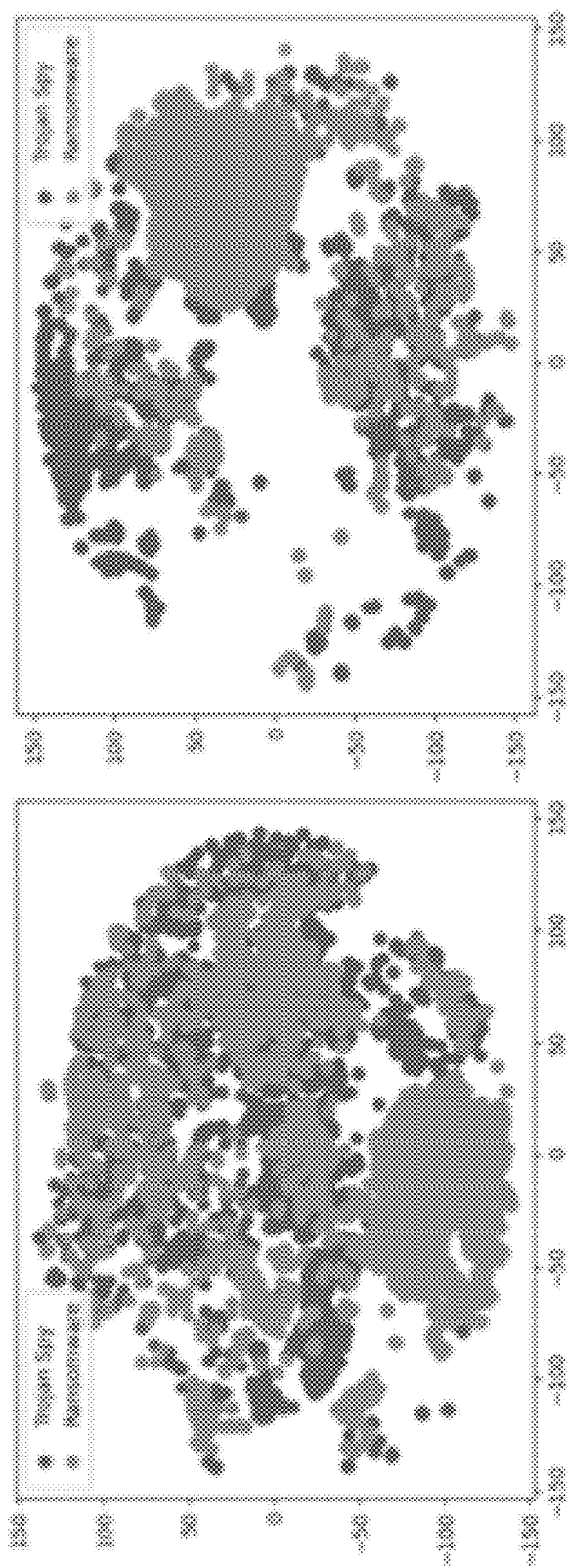
Figure 37:
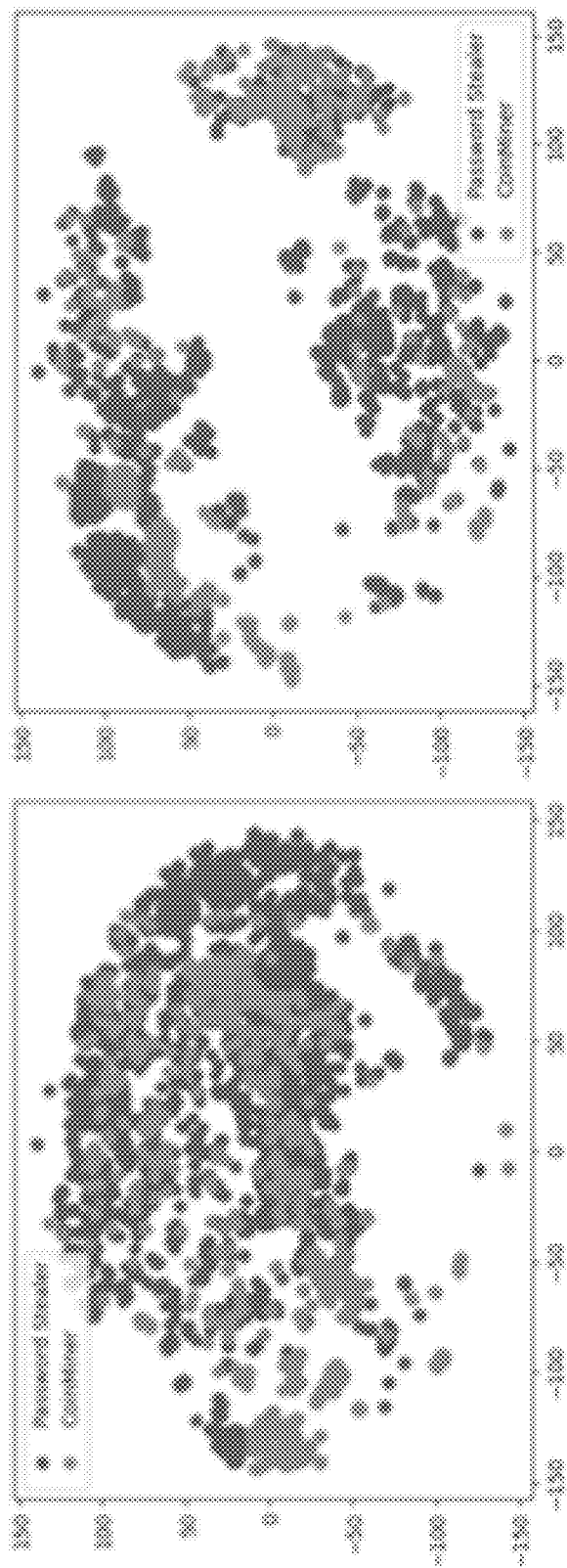
Figure 38:
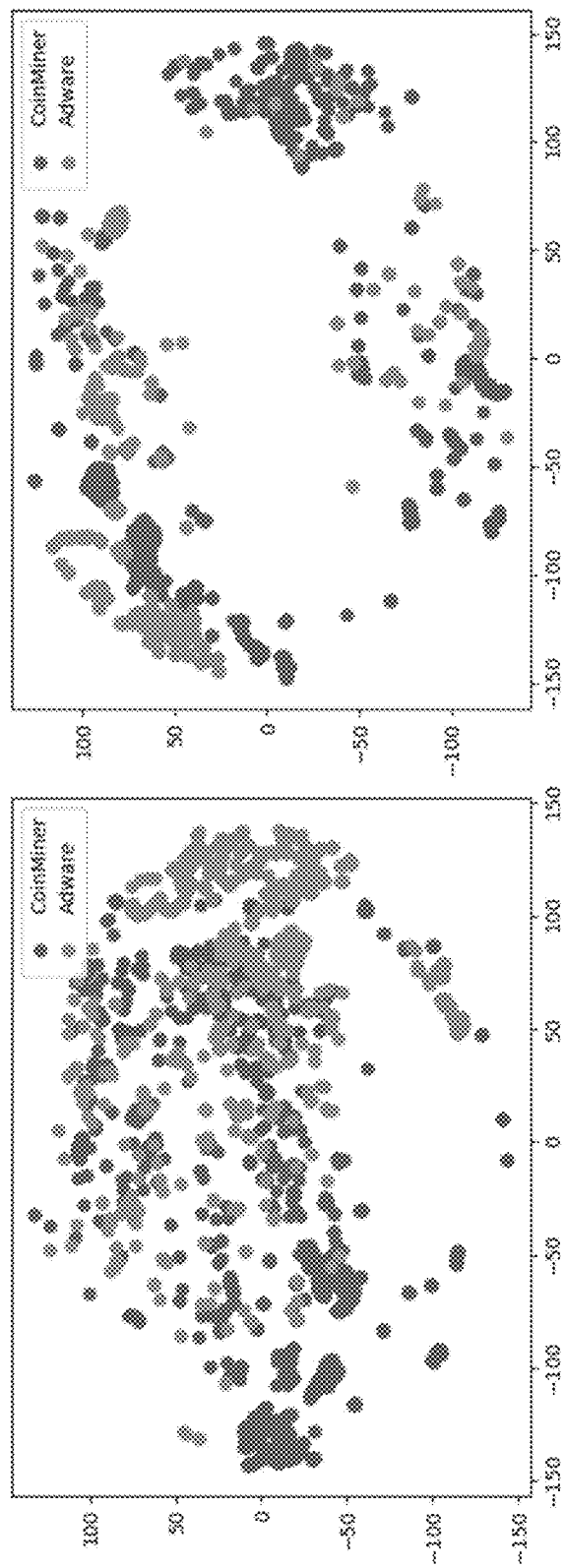
Figure 39:
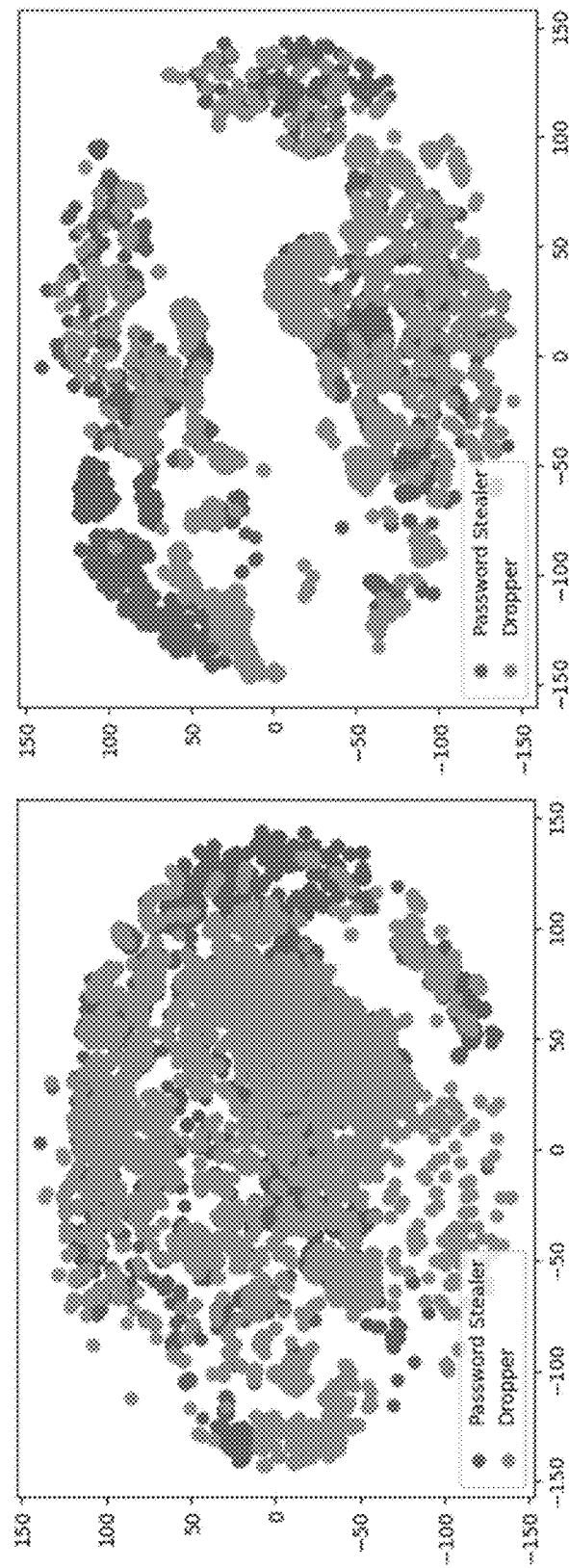

FIGS. 20-28 illustrate examples of the machine learning 146. The machine learning 146 provides a high-confidence in classification according to the Threat Types 148. The machine learning 146 may use eXtreme Gradient Boosting (or XGBoost®) and the ARES® Behavioral data (1M Behavioral FVs from Intelligence X® detonations). The machine learning 146 uses family API, CKB and detection information for labels. The machine learning 146 thus implements an Ares Threat Type model that relies on the behavioral Feature Vectors produced by the Ares project (e.g., the cybersecurity attack feature vector 62). The first step in identifying the Threat Types 148 is to collect the right data. The cybersecurity service 28 uses ~1M Feature Vectors for clean and dirty samples both from the field and from backend sandbox detonations. Next, the cybersecurity service 28 identifies the threat type 148 based on Family API, CKB and detection information, as FIG. 20 illustrates. Note, the Threat Type 148 only represents the main threat category that describes what the main behavior of the threat is. Same sample could be part of multiple threat types (or threat categories). As FIGS. 21-22 illustrate, the cybersecurity service 28 trains an XGBoost® model based on pure behavioral data, i.e. nearly ~400 features/patterns (microbehaviors/indicators). FIG. 23 illustrates a confusion matrix, while FIG. 24 illustrates basic metrics. Even though default settings were used and no model hyperparameters optimization was done, the model accuracy achieved was about 96%. However, FIGS. 25-28 illustrate even better results when experiments were conducted by combining behavioral and static features (from Meckus/pescan Feature Vector).

FIGS. 29-39 illustrate examples of results visualization. The T-SNE technique was used to transform the data into a lower-dimensional space for visualization to demonstrate the model's ability to separate different classes. T-SNE (t-Distributed Stochastic Neighbor Embedding) is a technique for visualizing high-dimensional data in a low-dimensional space. It can help to reveal patterns and relationships in the data that may not be immediately apparent from looking at raw data. T-SNE works by mapping the high-dimensional data points to a lower-dimensional space in a way that preserves the local relationships between the points. It does this by maximizing the likelihood that similar data points will be mapped close to each other in the lower-dimensional space, while dissimilar data points will be mapped farther apart. Even though the t-SNE technique does not preserve distances nor density, the t-SNE technique still helps visualize the data and see obvious patterns. When t-SNE shows the classes are very mixed, then they are usually not easy to separate. Some classes are easy to separate but some others are completely mixed.

The cybersecurity service 28 gauges when a sample's behavior is similar/congruent to another sample's or group of samples. The samples are classified and attributed to groups 140 according to the Threat Type 148 (superset of family names) based on the runtime event behaviors 30. The goals of the clustering/grouping 140 and the similarity analysis 64 and/or 142 may differ from those of ML classification. The clustering/grouping 140 and the similarity analysis 64 and/or 142 are intended to determine group membership for a submitted sample and assess similarity with the group. More than one group may be identified. The cybersecurity attack feature vectors 62 will be returned for the groups determined as similar and the shared and differing features highlighted. Information may also be determined about the nearness or similarity of groups 140 according to the Threat Type 148, and the disparity of behaviors amongst members of these groups. The cybersecurity service 28 generates this data for family names groupings.

The cybersecurity service 28 thus provides many usages. The cybersecurity service 28 provides early identification of when an unknown sample is similar to other known samples, independent of any vendor data. The cybersecurity service 28 provides early identification of an unknown sample's probable Threat Type 148 group (superset of family names), also prior to and independent of vendor data. The cybersecurity service 28 provides more accurate identification of unknown sample's likely family name (i.e. assist the Family Name API in being more accurate). The cybersecurity service 28 identifies unknown (or older) sample's clustering, and identifies when a sample is an outlier or is representing a new pattern of samples forming a new Threat Type 148 group or variant. The cybersecurity service 28 assesses whether a sample has replicated in the (Intelligence X®) sandbox. The cybersecurity service 28 assesses whether a sample is likely hiding behavior based on it determining it is running in a virtual/replication environment. The cybersecurity service 28 prioritizes routing of samples to bare metal detonation. The cybersecurity service 28 compares sample's behavior in the field vs within sandbox replication. The cybersecurity service 28 is more accurate and representative of prevalence data generation, via determining Threat Type 148 grouping and coupling with prevalence data that sorts out natural variants and polymorphism. The cybersecurity service 28 provides a gauge of similarity in all the above, as well as readily used deltas of behavior between sample and other samples/groups of samples. The cybersecurity service 28 may thus provide a lightweight, centroid-based similarity system for deployment to the Sensor (e.g., the cybersecurity detection agent 26).

The cybersecurity service 28 may thus cloud execute the clustering/grouping 140 and the similarity analysis 142. The cybersecurity service 28 may be based on assessing similarity between samples. Initially, the FVs used are based on ARES® data which collects Sensor patterns (heuristically generated identifiers of sub-behavior). The cybersecurity service 28 may also utilize a subset of ranked and selected static features to use in additional/combined FVs. The cybersecurity service 28 may also collect ARES® data using the Intelligence X® (or IntelX®) integration with Sensor bus monitoring log collection with ingest into HUMIO®. To reduce comparisons, the centroids 146 may be used. Initially these centroids 144 are generated from within known sample groupings, called the Threat Type 148 groupings. Initially, a singular centroid 144 is determined for each Threat Type 148 group, where the centroid 144 represents the sample with the minimal average distance to the other group members. Sub-centroids (illustrated in FIG. 11) may also be generated, perhaps using techniques such as k-means. Threat Type 148 group data is derived from heuristic analysis of VIRUSTOTAL® malware family names data, which organizes samples into broader groupings than family names does. The current list of Threat Type 148 groups (with distribution data) includes:

Adware (1%), Application (2%), Backdoor (37%), Banker (2%), Clicker (0.2%),
CoinMiner (5%), Downloader (8%), Dropper (8%), Exploit (1%),
GameThief (0.5%), HackTool (1%), Keylogger (0.4%), Password Stealer (16%),
Ransomware (16%), Spyware (0.05%), and Trojan Spy (10%).

The cybersecurity service 28 may uses ARES® data and cosine similarity assessment, with Threat Types 148 group data. Cosine similarity may be chosen for its applicability when feature vector magnitudes are not important. Based on early experimentation, ARES® data is categorical and may be converted to numerical data using one-hot encoding. FVs are wide (10K potential values) and very sparse. The cybersecurity service 28 generates an output from a submitted sample, such as a list of closest Threat Type 148 groups, with similarity assessment for each. This output provides more meaningful data in cases when a sample can be seen as a member/having characteristics of multiple groups. The cybersecurity service 28 may also provide the cybersecurity attack feature vector 62 (such as its associated feature values) representing the centroids 144 from each group and highlighting of shared vs differing features between sample and centroids 144. The cybersecurity service 28 may also provide a list of representative samples from groups, also with similarity assessment and FV comparisons. The cybersecurity service 28 supports flexible clustering and centroid/sub-centroid generation, going beyond only using pre-defined groups.

Centroidal feature vectors (such as the cybersecurity attack feature vector 62 representing one or more centroid(s) 144) are very effective. Initial experimental efforts used centroids 144 produced for sample family name groups, the family names having been generated using a family name API. This API determines a unified family name for submitted samples based on vendor data reported in VIRUSTOTAL®. The initial experimental results revealed that this was not tenable, as samples in one family name group routinely showed high similarity (identical in many cases) with samples from another family name group. Efforts then switched to using Threat Type 148 grouping to form the centroids 144. Threat Type 148 grouping generates a much shorter list of groups (~15 vs>1K) which are supersets of the family name groups and reflect combined functionality (such as 'dropper', 'coinminer', etc.). This grouping is generated using an interpolation of VIRUSTOTAL data to combine arbitrary family naming into higher-level representations of grouping. Using Threat Type 148 grouping for the generation of centroids 144 proved far more effective than using Family Name API results. It also showed that the Threat Type 148 grouping data is much more representative and consistent in identifying what a sample's type is than the Family Name data is. Analyzing the Threat Types 148 groupings and centroids 144 generated from these, it was observed that the most centroids 144 don't unduly relate to each other (which is good and indicates some separation), but that some Threat Type 148 groups are close to each other. Analyzing the distances of members within the groups to the centroids 144 illustrated that the 'farthest' members are commonly quite dis-similar to the centroid (<0.26 similarity for e.g.). This reinforces an expectation that the sub-centroids (illustrated in FIG. 11) within the groups for use in similarity assessment tightens results. The analysis of group members' similarity also illustrates that measuring homogeneity within the group and looking for strong sub-types is useful. There also appears to be commonality within groups that might be better understood and modeled with using these strong sub-types and centroids 144 for these. Lastly, it was noted that efficacy in terms of FP and TP rates can be improved by acknowledging that some Threat Type 148 groups are commonly the closest to samples that are also very close to another group, and interpolating the data accordingly. For example, a sample being determined close to Threat Type 148 group Dropper when the Threat Type output cited it as a member of Backdoor or Banker isn't a false positive. These different approaches are captured in the different levels of "filtering" cited in the efficacy results.

Examples are now provided. The Threat Type group centroids' nearest relatives, and calculated similarities:
Adware and Hacktool-similarity: 0.72
Application and Hacktool-similarity: 0.76
Backdoor and Dropper-similarity: 0.89
Banker and Downloader-similarity: 0.92
Clicker and Dropper-similarity: 0.83
CoinMiner and Banker-similarity: 0.72
Downloader and Password Stealer-similarity: 0.95
Dropper and Backdoor-similarity: 0.89
Exploit and Banker-similarity: 0.59
GameThief and Dropper-similarity: 0.74
Hacktool and Keylogger-similarity: 0.77
Keylogger and Dropper-similarity: 0.81
Password Stealer and Downloader-similarity: 0.95
Ransomware and Backdoor-similarity: 0.80
Trojan Spy and Downloader-similarity: 0.70

The Threat Type Groups' Members' Max Distance (Lowest Similarity) from their Centroids:
  Adware: 0.24
  Application: 0.26
  Backdoor: 0.15
  Banker: 0.37
  Clicker: 0.39
  CoinMiner: 0.26
  Downloader: 0.21
  Dropper: 0.17
  Exploit: 0.28
  Game Thief: 0.40
  HackTool: 0.31
  Keylogger: 0.34
  Password Stealer: 0.21
  Ransomware: 0.00
  Trojan Spy: 0.28

Example of Feature Vectors for Two Samples (with Similarity of 0.93):
  Banker centroid
    hash: 77a860ac0b7deb3c17acba8d513a55740690701532 74925e6f579d22724544fc feature vector:
    327, 328, 5765, 7032, 7088, 7089, 7091, 7092, 7093, 7160, 7170, 7200, 7207, 7249, 7252, 7401, 7410, 7411, 7412
  Downloader Centroid
    hash: 08d12841527cd1bb021d6a60f9898d6e0414d95e7d cde262ed276d5c8afa33cc feature vector:
    327, 328, 5765, 7032, 7088, 7089, 7091, 7092, 7093, 7155, 7160, 7170, 7200, 7205, 7207, 7249, 7252, 7354, 7401, 7410, 7411, 7412

The raw experimental data used comes from these sources: ARES® collection of Sensor patterns, Threat Types 148 grouping, and the Family Name API grouping.

Figure 40:
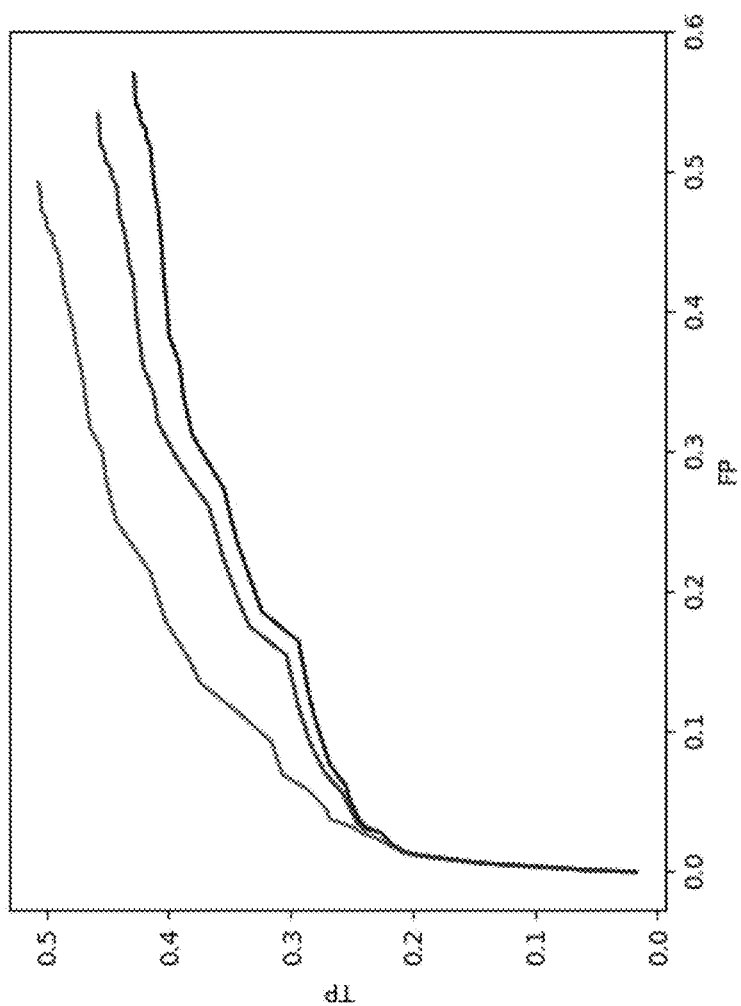
Figure 41:
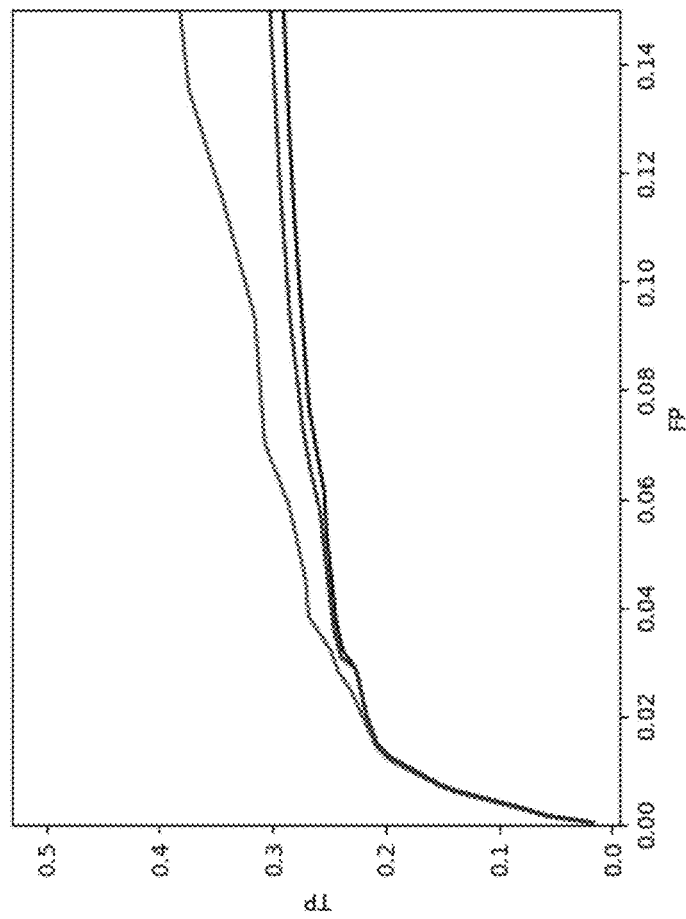
Figure 42:
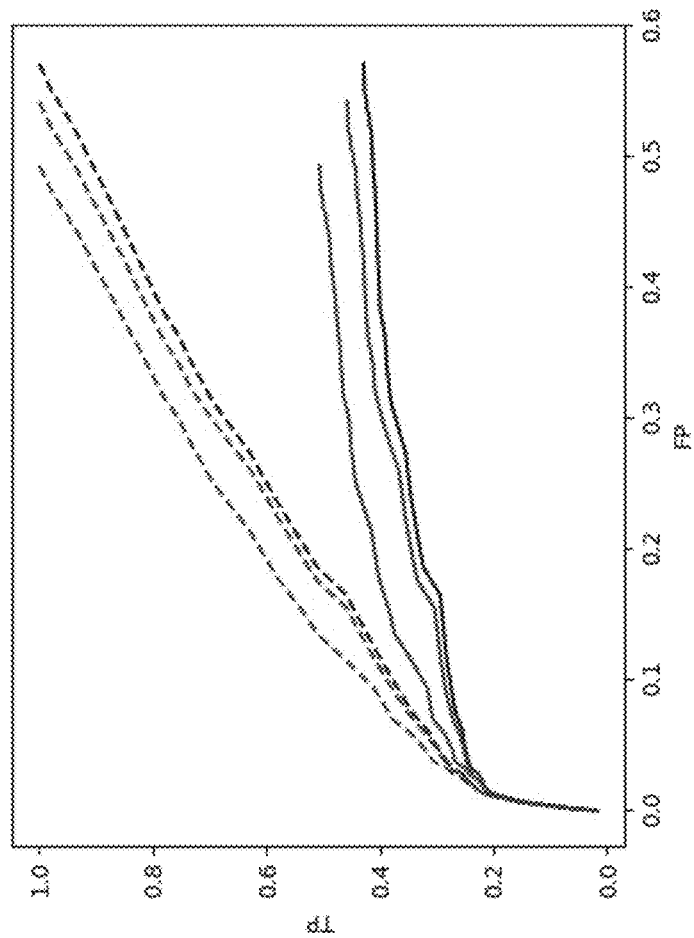
Figure 43:
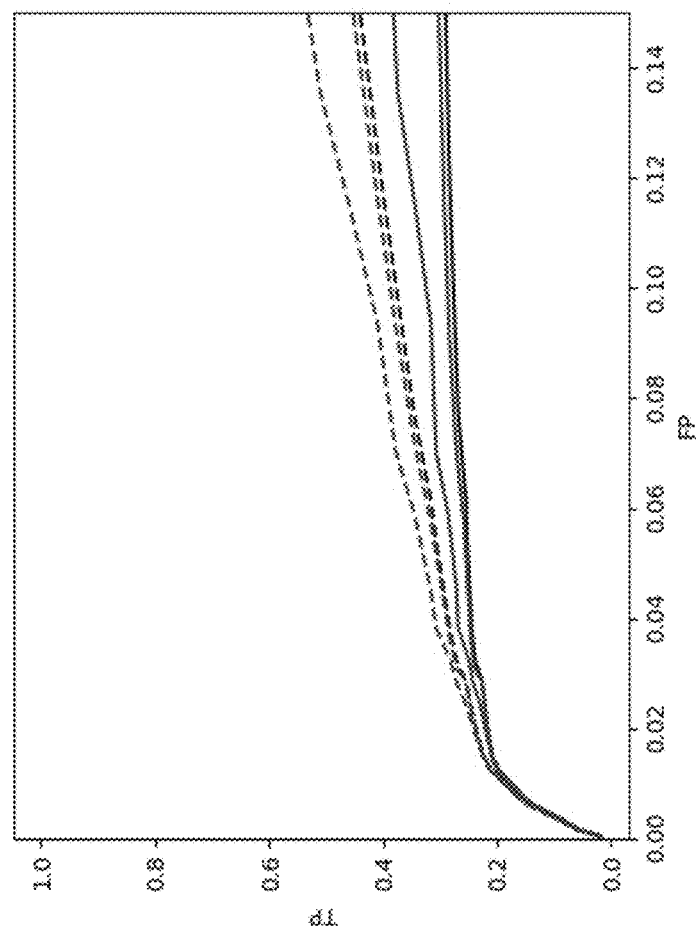

Ares Sensor pattern data. Below are snippets of raw FV data (json):

of the cybersecurity service 28 using Threat Type 148 grouping and centroids 144. All the efficacy assessments use a "best single match wins" approach where the closest singular match is what is used to categorize the sample into a group. Comparison set consists solely of centroids 144 from each Threat Type 148 group as ROC curves showing FP vs TP rates, with FIG. 41 illustrating finer details of much smaller false positive (FP) rates. FIGS. 40-41 illustrate unfiltered FP and TP, filtered FP and TP (using cautious thresholds >=0.89 similarity), and filtered FP and TP (using modestly cautious thresholds >=0.80 similarity). Filtering adds interpolation to matches against Threat Type group names, identifying when matching different groups' names should be considered a match due congruence between the groups. FIGS. 42-43 illustrate ROC curves showing FP vs TP determination rates for unfiltered FP and TP, determination rate without filtering, and filtered FP and TP (using cautious thresholds >=0.89 similarity), determination rate at those thresholds, filtered FP and TP (using modestly cautious thresholds >=0.80 similarity), and determination rate at those thresholds. Determination refers to calculated similarity being at or above a threshold.

Figure 44:
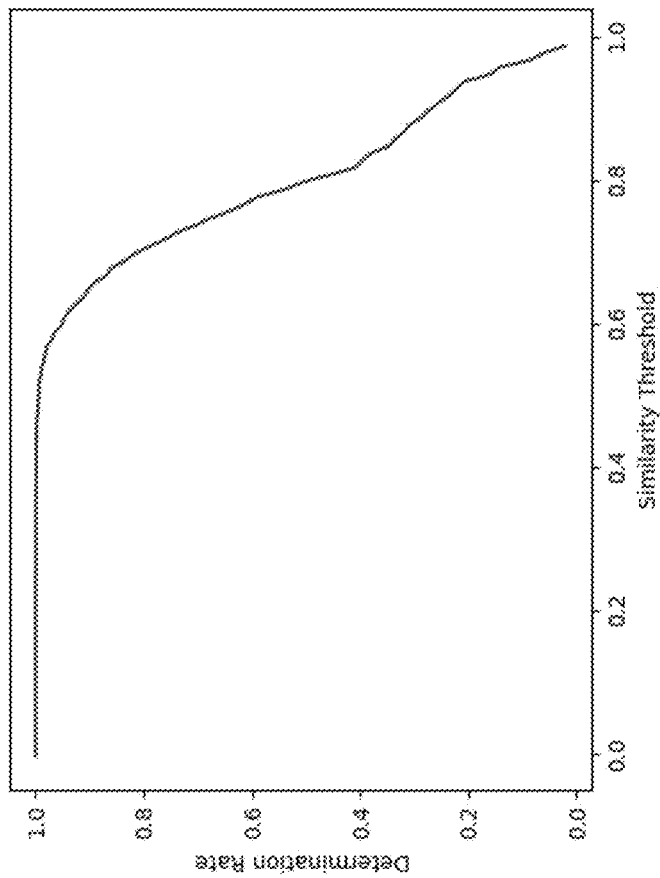
Figure 45:
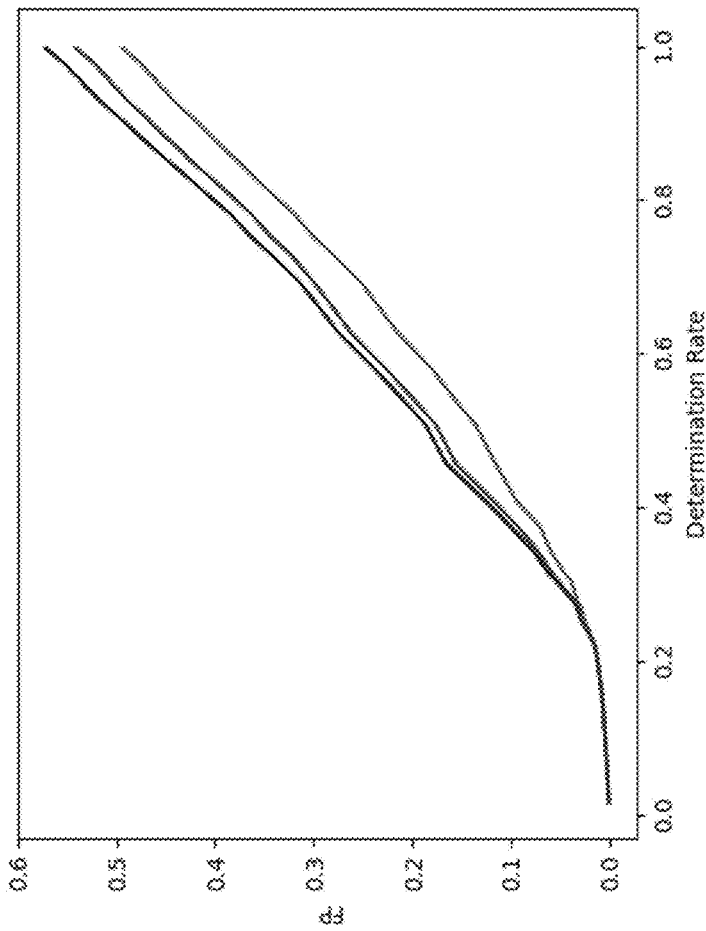
Figure 46:
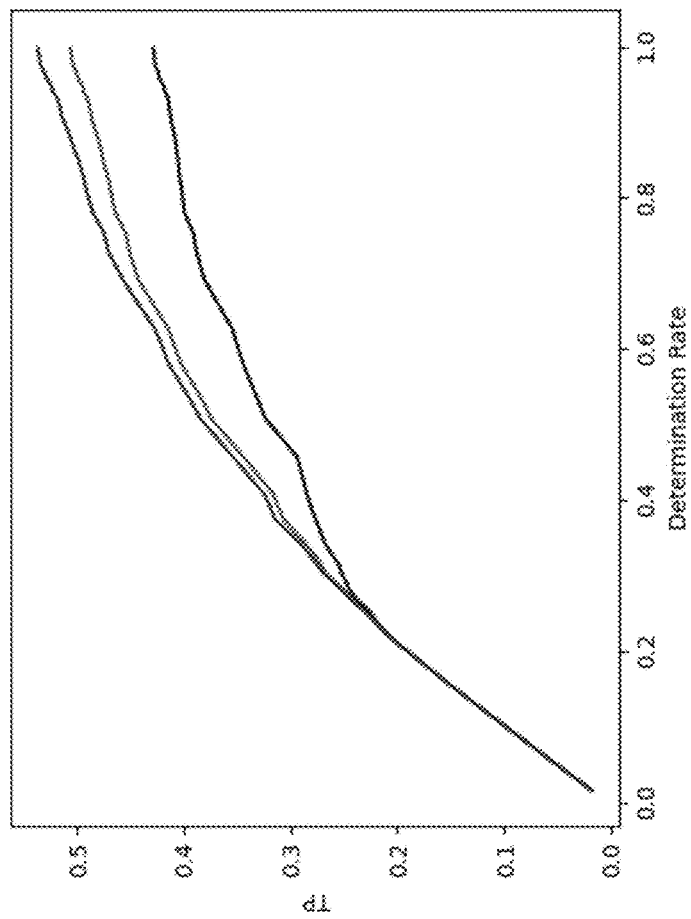

FIGS. 44-47 illustrate more efficacy assessments. FIG. 44 illustrates determination rate vs similarity threshold. FIG. 45 illustrates false positive (FP) vs determination rate, and FIG. 46 illustrates true positive (TP) vs determination rate. FIGS. 44-46 illustrate unfiltered FP and TP, filtered FP and TP (using cautious thresholds >=0.89 similarity), and filtered FP and TP (using modestly cautious thresholds >=0.80 similarity). FIG. 47 illustrates data highlights with no interpolation. The data were not tested with clean sets, beyond limited manual analysis.

Figure 48:
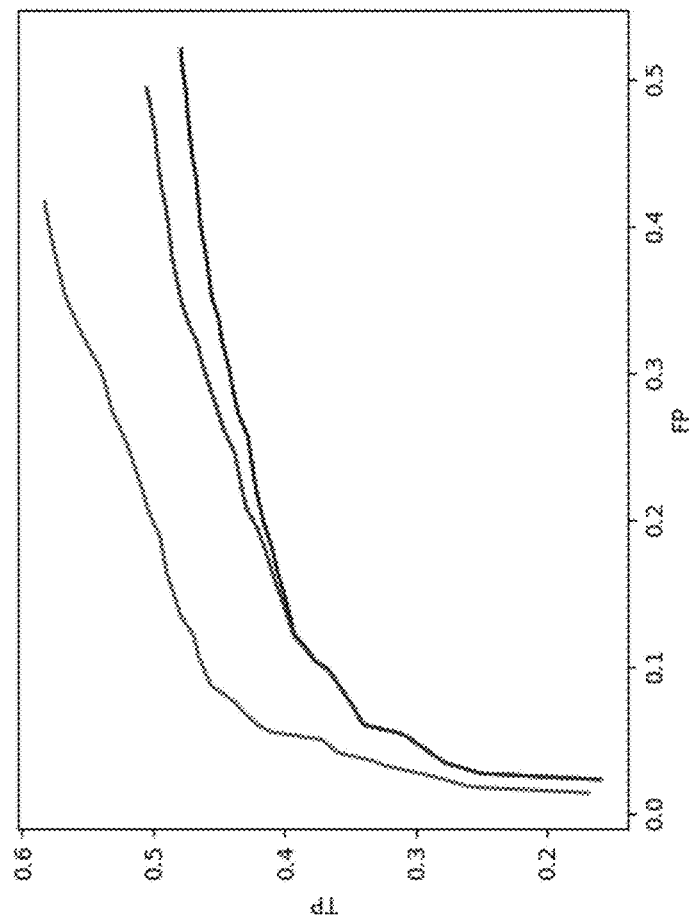
Figure 49:
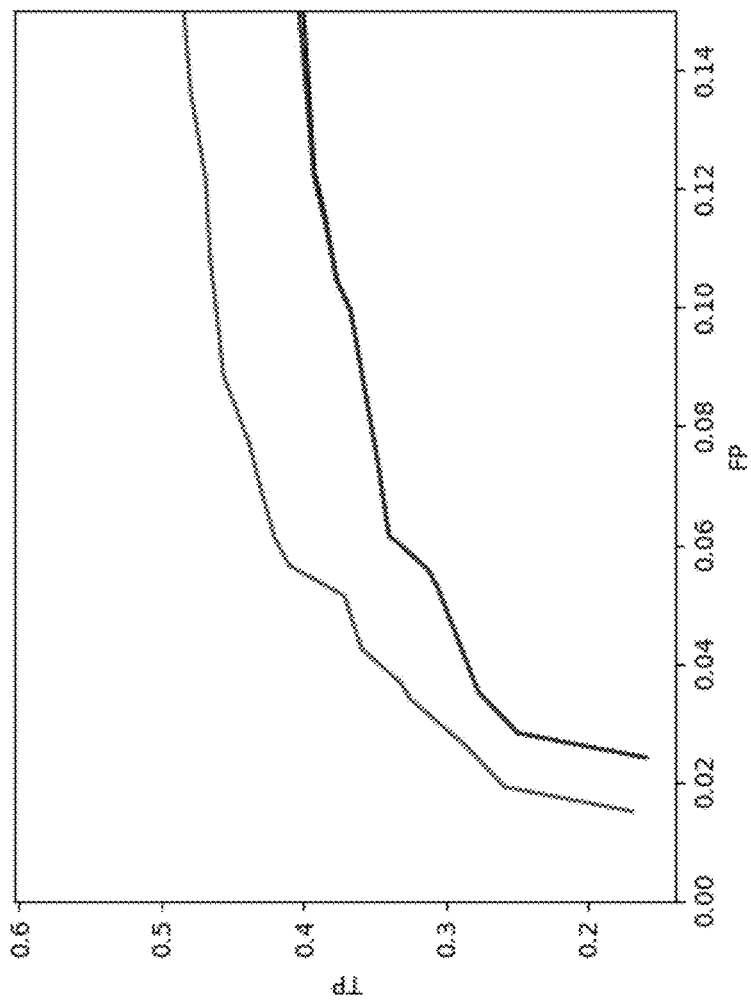

FIGS. 48-52 illustrate more efficacy assessments using group subset comparisons, with best single match 'wins'. FIG. 48 illustrates ROC Curve-FP vs TP rates, and FIG. 49 illustrates (Centroid only) ROC Curve-FP vs TP rates. The data of FIGS. 48-49 uses randomly selected subset from each Threat Type group 148 where each selection is within

```
{"c6b0d811d6ca8d66c72251751c7bd9c2ed5acbd51e57833df63dd8c356b7ffae": {"PatternIDs": [7248, 7205, 7900,
7905, 5765, 7249, 7252, 7061, 7086,
7088, 7089, 7078, 7401, 7093, 7140, 7143, 7255, 7410, 7411], "PatternCounts": [2, 3, 1, 1, 1, 1, 2, 1, 1, 1, 1, 1, 2,
4, 1, 5, 1, 1], "InstanceIDs": [ ],
"InstanceCounts": [ ], "Detonation": "1759c3bcda0d4f13af7f097c1f7dba82", "PID": "70012692", "SHA256":
"230d8cca3303677d79c4926b17fe3ca2db4473cd202fd28427d8abf1be240042", "TargetSHA256":
"a24a49ff6a76c83ad85536b6a112101861d0ac0589c22d2ca0d7341b8771068e", "TargetLabel": 1}}
{"7fa59298e74d459f71947348b366bc4e9afb62e72a51ffdfd73db5bbfd10cf18": {"PatternIDs": [7248, 7139, 10031,
7205, 7282, 7127, 7106, 7255, 7410], "PatternCounts": [4, 2, 1, 1, 2, 1, 1, 4, 1], "InstanceIDs": [817],
"InstanceCounts": [1], "Detonation": "50248b5198d24724a6aa9f738b77b434", "PID": "99656588", "SHA256":
"15b4ec12c4efc5475d1dc0f2048075b78048d00ab5d0dc2fca72b8ce5a127ab3", "TargetSHA256":
"40fd7a4fd13cf4057de10b3eb1d89a596786f403bde6e79f3539fedd51af68de", "TargetLabel": 1}}
{"8157c3bf4590e678310e3940256727d3cfa36f735ef923959e52f11dcd9571df": {"PatternIDs": [7248, 7139, 10031,
7205, 7282, 7200, 7255, 7401, 7140, 7061, 7410, 7127, 7106], "PatternCounts": [4, 4, 1, 2, 3, 3, 11, 1, 6, 10, 2, 1, 7],
"InstanceIDs": [817], "InstanceCounts": [1], "Detonation": "1759c3bcda0d4f13af7f097c1f7dba82", "PID":
"80465857", "SHA256": "15b4ec12c4efc5475d1dc0f2048075b78048d00ab5d0dc2fca72b8ce5a127ab3",
"TargetSHA256": "a24a49ff6a76c83ad85536b6a112101861d0ac0589c22d2ca0d7341b8771068e", "TargetLabel":
1}}
{"e75cb4a4cac3d66bb4c28e23eb25c57b8bafce746f7b8cc60a31984ece031f5a": {"PatternIDs": [7248, 7139, 10031,
7205, 7282, 7200, 7255, 7401, 7140, 7061, 7410], "PatternCounts": [4, 2, 1, 2, 2, 3, 3, 1, 6, 10, 1], "InstanceIDs":
[817], "InstanceCounts": [1], "Detonation": "1759c3bcda0d4f13af7f097c1f7dba82", "PID": "80465857", "SHA256":
"15b4ec12c4efc5475d1dc0f2048075b78048d00ab5d0dc2fca72b8ce5a127ab3", TargetSHA256":
"a24a49ff6a76c83ad85536b6a112101861d0ac0589c22d2ca0d7341b8771068e", "TargetLabel": 1}}
{"0d04e196fb8a653c56ff1e45e94e624bd9250033076b476673d4a2fe9fc59965": {"PatternIDs": [7248, 10031, 7205,
7139, 7282, 7127, 7106, 7255, 7410, 7900, 7905], "PatternCounts": [3, 2, 1, 2, 1, 1, 7, 8, 1, 1, 1], "InstanceIDs": [817],
"InstanceCounts": [2], "Detonation": "1759c3bcda0d4f13af7f097c1f7dba82", "PID": "73913713", "SHA256":
"15b4ec12c4efc5475d1dc0f2048075b78048d00ab5d0dc2fca72b8ce5a127ab3", "TargetSHA256":
"a24a49ff6a76c83ad85536b6a112101861d0ac0589c22d2ca0d7341b8771068e", "TargetLabel": 1}}
```

Figure 50:
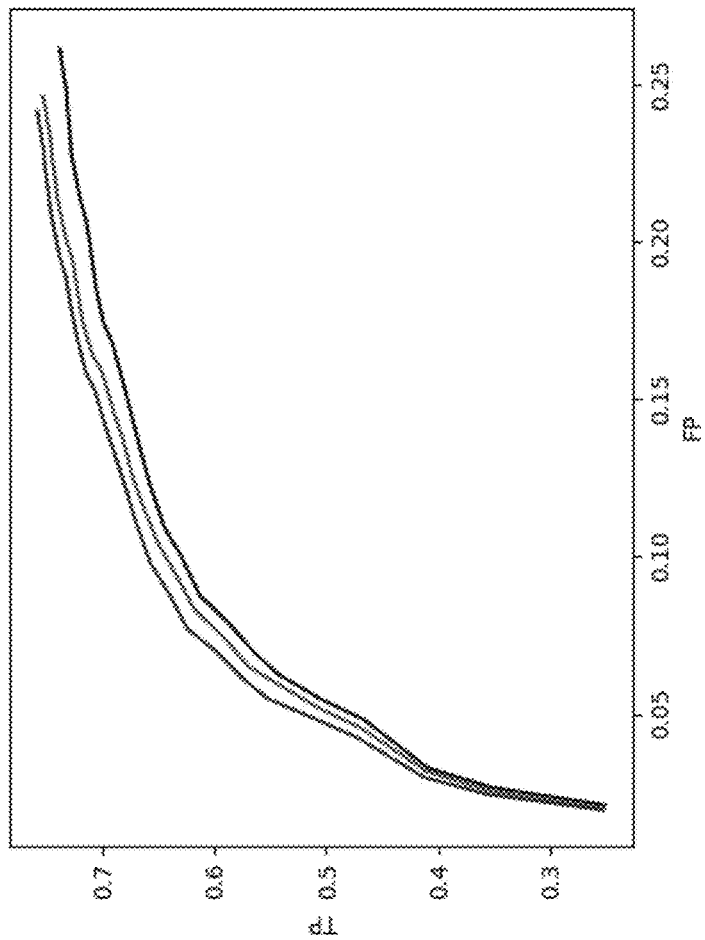
Figure 51:
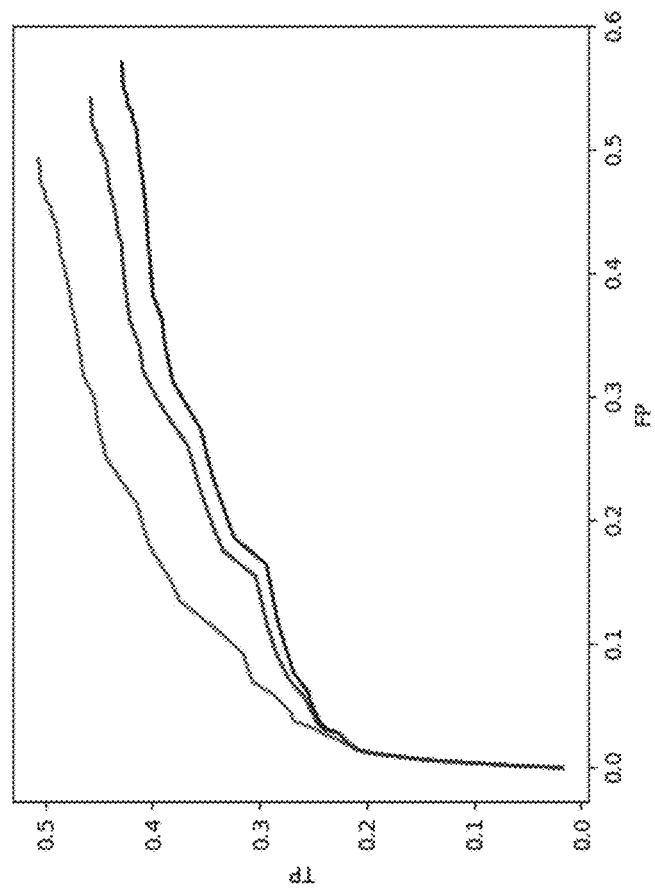

FIGS. 40-43 illustrate efficacy assessments. FIGS. 40-43 illustrate graphs showing different measures of the efficacy 0.80 distance of group's centroid 144, instead of only using centroids for comparison set. FIGS. 50-51, though, illustrate efficacy-Hybrid using centroids 144 from Threat Types groups 148 and centroids 144 generated using k-means, best single match 'wins'. Uses results from Threat Types groups' centroids 144 for higher thresholds and k-means centroids for remainder (later paragraphs describe the k-means centroid generation). FIG. 51 shows expanded coverage at the lower similarity thresholds than the pure Threat Types group centroid approach shown earlier, while preserving that approaches low FP at high thresholds (compare in the following chart with the blue line, no interpolation). FIG. 52 illustrates data highlights with no interpolation. Efficacy was measured by comparing the determined Threat Types group membership determined by the similarity system vs the actual membership (the labeling) for a set of samples. As shown earlier, at larger distances (lower similarity thresholds) there is increased adjacency and overlap between members of different Threat Types groups. This explains why the ROC curve shows an accuracy decrease at lower similarity thresholds. As this is a similarity assessment function, not a true classifier, this level of accuracy is quite acceptable. The goal of the system is to assess similarity to groups and generate lists of similar samples, with included confidence scoring.

The results used interpolation settings. These are used in prior charts to interpret matches as equivalent for certain groups.

Figure 53:
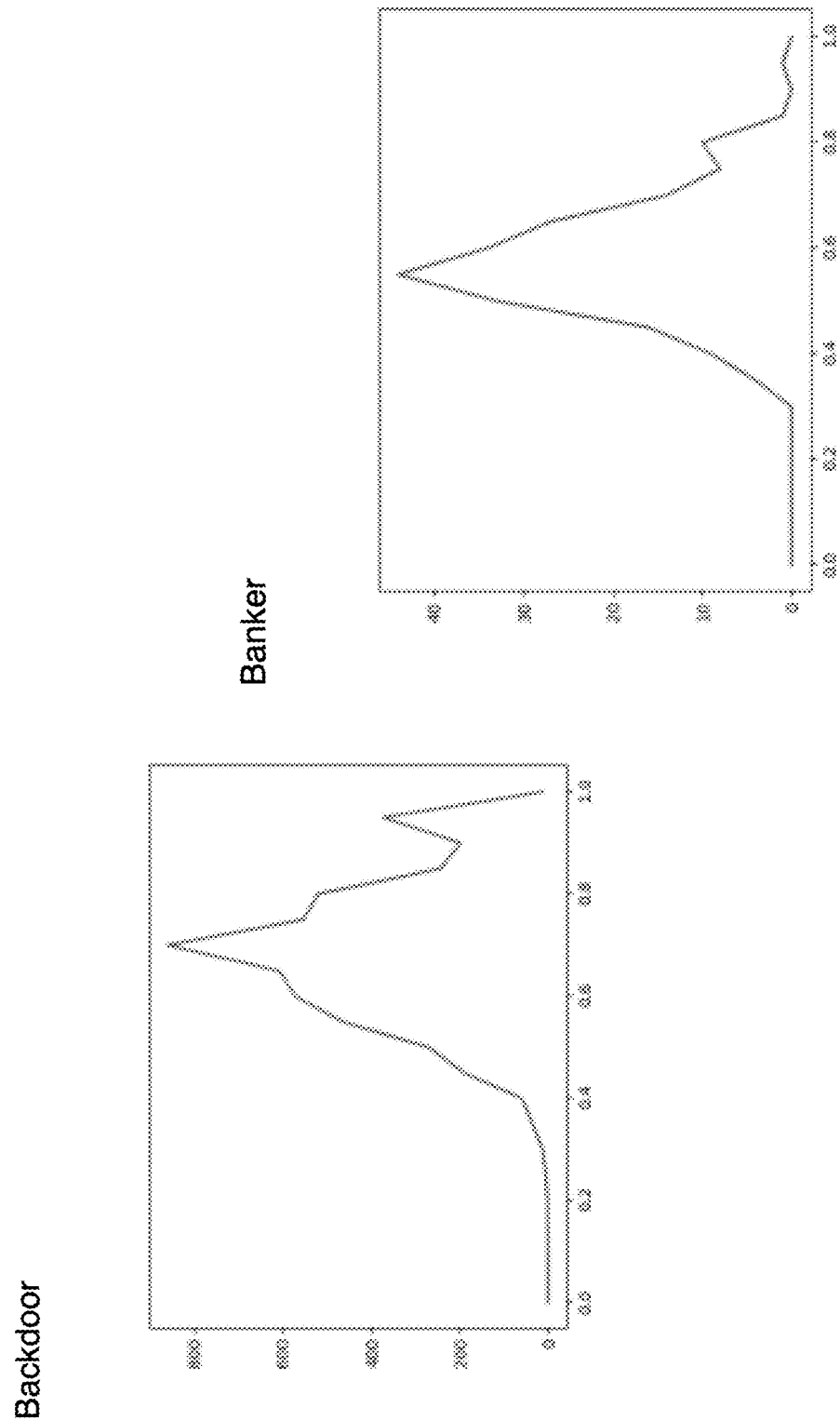
Figure 55:
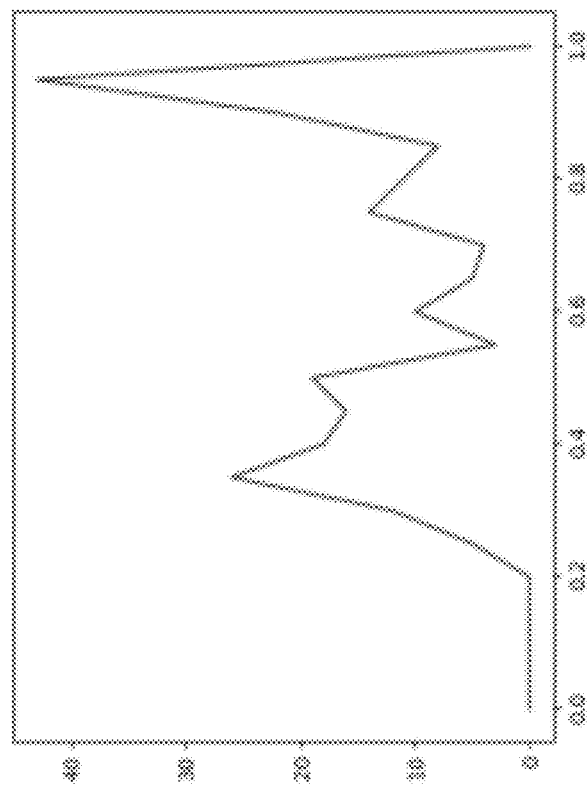
Figure 57:
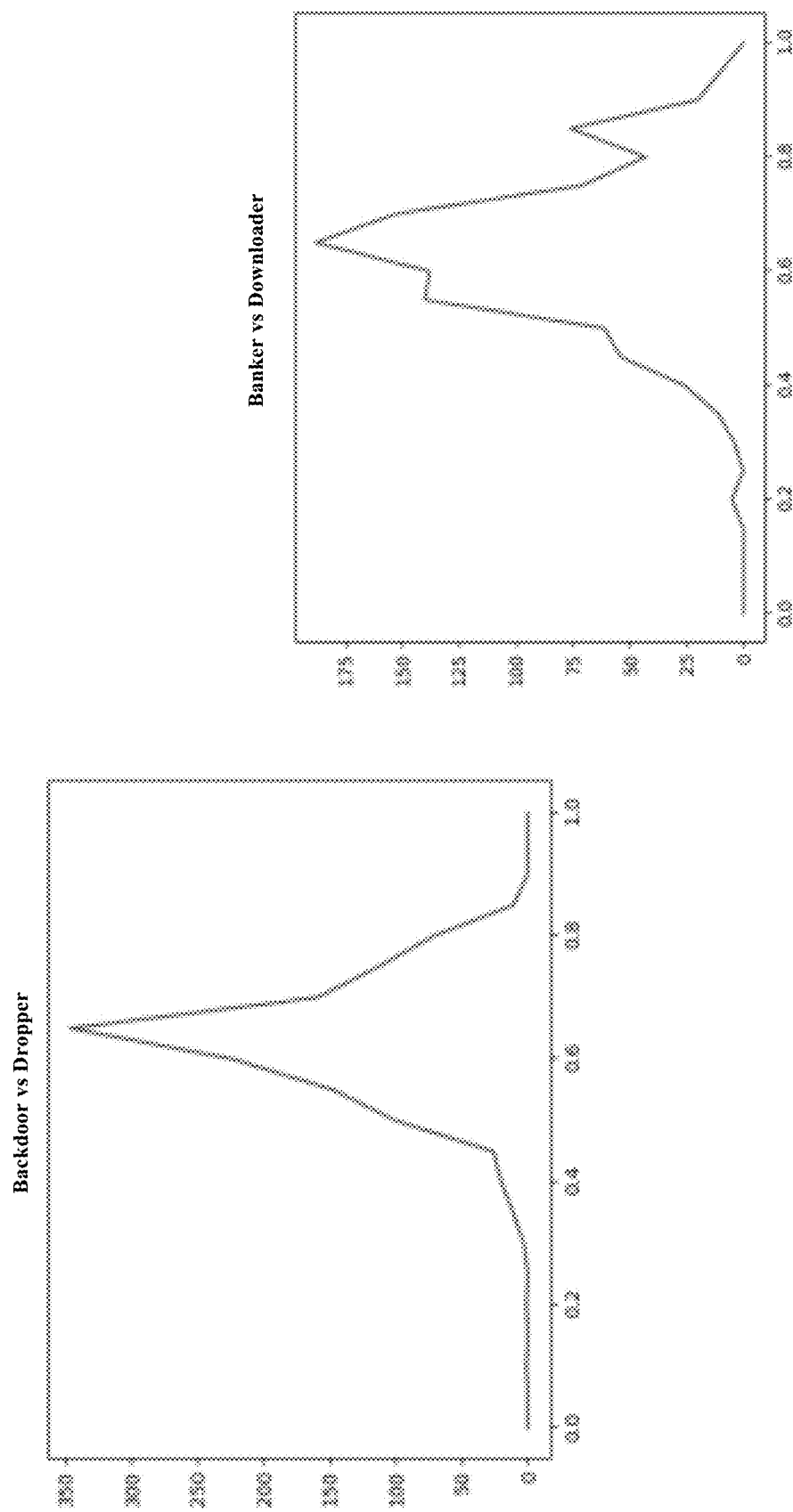
Figure 58:
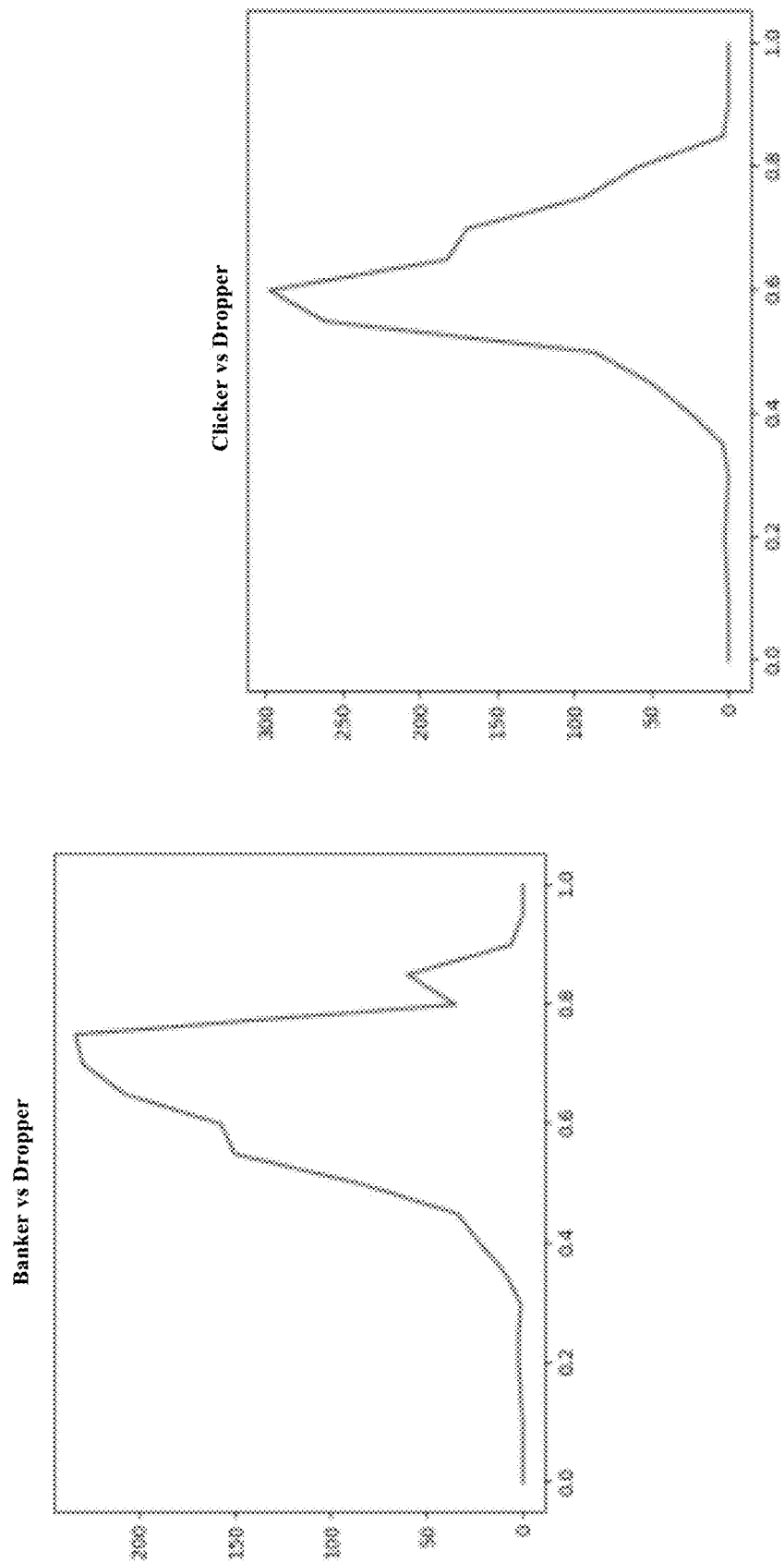

Moderate:
  Backdoor~=Dropper
  Banker~=Downloader
  Password Stealer~=Downloader Aggressive:
  Clicker~=Dropper
  Keylogger~=Dropper
  Ransomware~=Backdoor FIGS. 53-59 illustrate distance distributions. FIGS. 53-55, in particular, illustrate distance from within group to group's centroid, and FIG. 56 illustrates the centroid 144 vs the furthest group member. FIGS. 57-58, though, illustrate distance distributions from one group to another group's centroid. FIG. 59 illustrates centroidal similarities.

Misses were also investigated. Below are stats on misses (all similarity thresholds).

Backdoor Samples (Top Mis-Categorization Percentages):
  Dropper: 32%
  Hacktool: 15%
  Keylogger: 13%

Banker Samples (Top Mis-Categorization Percentages):
  Clicker: 28%
  Downloader: 22%
  Trojan spy: 19%

Trojan Spy Samples (Top Mis-Categorization Percentages):
  Keylogger: 34%
  Dropper: 10%
  Adware: 8%
  Banker: 7%

Clicker Samples (Top Mis-Categorization Percentages):
  Dropper: 87%
  Trojan spy: 13%
  (rest are zero).

Figure 60:
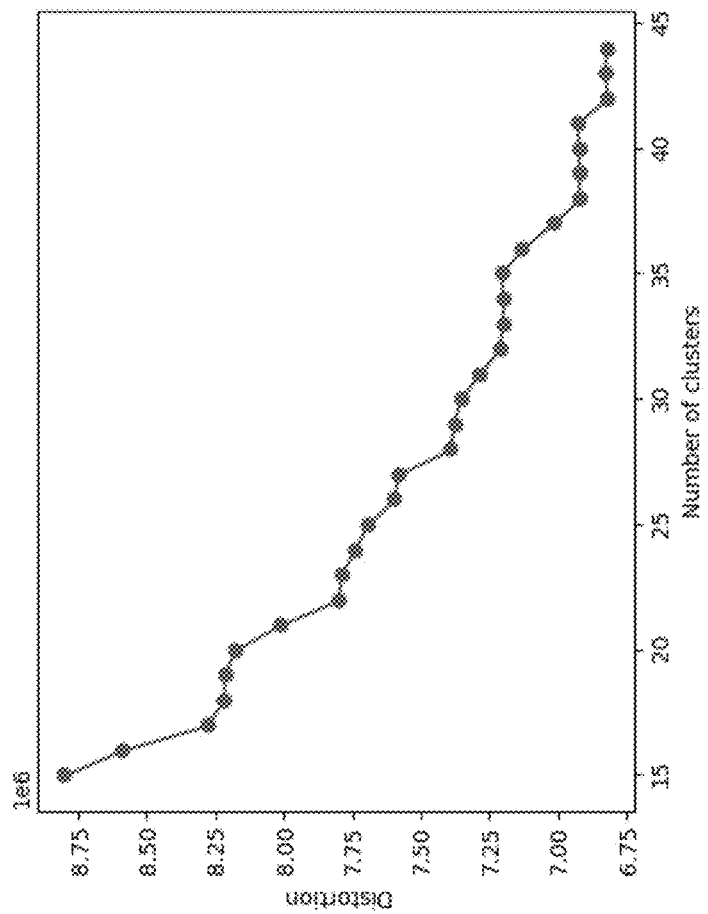
FIGS. 60-63 illustrate unsupervised clustering.
Figure 61:
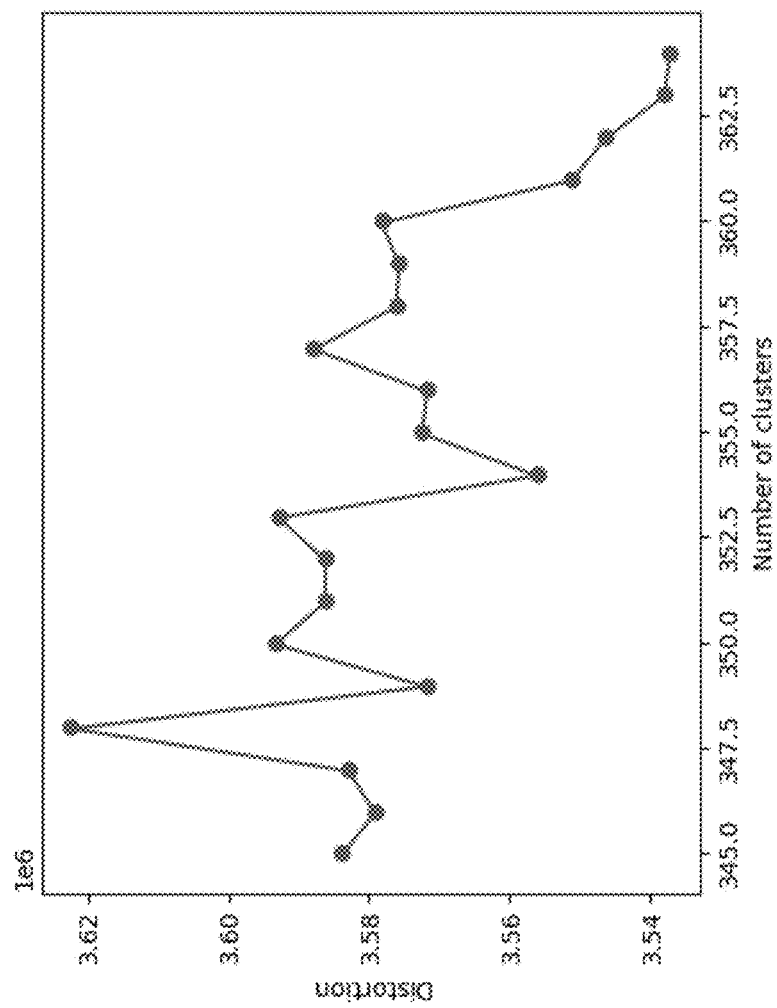
Figure 62:
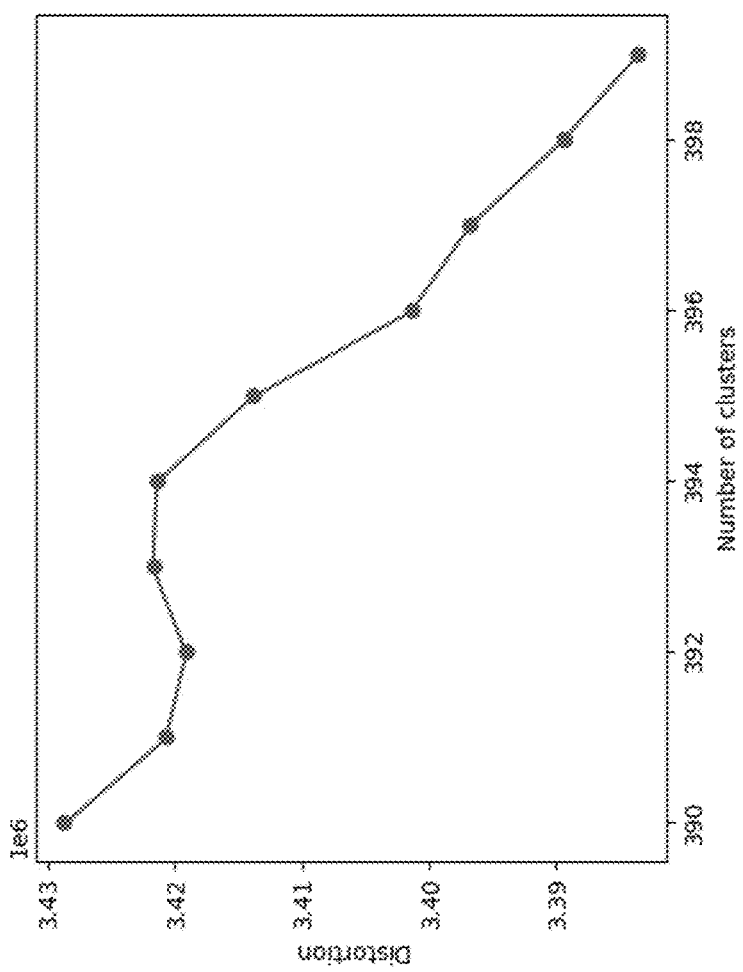
Figure 63:
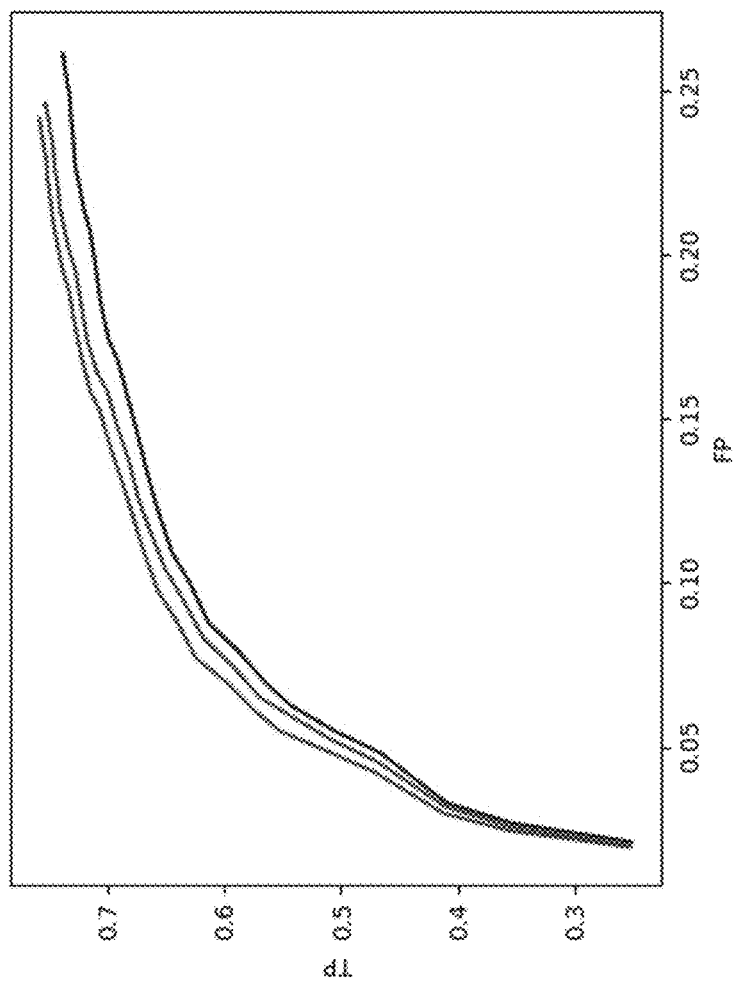

FIGS. 60-63 illustrate unsupervised clustering. For a first stab at unsupervised clustering, k-means was used. The k-means technique is supported by scikit-learn (https://www.scikit-learn.org) and is a robust and efficient method. It requires choosing the cluster count though ahead of time. So, the 'elbow method' (showing distortion vs cluster count) was used to pick an optimal cluster count. FIGS. 60-62 illustrate Distortion vs Cluster Count charts, with FIG. 60 illustrating cluster range 15-45. FIG. 61 illustrates cluster range 345-365, and FIG. 62 illustrates cluster range 390-400. Producing a singular chart for the cluster count range of 15-400 failed to complete in time (over a weekend). So a sampling approach was used instead, generating a chart first for counts 15-45, then spot checking with charts at higher counts to observe if the overall curve was flattening. The curve can be observed to indeed flatten dramatically past the 300 cluster count range. It doesn't display the classic 'elbow' found with clear cluster separation, reinforcing the earlier evidence that the samples tend to cross between more than one cluster and the clusters are adjacent and overlapping, especially at the low cluster count of the Threat Types groups (15 groups). Using the above data, a cluster count of 400 was chosen. FIG. 63 illustrates reworked similarity comparisons using these new clusters' centroids 144. FIG. 63 shows a much higher TP at lower similarity thresholds than generated using the Threat Types group centroids only (15 centroids), but at a cost of higher minimum FPs. A hybrid approach combining the output from using the 400 cluster centroids (from k-means) and the initial 15 centroids from the Threat Types groups was used to produce the result shown earlier (see sub-section title "Efficacy-Hybrid using centroids from Threat Types groups and centroids generated using k-means"). The additional clusters will allow for more accurate generation of similar samples.

Conclusions may be inferred. The approach to calculating similarity shows promise and good fidelity at high determination thresholds (0.93 and greater). Opening up the determination threshold allows more determinations but at the cost of increased false positive rate. A hybrid of using the centroid only comparisons for lower determination thresholds and the group subset comparisons at higher thresholds, maintains accuracy as possible while supporting greater determination rates. These results are improved significantly by interpolating comparisons to account for Threat Type groups 148 that overlap and are congruent. Findings also highlighted that centroids 144 and their surrounding groups are often close to each other, and members within a Threat Type group can be quite distant/dissimilar to each other. It is expected that these initial results can be improved upon through incorporating prevalence data, using sub-centroids, and combining with traditional. Machine learning performance is sufficient. Single-threaded rate: ~8600 similarity assessments/hour (with 30K comparison set). Exceeds requirements (~4K/hour to support 100K detonations/day). Analysis can be subdivided into discrete processes for scaling, if needed. Introducing k-means clustering as an unsupervised method reinforces that the Threat Types groups are adjacent and overlap. A combo of using centroids from this and the Threat Types groups yielded the best results to date.

Figure 64:
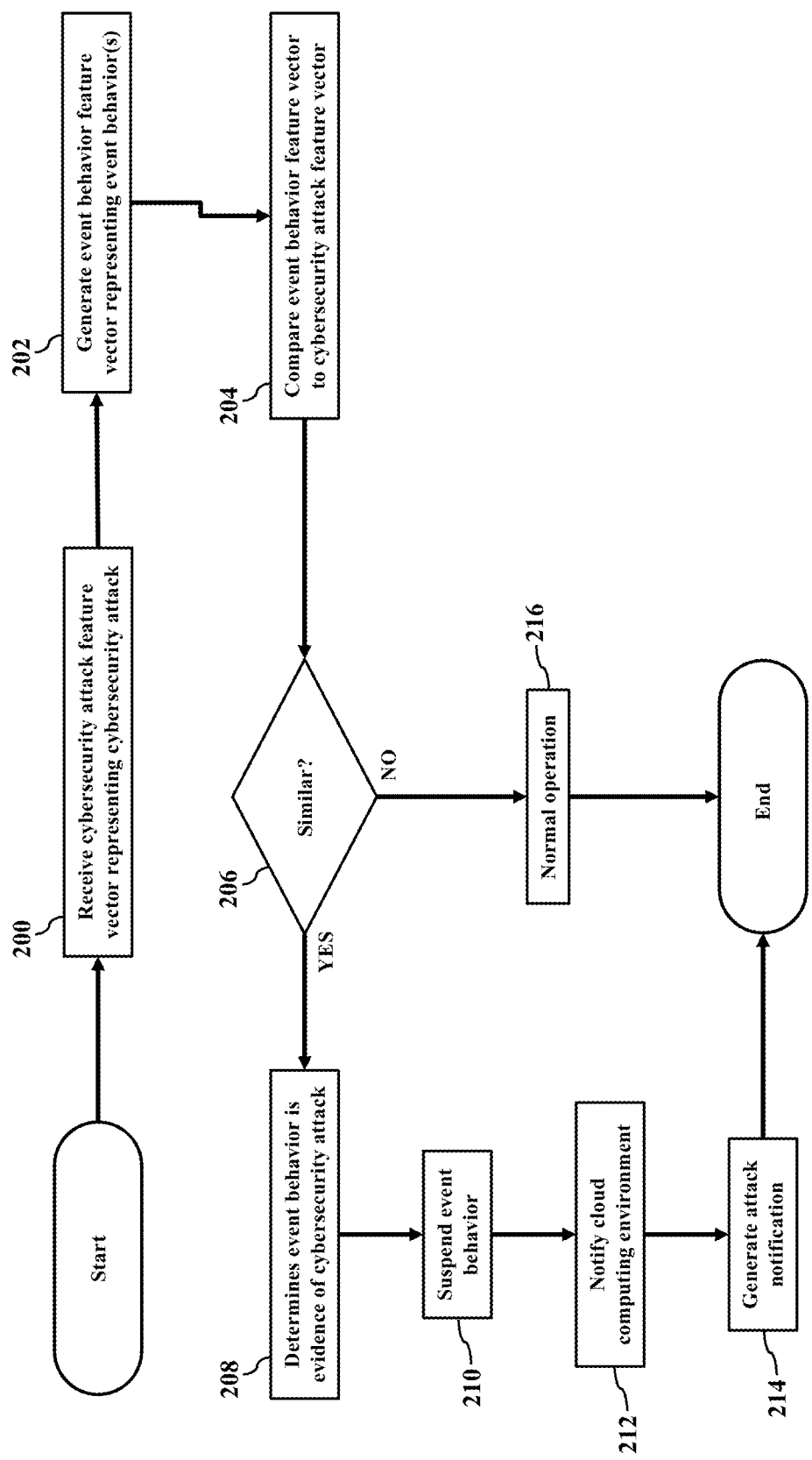
FIG. 64 illustrates examples of a method or operations that detect an evidence of the cybersecurity attack 22.

FIG. 64 illustrates examples of a method or operations executed by the computer 20 or other endpoint device that detects an evidence of the cybersecurity attack 22. The endpoint device receives the cybersecurity attack feature vector 62 representing the cybersecurity attack 22 (Block 200). The endpoint device generates the event behavior feature vector 60 representing the event behavior 30 (Block 202). The endpoint device compares the event behavior feature vector 60 to the cybersecurity attack feature vector 62 representing the cybersecurity attack 22 (Block 204). If the event behavior feature vector 60 is similar to the cybersecurity attack feature vector 62 (Block 206), then the endpoint device determines that the event behavior 30 is evidence of the cybersecurity attack 22 (Block 208). The endpoint device may suspend the event behavior 30 (Block 210), notify the cloud computing environment 22 (Block 212), and generate the attack notification 82 (Block 214). However, if the event behavior feature vector 60 is dissimilar to the cybersecurity attack feature vector 62 (Block 206), then the endpoint device may determine that the event behavior feature vector 60 represents the normal operation 80 (Block 216).

Figure 65:
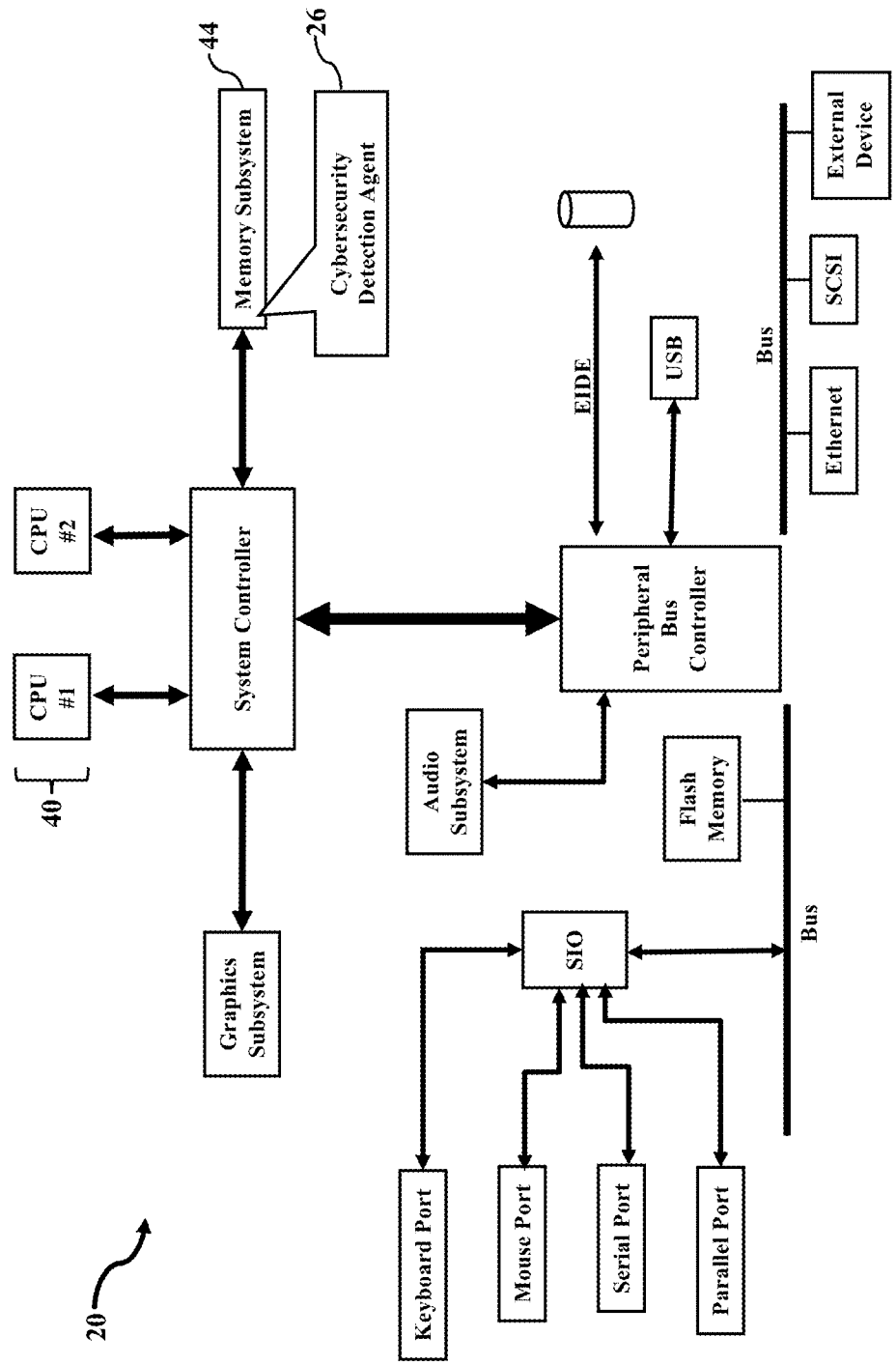
FIG. 65 illustrates a more detailed example of an operating environment.

FIG. 65 illustrates a more detailed example of the operating environment. FIG. 65 is a more detailed block diagram illustrating the computer 20 (and perhaps the server 24, the laptop 46, and the smartphone 76). The cybersecurity detection agent 26 is stored in the memory subsystem or device 44. One or more of the hardware processors 40 communicate with the memory subsystem or device 44 and execute the cybersecurity detection agent 26. Examples of the memory subsystem or device 44 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer 20 is known to those of ordinary skill in the art, no detailed explanation is needed.

The computer 20 may have any embodiment. This disclosure mostly discusses the computer 20 as the server 24, the laptop 46, and the smartphone 76. The cybersecurity service 28, however, may be easily adapted to any stationary or mobile computing, wherein the computer 20 may be a tablet computer, a smartwatch, and a network switch/router. The cybersecurity service 28 may also be easily adapted to other embodiments of smart devices, such as a television, an audio device, a remote control, and a recorder. The cybersecurity service 28 may also be easily adapted to still more smart appliances, such as washers, dryers, and refrigerators. Indeed, as cars, trucks, and other vehicles grow in electronic usage and in processing power, the cybersecurity service 28 may be easily incorporated into any vehicular controller.

The above examples of the cybersecurity service 28 may be applied regardless of the networking environment. The cybersecurity service 28 may be easily adapted to stationary or mobile devices having wide-area networking (e.g., 4G/LTE/5G cellular), wireless local area networking (WI-FI®), near field, and/or BLUETOOTH® capability. The cybersecurity service 28 may be applied to stationary or mobile devices utilizing any portion of the electromagnetic spectrum and any signaling standard (such as the IEEE 802 family of standards, GSM/CDMA/TDMA or any cellular standard, and/or the ISM band). The cybersecurity service 28, however, may be applied to any processor-controlled device operating in the radio-frequency domain and/or the Internet Protocol (IP) domain. The cybersecurity service 28 may be applied to any processor-controlled device utilizing a distributed computing network, such as the Internet (sometimes alternatively known as the "World Wide Web"), an intranet, a local-area network (LAN), and/or a wide-area network (WAN). The cybersecurity service 28 may be applied to any processor-controlled device utilizing power line technologies, in which signals are communicated via electrical wiring. Indeed, the many examples may be applied regardless of physical componentry, physical configuration, or communications standard(s).

The computer 20 may utilize any processing component, configuration, or system. For example, the cybersecurity service 28 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or any other manufacturer. The computer 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cybersecurity service 28 may use packetized communications. When the computer 20 communicates via the access network 72 and/or the cloud-computing environment 74, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cybersecurity service 28 may utilize any signaling standard. The computer 20, the access network 72, and/or the cloud-computing environment 74 may mostly use wired networks to interconnect network members. However, the computer 20, the access network 72, and/or the cloud-computing environment 74 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud-based malware assessment service 40 may also utilize other standards, such as the I.E.E.E. 802 family of standards, the Industrial, Scientific, and Medical band of the electromagnetic spectrum, BLUETOOTH®, low-power or near-field, and any other standard or value.

The cybersecurity service 28 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for providing the cybersecurity service 28, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a cybersecurity detection agent that detects an evidence of a cybersecurity attack, comprising:
   receiving, by the cybersecurity detection agent installed on an endpoint device, a centroidal cybersecurity attack feature vector representing an attack centroid associated with a cybersecurity attack;
   generating, by the cybersecurity detection agent installed on the endpoint device, a centroidal event behavior feature vector representing an event behavior centroid associated with event behaviors;
   comparing, by the cybersecurity detection agent installed on the endpoint device, the centroidal event behavior feature vector to the centroidal cybersecurity attack feature vector representing the attack centroid associated with the cybersecurity attack;
   determining, by the cybersecurity detection agent installed on the endpoint device, that the centroidal event behavior feature vector is similar to the centroidal cybersecurity attack feature vector representing the attack centroid associated with the cybersecurity attack; and
   in response to the determining that the centroidal event behavior feature vector is similar to the centroidal cybersecurity attack feature vector, determining, by the cybersecurity detection agent installed on the endpoint device, that the event behaviors are the evidence of the cybersecurity attack.

2. The method of claim 1, further comprising executing, by the cybersecurity detection agent installed on the endpoint device, a down-select operation that only reports the event behaviors associated with the event behavior centroid.

3. The method of claim 1, further comprising notifying a cloud computing environment of the cybersecurity attack by uploading only the event behaviors associated with the event behavior centroid.

4. The method of claim 1, further comprising declining to notify a cloud computing environment of the event behaviors not associated with the event behavior centroid.

5. The method of claim 1, further comprising generating an attack notification of the cybersecurity attack.

6. The method of claim 1, further comprising determining, by the cybersecurity detection agent installed on the endpoint device, that the centroidal event behavior feature vector is dissimilar to the centroidal cybersecurity attack feature vector representing the cybersecurity attack.

7. The method of claim 6, wherein in response to the determining that the centroidal event behavior feature vector is dissimilar to the centroidal cybersecurity attack feature vector, further comprising determining, by the cybersecurity detection agent installed on the endpoint device, that the centroidal event behavior feature vector represents a normal operation.

8. An endpoint device that detects a cybersecurity attack, comprising:
   a central processing unit; and
   a memory device storing instructions that, when executed by the central processing unit, perform operations, the operations comprising:
   receiving, by a cybersecurity detection agent installed on the endpoint device, a centroidal cybersecurity attack feature vector generated by a cloud computing environment that represents an attack centroid associated with a cybersecurity attack;
   locally extracting, by the cybersecurity detection agent installed on the endpoint device, a centroidal event behavior feature vector representing an event behavior centroid associated with event behaviors;
   comparing, by the cybersecurity detection agent installed on the endpoint device, the centroidal event behavior feature vector to the centroidal cybersecurity attack feature vector generated by the cloud computing environment to represent the attack centroid associated with the cybersecurity attack;
   determining, by the cybersecurity detection agent installed on the endpoint device, that the centroidal event behavior feature vector is similar to the centroidal cybersecurity attack feature vector representing the attack centroid associated with the cybersecurity attack; and
   in response to the determining that the centroidal event behavior feature vector is similar to the centroidal cybersecurity attack feature vector, determining, by the cybersecurity detection agent installed on the endpoint device, that the event behavior is an evidence of the cybersecurity attack.

9. The endpoint device of claim 8, wherein the operations further comprise executing, by the cybersecurity detection agent installed on the endpoint device, a down-select operation that limits reporting to only the event behaviors associated with the event behavior centroid.

10. The endpoint device of claim 8, wherein the operations further comprise notifying the cloud computing environment of only the event behaviors associated with the event behavior centroid.

11. The endpoint device of claim 8, wherein the operations further comprise declining to report the event behaviors unassociated with the event behavior centroid.

12. The endpoint device of claim 8, wherein the operations further comprise terminating the event behaviors.

13. The endpoint device of claim 8, wherein the operations further comprise terminating a file associated with the event behaviors.

14. The endpoint device of claim 8, wherein the operations further comprise terminating a software application associated with the event behaviors.

15. The endpoint device of claim 8, wherein the operations further comprise determining, by the cybersecurity detection agent installed on the endpoint device, that the centroidal event behavior feature vector is dissimilar to the centroidal cybersecurity attack feature vector.

16. The endpoint device of claim 15, wherein the operations further comprise determining, by the cybersecurity detection agent installed on the endpoint device, that the centroidal event behavior feature vector represents a normal operation.

17. A memory device storing instructions that, when executed by a central processing unit, perform operations, comprising:
  receiving, by a cybersecurity detection agent installed on an endpoint device during an online network connection between the endpoint device and a cloud computing environment, centroidal cybersecurity attack feature vectors generated by the cloud computing environment to represent attack centroids associated with different cybersecurity attacks;
  locally extracting, by the cybersecurity detection agent installed on the endpoint device, a centroidal event behavior feature vector representing an event behavior centroid associated with local event behavior;
  comparing, by the cybersecurity detection agent installed on the endpoint device independent of the online network connection, the centroidal event behavior feature vector to the centroidal cybersecurity attack feature vectors representing the attack centroids associated with the different cybersecurity attacks;
  determining, by the cybersecurity detection agent installed on the endpoint device independent of the online network connection, that the centroidal event behavior feature vector is similar to a cybersecurity attack feature vector representing an attack centroid associated with a cybersecurity attack of the attack centroids associated with the different cybersecurity attacks; and
  in response to the determining that the centroidal event behavior feature vector is similar to the centroidal cybersecurity attack feature vector, determining, by the cybersecurity detection agent installed on the endpoint device, that the local event behavior is an evidence of the cybersecurity attack.

18. The memory device of claim 17, wherein the operations further comprise executing, by the cybersecurity detection agent installed on the endpoint device, a down-select operation that limits reporting to only the event behaviors associated with the event behavior centroid.

19. The memory device of claim 17, wherein the operations further comprise notifying the cloud computing environment of the cybersecurity attack.

20. The memory device of claim 17, wherein the operations further comprise terminating at least one of the local event behavior, a file associated with the local event behavior, or a software application associated with the local event behavior.

* * * * *